(12) United States Patent
Fuller et al.

(10) Patent No.: US 8,011,388 B2
(45) Date of Patent: Sep. 6, 2011

(54) THERMALLY ACTUATED MICROVALVE WITH MULTIPLE FLUID PORTS

(75) Inventors: Edward Nelson Fuller, Manchester, MI (US); Harry A. Hunnicutt, Lynden, WA (US)

(73) Assignee: Microstaq, INC, Austin, TX (US)

( * ) Notice: Subject to any disclaimer, the term of this patent is extended or adjusted under 35 U.S.C. 154(b) by 1030 days.

(21) Appl. No.: 11/731,729

(22) Filed: Mar. 30, 2007

(65) Prior Publication Data

US 2008/0047622 A1 Feb. 28, 2008

Related U.S. Application Data

(63) Continuation-in-part of application No. 11/437,022, filed on May 18, 2006, now Pat. No. 7,210,502, which is a continuation of application No. PCT/US2004/039517, filed on Nov. 24, 2004, application No. 11/731,729, filed on Mar. 30, 2007, which is a continuation-in-part of application No. 10/589,599, filed on Jul. 2, 2007, which is a continuation of application No. PCT/US2005/005963, filed on Feb. 25, 2005.

(60) Provisional application No. 60/559,355, filed on Apr. 2, 2004, provisional application No. 60/525,224, filed on Nov. 24, 2003, provisional application No. 60/548,563, filed on Feb. 27, 2004.

(51) Int. Cl.
 *F16K 11/06* (2006.01)
(52) U.S. Cl. .................................. 137/625.65; 137/831
(58) Field of Classification Search .................. 137/829, 137/831, 833, 625.65, 596.17
See application file for complete search history.

(56) References Cited

U.S. PATENT DOCUMENTS 886,045 A 4/1908 Ehrlich et al.
1,886,205 A 11/1932 Lyford
(Continued)

FOREIGN PATENT DOCUMENTS

DE 2215526 10/1973
(Continued)

OTHER PUBLICATIONS

Günther, Götz, "Entwicklung eines pneumatischen 3/2-Wege-Mikroventils", O+P Olhydraulik Und Pneumatik, Vereinigte Fachverlage, Mainz, DE, vol. 42, No. 6, Jun. 1, 1998, pp. 396-398, XP000831050, ISSN: 0341-2660.

(Continued)

*Primary Examiner* — Craig M Schneider
(74) *Attorney, Agent, or Firm* — MacMillan, Sobanski & Todd, LLC

(57) ABSTRACT

A MEMS device is disclosed having a single microvalve actuator for controlling multiple microvalves. Exemplary embodiments include a MEMS device including two microvalves formed on a beam positioned by an actuator, the two microvalves controlling separate flow paths between two separate pairs of ports; a device with a two-way pilot operated microvalve and a four-way pilot microvalve for controlling the two-way pilot operated microvalve; a device with two three-way microvalves actuated by a common microvalve actuator; and a two-way microvalve with a moveable microvalve element and a feedback port formed in the moveable element operable to regulate the pressure on an end of the moveable element relative to the movement of the moveable element between the first position and the second position. Also disclosed is a MEMS device including a beam with a plurality of apertures formed therein, resulting in a mass reduction of at least 10 percent.

16 Claims, 26 Drawing Sheets

U.S. PATENT DOCUMENTS

| | | |
|---|---|---|
| 1,926,031 A | 9/1933 | Boynton |
| 2,412,205 A | 12/1946 | Cook |
| 2,504,055 A | 4/1950 | Thomas |
| 2,840,107 A | 6/1958 | Campbell |
| 2,875,779 A | 3/1959 | Campbell |
| 3,031,747 A | 5/1962 | Green |
| 3,729,807 A | 5/1973 | Fujiwara |
| 3,747,628 A | 7/1973 | Holster et al. |
| 3,860,949 A | 1/1975 | Stoeckert et al. |
| 4,005,454 A | 1/1977 | Froloff et al. |
| 4,019,388 A | 4/1977 | Hall, II et al. |
| 4,023,725 A | 5/1977 | Ivett et al. |
| 4,100,236 A | 7/1978 | Gordon et al. |
| 4,152,540 A | 5/1979 | Duncan et al. |
| 4,181,249 A | 1/1980 | Peterson et al. |
| 4,298,023 A | 11/1981 | McGinnis |
| 4,341,816 A | 7/1982 | Lauterbach et al. |
| 4,434,813 A | 3/1984 | Mon |
| 4,476,893 A | 10/1984 | Schwelm |
| 4,543,875 A | 10/1985 | Imhof |
| 4,581,624 A | 4/1986 | O'Connor |
| 4,593,719 A | 6/1986 | Leonard |
| 4,628,576 A | 12/1986 | Giachino et al. |
| 4,647,013 A | 3/1987 | Giachino et al. |
| 4,661,835 A | 4/1987 | Gademann et al. |
| 4,772,935 A | 9/1988 | Lawler et al. |
| 4,821,997 A | 4/1989 | Zdeblick |
| 4,824,073 A | 4/1989 | Zdeblick |
| 4,826,131 A | 5/1989 | Mikkor |
| 4,828,184 A | 5/1989 | Gardner et al. |
| 4,869,282 A | 9/1989 | Sittler et al. |
| 4,938,742 A | 7/1990 | Smits |
| 4,943,032 A | 7/1990 | Zdeblick |
| 4,946,350 A | 8/1990 | Suzuki et al. |
| 4,959,581 A | 9/1990 | Dantlgraber |
| 4,966,646 A | 10/1990 | Zdeblick |
| 5,029,805 A | 7/1991 | Albarda et al. |
| 5,037,778 A | 8/1991 | Stark et al. |
| 5,050,838 A | 9/1991 | Beatty et al. |
| 5,054,522 A | 10/1991 | Kowanz et al. |
| 5,058,856 A | 10/1991 | Gordon et al. |
| 5,061,914 A | 10/1991 | Busch et al. |
| 5,064,165 A | 11/1991 | Jerman |
| 5,065,978 A | 11/1991 | Albarda et al. |
| 5,066,533 A | 11/1991 | America et al. |
| 5,069,419 A | 12/1991 | Jerman |
| 5,074,629 A | 12/1991 | Zdeblick |
| 5,082,242 A | 1/1992 | Bonne et al. |
| 5,096,643 A | 3/1992 | Kowanz et al. |
| 5,116,457 A | 5/1992 | Jerman |
| 5,131,729 A | 7/1992 | Wetzel |
| 5,133,379 A | 7/1992 | Jacobsen et al. |
| 5,142,781 A | 9/1992 | Mettner et al. |
| 5,161,774 A | 11/1992 | Engelsdorf et al. |
| 5,169,472 A | 12/1992 | Goebel |
| 5,176,358 A | 1/1993 | Bonne et al. |
| 5,177,579 A | 1/1993 | Jerman |
| 5,178,190 A | 1/1993 | Mettner |
| 5,179,499 A | 1/1993 | MacDonald et al. |
| 5,180,623 A | 1/1993 | Ohnstein |
| 5,197,517 A | 3/1993 | Perera |
| 5,209,118 A | 5/1993 | Jerman |
| 5,215,244 A | 6/1993 | Buchholz et al. |
| 5,216,273 A | 6/1993 | Doering et al. |
| 5,217,283 A | 6/1993 | Watanabe |
| 5,222,521 A | 6/1993 | Kihlberg |
| 5,238,223 A | 8/1993 | Mettner et al. |
| 5,244,537 A | 9/1993 | Ohnstein |
| 5,267,589 A | 12/1993 | Watanabe |
| 5,271,431 A | 12/1993 | Mettner et al. |
| 5,271,597 A | 12/1993 | Jerman |
| 5,309,943 A | 5/1994 | Stevenson et al. |
| 5,323,999 A | 6/1994 | Bonne et al. |
| 5,325,880 A | 7/1994 | Johnson et al. |
| 5,333,831 A | 8/1994 | Barth et al. |
| 5,336,062 A | 8/1994 | Richter |
| 5,355,712 A | 10/1994 | Petersen et al. |
| 5,368,704 A | 11/1994 | Madou et al. |
| 5,375,919 A | 12/1994 | Furuhashi |
| 5,400,824 A | 3/1995 | Gschwendtner et al. |
| 5,417,235 A | 5/1995 | Wise et al. |
| 5,445,185 A | 8/1995 | Watanabe et al. |
| 5,458,405 A | 10/1995 | Watanabe |
| 5,543,349 A | 8/1996 | Kurtz et al. |
| 5,553,790 A | 9/1996 | Findler et al. |
| 5,566,703 A | 10/1996 | Watanabe et al. |
| 5,577,533 A | 11/1996 | Cook, Jr. |
| 5,611,214 A | 3/1997 | Wegeng et al. |
| 5,785,295 A | 7/1998 | Tsai |
| 5,810,325 A | 9/1998 | Carr |
| 5,838,351 A | 11/1998 | Weber |
| 5,848,605 A | 12/1998 | Bailey et al. |
| 5,856,705 A | 1/1999 | Ting |
| 5,873,385 A | 2/1999 | Bloom et al. |
| 5,909,078 A | 6/1999 | Wood et al. |
| 5,926,955 A | 7/1999 | Kober |
| 5,941,608 A | 8/1999 | Campau et al. |
| 5,954,079 A | 9/1999 | Barth et al. |
| 5,955,817 A | 9/1999 | Dhuler et al. |
| 5,970,998 A | 10/1999 | Talbot et al. |
| 5,994,816 A | 11/1999 | Dhuler et al. |
| 6,019,437 A | 2/2000 | Barron et al. |
| 6,023,121 A | 2/2000 | Dhuler et al. |
| 6,038,928 A | 3/2000 | Maluf et al. |
| 6,041,650 A * | 3/2000 | Swindler et al. ............... 73/317 |
| 6,096,149 A | 8/2000 | Hetrick et al. |
| 6,105,737 A | 8/2000 | Weigert et al. |
| 6,114,794 A | 9/2000 | Dhuler et al. |
| 6,116,863 A | 9/2000 | Ahn et al. |
| 6,123,316 A | 9/2000 | Biegelsen et al. |
| 6,124,663 A | 9/2000 | Haake et al. |
| 6,171,972 B1 | 1/2001 | Mehregany et al. |
| 6,182,742 B1 | 2/2001 | Takahashi et al. |
| 6,224,445 B1 | 5/2001 | Neukermans et al. |
| 6,255,757 B1 | 7/2001 | Dhuler et al. |
| 6,279,606 B1 | 8/2001 | Hunnicutt et al. |
| 6,386,507 B2 | 5/2002 | Dhuler et al. |
| 6,390,782 B1 | 5/2002 | Booth et al. |
| 6,494,804 B1 | 12/2002 | Hunnicutt et al. |
| 6,505,811 B1 | 1/2003 | Barron et al. |
| 6,520,197 B2 * | 2/2003 | Deshmukh et al. ............... 137/3 |
| 6,523,560 B1 | 2/2003 | Williams et al. |
| 6,533,366 B1 | 3/2003 | Barron et al. |
| 6,540,203 B1 | 4/2003 | Hunnicutt |
| 6,581,640 B1 | 6/2003 | Barron |
| 6,637,722 B2 | 10/2003 | Hunnicutt |
| 6,662,581 B2 | 12/2003 | Hirota et al. |
| 6,694,998 B1 | 2/2004 | Hunnicutt |
| 6,724,718 B1 | 4/2004 | Shinohara et al. |
| 6,761,420 B2 | 7/2004 | Fuller et al. |
| 6,845,962 B1 | 1/2005 | Barron et al. |
| 6,872,902 B2 | 3/2005 | Cohn et al. |
| 6,958,255 B2 | 10/2005 | Khuri-Yakub et al. |
| 7,011,378 B2 | 3/2006 | Maluf et al. |
| 7,210,502 B2 | 5/2007 | Fuller et al. |
| 2002/0014106 A1 | 2/2002 | Srinivasan et al. |
| 2002/0029814 A1 | 3/2002 | Unger et al. |
| 2002/0096421 A1 | 7/2002 | Cohn et al. |
| 2002/0174891 A1 | 11/2002 | Maluf et al. |
| 2003/0061889 A1 | 4/2003 | Tadigadapa et al. |
| 2003/0092526 A1 | 5/2003 | Hunnicutt et al. |
| 2003/0098612 A1 | 5/2003 | Maluf et al. |
| 2003/0159811 A1 | 8/2003 | Nurmi |
| 2003/0206832 A1 | 11/2003 | Thiebaud et al. |
| 2005/0121090 A1 | 6/2005 | Hunnicutt |
| 2005/0200001 A1 | 9/2005 | Joshi et al. |
| 2005/0205136 A1 | 9/2005 | Freeman |
| 2006/0218953 A1 | 10/2006 | Hirota |
| 2010/0225708 A1 | 9/2010 | Peng et al. |

FOREIGN PATENT DOCUMENTS

| | | |
|---|---|---|
| DE | 2930779 | 2/1980 |
| DE | 3401404 | 7/1985 |
| DE | 4101575 | 7/1992 |
| DE | 4417251 | 11/1995 |
| DE | 4422942 | 1/1996 |
| EP | 250948 | 1/1988 |

| | | |
|---|---|---|
| EP | 261972 | 3/1988 |
| EP | 1024285 A2 | 8/2000 |
| GB | 2238267 | 5/1991 |
| JP | SHO 39-990 | 2/1964 |
| JP | 04-000003 | 1/1992 |
| JP | 06-117414 | 4/1994 |
| JP | 2001184125 A | 7/2001 |
| JP | 2003-049933 | 2/2003 |
| JP | 2006-080194 | 3/2006 |
| WO | WO99/16096 | 4/1999 |
| WO | WO9924783 | 5/1999 |
| WO | WO00/14415 | 3/2000 |
| WO | WO2005084211 A2 | 9/2005 |

OTHER PUBLICATIONS

Communication and European Search Report dated Nov. 3, 2009.
English language Abstract for JP2001184125 from esp@cenet database—Worldwide, Jul. 6, 2001.
"A Silicon Microvalve for the Proportional Control of Fluids" by K.R. Williams, N.I. Maluf, E.N. Fuller, R.J. Barron, D.P. Jaeggi, and B.P. van Drieënhuizen, Transducers '99, Proc. 10th International Conference on Solid State Sensors and Actuators, held Jun. 7-10, 1999, Sendai, Japan, pp. 18-21.
"Process for in-plane and out-of-plane single-crystal-silicon thermal microactuators"; J. Mark Noworolski, et al.; Sensors and Actuators A 55 (1996); pp. 65-69.
Ayón et al., "Etching Characteristics and Profile Control in a Time Multiplexed ICP Etcher," Proc. of Solid State Sensor and Actuator Workshop Technical Digest, Hilton Head SC, (Jun. 1998) 41-44.
Bartha et al., "Low Temperature Etching of Si in High Density Plasma Using SF6/O2," Microelectronic Engineering, Elsevier Science B.V., vol. 27, (1995) 453-456.
Fung et al., "Deep Etching of Silicon Using Plasma" Proc. of the Workshop on Micromachining and Micropackaging of Transducers, (Nov. 7-8, 1984) pp. 159-164.
IEEE Technical Digest entitled "Compliant Electro-thermal Microactuators", J. Jonsmann, O. Sigmund, S. Bouwstra, Twelfth IEEE International Conference on Micro Electro Mechanical Systems held Jan. 17-21, 1999, Orlando, Florida, pp. 588-593, IEEE Catalog No. 99CH36291C.
Klaassen et al., "Silicon Fusion Bonding and Deep Reactive Ion Etching; A New Technology for Microstructures," Proc., Transducers 95 Stockholm Sweden, (1995) 556-559.
Linder et al., "Deep Dry Etching Techniques as a New IC Compatible Tool for Silicon Micromachining," Proc,. Transducers, vol. 91, (Jun. 1991) pp. 524-527.
Noworolski et al., "Process for in-plane and out-of-plane single-crystal-silicon thermal microactuators," Sensors and Actuators A, Elsevier Science S.A., vol. 55, No. 1, (1996) 65-69.
Petersen et al. "Surfaced Micromachined Structures Fabricated with Silicon Fusion Bonding" Proc., Transducers 91, (Jun. 1992) pp. 397-399.
Yunkin et al., "Highly Anisotropic Selective Reactive Ion Etching of Deep Trenches in Silicon," Microelectronic Enginineering, Elsevier Science B.V., vol. 23, (1994) pp. 373-376.
International Search Report dated Apr. 5, 2010 for Application No. PCT/US2009/05355.
Booth, Steve and Kaina, Rachid, Fluid Handling—Big Gains from Tiny Valve, Appliance Design (Apr. 2008), pp. 46-48.
Controls Overview for Microstaq Silicon Expansion Valve (SEV), Rev. 1, Dec. 2008, http://www.microstaq.com/pdf/SEV_controls.pdf, accessed May 17, 2010.
Copeland, Michael V., Electronic valves promise big energy savings, FORTUNE (Sep. 9, 2008), http://techland.blogs.fortune.cnn.com/2008/09/09/electronic-valves-promise-big-energy-savings, accessed Sep. 9, 2008.
Higginbotham, Stacey, Microstaq's Tiny Valves Mean Big Energy Savings, http//earth2tech.com/2008/09/09/microstaqs-tiny-valves-mean-big-energy savings, posted Sep. 9, 2008.
Keefe, Bob, Texas firm says value-replacing chip can drastically cut energy use, Atlanta Metro News (Sep. 10, 2008), http://www.ajc.com/search/content/shared/money/stories/2008/09/microstaq10_cox-F9782.html, accessed Sep. 10, 2008.
Luckevich, Mark, MEMS microvlaves: the new valve world, Valve World (May 2007), pp. 79-83.
MEMS, Microfluidics and Microsystems Executive Review, http:www.memsinvestorjournal.com/2009/04/mems-applications-for-flow-control-.html, accessed May 17, 2010.
Microstaq Announces High Volume Production of MEMS-Based Silicon Expansion Valve, http://www.earthtimes.org/articles/printpressstory.php?news+1138955 (posted Jan. 27, 2010), accessed Jan. 27, 2010.
Microstaq Product Description, Proportional Direct Acting Silicon Control Valve (PDA-3), http://www.microstaq.com/products/pda3.html, accessed May 17, 2010.
Microstaq Product Descriptions, SEV, CPS-4, and PDA-3, http://www.microstaq.com/products/index.html, accessed May 17, 2010.
Press Release, Freescale and Microstaq Join Forces on Smart Superheat Control System for HVAC and Refrigeration Efficiency, http://www.microstaq.com/pressReleases/prDetail_04.html (posted Jan. 22, 2008), accessed May 17, 2010.
Press Release, Microstaq Mastering Electronic Controls for Fluid-Control Industry, http://www.microstaq.com/pressReleases/prDetail_02.html (Posted May 25, 2005), accessed May 17, 2010.
Press Release, Microstaq Unveils Revolutionary Silicon Expansion Valve at Demo 2008, http://www.microstaq.com/pressReleases/prDetail_05.html (posted Sep. 8, 2008), accessed May 17, 2010.
Press Release, Nanotechnology Partnerships, Connections Spur Innovation for Fluid Control Industries, http://www.microstaq.com/pressReleases/prDetail_03.html (posted Jun. 9, 2005), accessed May 17, 2010.
Product Review, greentechZONE Products for the week of May 18, 2009, http://www.en-genius.net/site/zones/greentechZONE/product_reviews/grnp_051809, accessed May 17, 2010.
SMIC Announces Successful Qualification of a MEMS Chip for Microstaq, http://www.prnewswire.com/news-releases/smic-announces-successful-qualification-of-a-mems-for-microstaq-65968252.html (posted Oct. 26, 2009), accessed May 17, 2010.
SMIC quals Microstaq MEMS chip for fluid control, http://www.electroiq.com/ElectroiQ/en-us/index/display/Nanotech_Article_Tools_Template.articles.small-times.nanotechmems.mems.microfluidics.2009.10.smic-quals_microstaq.html, (posted Oct. 26, 2009), acc.
Tiny Silicon Chip Developed by Microstaq Will Revolutionize Car Technology, http://www.nsti.org/press/PRshow.html?id=160 (posted May 19, 2005), accessed May 19, 2005.
Turpin, Joanna R., Soft Economy, Energy Prices Spur Interest in Technologies, http://www.achrnews.com/copyright/BNP_GUID_9-5-2006_A_10000000000000483182, accessed May 18, 2010, Posted: Dec. 8, 2008.
Uibel, Jeff, The Miniaturization of Flow Control (Article prepared for the 9th International Symposium on Fluid Control Measurement and Visualization (FLUCOME 2007)), Journal of Visualization (vol. 11, No. 1, 2008), IOS Press.

* cited by examiner

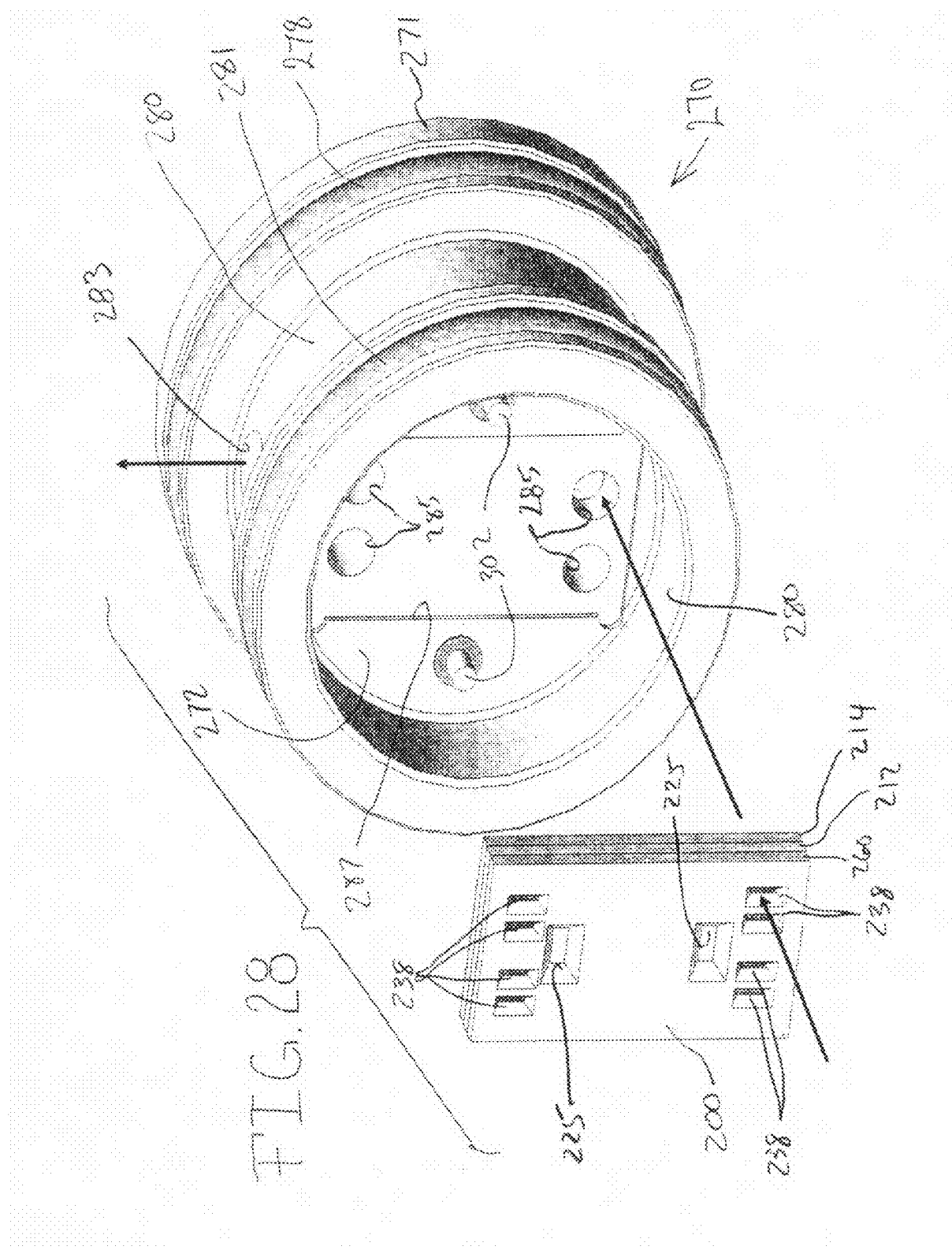

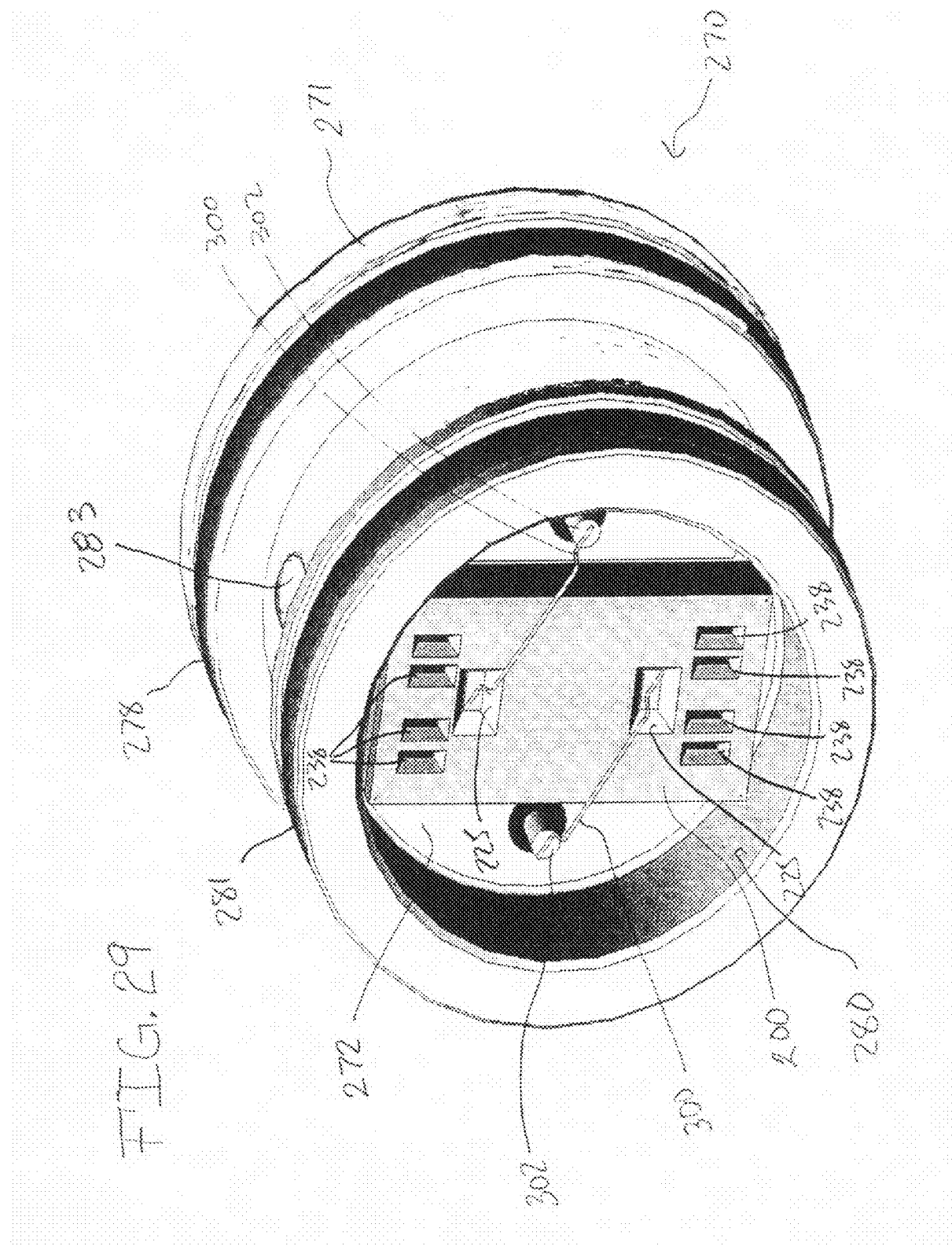

THERMALLY ACTUATED MICROVALVE WITH MULTIPLE FLUID PORTS

CROSS-REFERENCE TO RELATED APPLICATIONS

This application is a Continuation-In-Part of U.S. patent application Ser. No. 11/437,022 (filed May 18, 2006), now U.S. Pat. No. 7,210,502, which was a Continuation of PCT/US04/039517 (filed Nov. 24, 2004), which claims priority from both U.S. Provisional Application 60/559,355 (filed Apr. 2, 2004, expired) and U.S. Provisional Application 60/525,224 (filed Nov. 24, 2003, expired); this application is also a Continuation-In-Part of U.S. patent application Ser. No. 10/589,599 (filed Jul. 2, 2007), which was a Continuation of PCT/US05/005963 (filed Feb. 25, 2005), which claims priority from U.S. Provisional Application 60/548,563 (filed Feb. 27, 2004, expired). The disclosures of these applications are incorporated herein by reference.

STATEMENT REGARDING FEDERALLY SPONSORED RESEARCH OR DEVELOPMENT

This invention was made with United States Government support under cooperative agreement number 70NANB2H10A03 awarded by the National Institute of Standards and Technology (NIST). The United States Government has certain rights in the invention.

FIELD OF THE INVENTION

This invention relates to a MEMS (MicroElectroMechanical Systems) device in the form of a microvalve.

BACKGROUND OF THE INVENTION

MEMS (MicroElectroMechanical Systems) is a class of systems that are physically small, having features with sizes in the micrometer range. These systems have both electrical and mechanical components. The term "micromachining" is commonly understood to mean the production of three-dimensional structures and moving parts of these very small mechanical devices ("MEMS devices"). MEMS originally used modified integrated circuit (computer chip) fabrication techniques (such as chemical etching) and materials (such as silicon semiconductor material) to micromachine these very small mechanical devices. Today there are many more micromachining techniques and materials available. The term "microvalve" as used in this application means a valve having features with sizes in the micrometer range, and thus by definition is at least partially formed by micromachining. The term "microvalve device" as used in this application means a device that includes a microvalve, and that may include other components. It should be noted that if components other than a microvalve are included in the microvalve device, these other components may be micromachined components or standard sized (larger) components.

Various microvalve devices have been proposed for controlling fluid flow within a fluid circuit. A typical microvalve device includes a displaceable member or valve movably supported by a body and operatively coupled to an actuator for movement between a closed position and a fully open position. When placed in the closed position, the valve blocks or closes a first fluid port that is placed in fluid communication with a second fluid port, thereby preventing fluid from flowing between the fluid ports. When the valve moves from the closed position to the fully open position, fluid is increasingly allowed to flow between the fluid ports. U.S. Pat. No. 6,540,203 entitled "Pilot Operated Microvalve Device", the disclosures of which are hereby incorporated herein by reference, describes a microvalve device consisting of an electrically operated pilot microvalve and a pilot operated microvalve who position is controlled by the pilot microvalve. U.S. Pat. No. 6,494,804 entitled "Microvalve for Electronically Controlled Transmission", the disclosures of which are hereby incorporated herein by reference, describes a microvalve device for controlling fluid flow in a fluid circuit, and includes the use of a fluid bleed path through an orifice to form a pressure divider circuit. The two US patents mentioned above are multilayer microvalves in that the valve bodies are formed of multiple layers or plates. These layers may be formed and joined in any suitable fashion, including those disclosed in U.S. Patent Application Publication No. US 2002/0174891A, the disclosures of which are incorporated herein by reference.

BRIEF SUMMARY OF THE INVENTION

The present invention is directed to a MEMS device in the form of a microvalve that includes a valve body formed of multiple planar layers. A cavity is defined by an intermediate plate layer of the valve body. An elongated beam having a first end, a second end, and a central portion disposed between the first end and the second end is disposed in the cavity. A first point on the central portion of the beam is attached to a fixed portion of the intermediate plate layer by a flexible hinge. A second point on the central portion of the beam is attached to an actuator disposed in the intermediate plate layer. The actuator can be selectively actuated to move the beam in a plane parallel to the plate layers between a first and a second position, while the hinge flexes to accommodate motion of the beam. A first port communicating with the cavity is formed in one of two plate layers on opposite sides of the intermediate plate layer, in a location where communication between the first port and the cavity is substantially blocked by the first end of the beam when the beam is in the first position thereof. A second port communicating with the cavity is formed in one of the two plate layers on opposite sides of the intermediate plate layer, in a location where communication between the second port and the cavity is substantially blocked by the second end of the beam when the beam is in one of the first position and the second position thereof.

According to a second aspect, the invention is directed to a microvalve comprising two three-way microvalves operated by a common microvalve actuator.

Various advantages and applications of this invention will become apparent to those skilled in the art from the following detailed description of the preferred embodiment, when read in light of the accompanying drawings.

BRIEF DESCRIPTION OF THE DRAWINGS

FIG. 28 is an exploded perspective view of a plug similar to that of FIG. 23, assembled with the MEMS device of FIG. 25, FIG. 26, and FIG. 27.

FIG. 29 is a perspective view of the plug and MEMS device of FIG. 28.

DETAILED DESCRIPTION OF THE INVENTION

Figure 1:
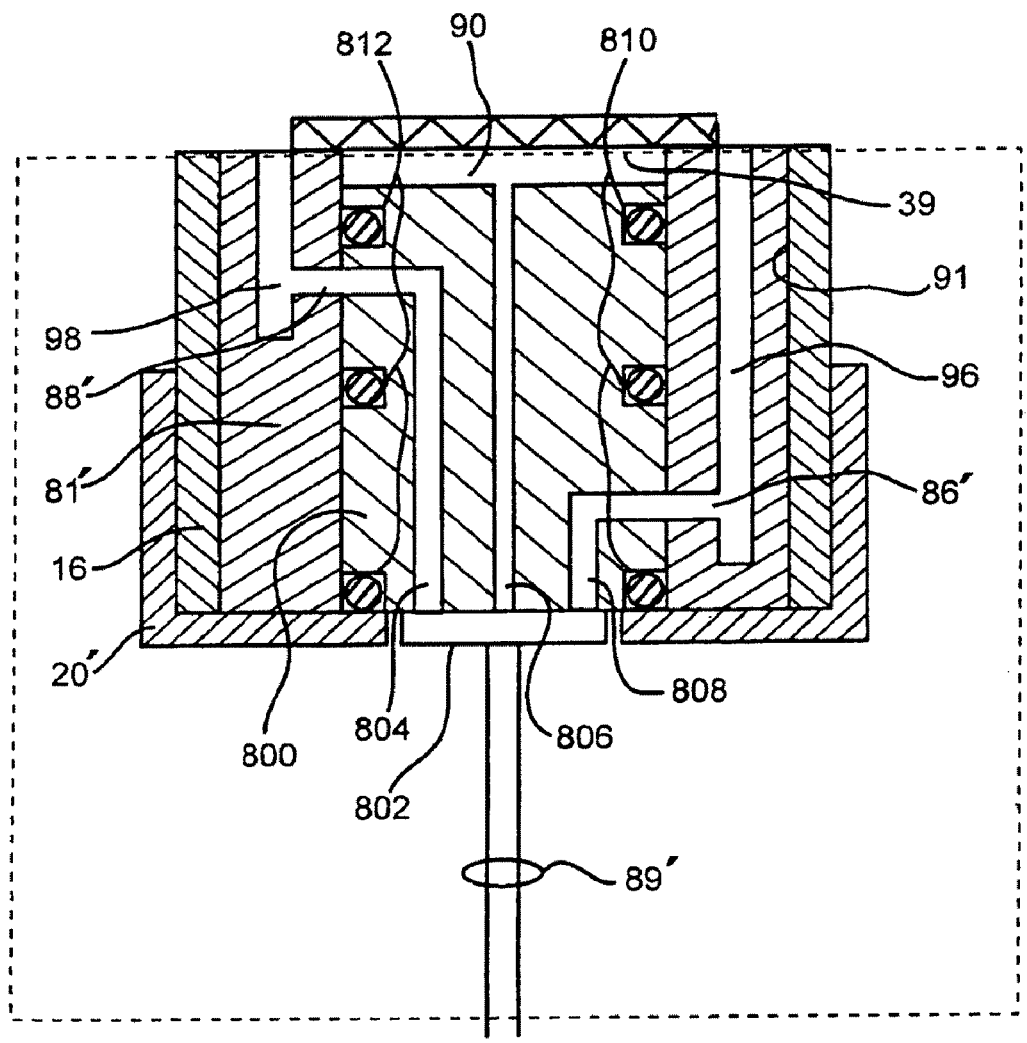
FIG. 1 is a sectional view of a fluid distributing manifold having a microvalve device mounted thereon.

In the following description of the invention, certain terminology will be used for the purpose of reference only, and are not intended to be limiting. Terms such as "upper", "lower", "above", "below", "rightward", "leftward", "clockwise", and "counterclockwise" refer to directions in the drawings to which reference is made. Terms such as "inward" and "outward" refer to directions toward and away from, respectively, the geometric center of the component described. Terms such as "front", "rear", "side", "leftside", "rightside", "top", "bottom", "horizontal", and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

Figure 2:
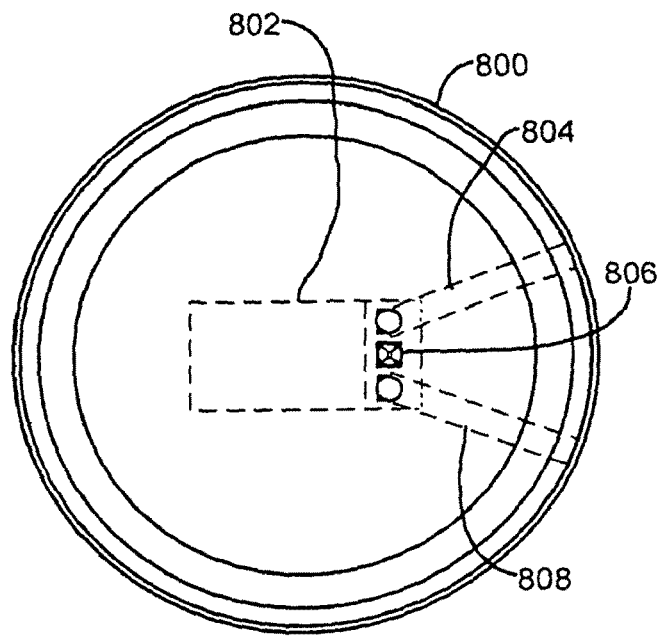
FIG. 2 is a bottom view of the a manifold plug with the microvalve device of FIG. 1 mounted thereon.
Figure 3:
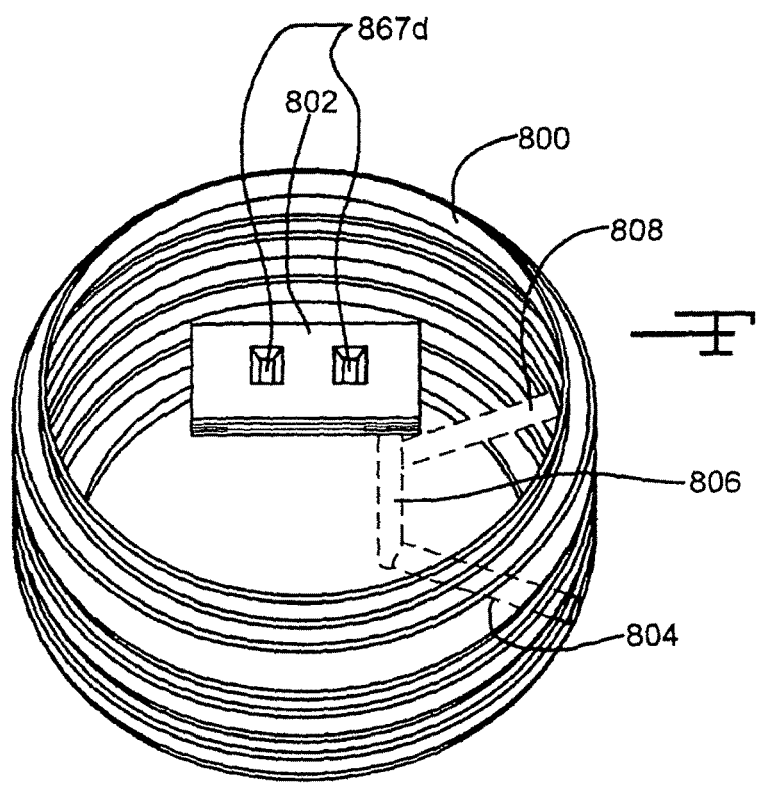
FIG. 3 is a perspective view of the plug of FIG. 2 with the microvalve device of FIG. 1 mounted thereon.

FIG. 1, FIG. 2 and FIG. 3, illustrate a MEMS device in the form of a microvalve 802. The microvalve 802 is illustrated mounted on a manifold in the form of a plug 800. The plug 800 facilitates fluid communication between various ports of the microvalve 802, to be described below, and a system in which the microvalve 802 may be installed. It will be apparent that the design of the plug will likely vary according to the system in which the microvalve 802 is installed, and, indeed, the plug 800 may be integrated into other components of the system into which the microvalve 802 is installed. As discussed in U.S. patent application Ser. No. 11/437,002, to which priority is claimed, one system in which the microvalve 802 may suitably be installed is in a control valve (not shown) for a variable displacement refrigerant compressor (not shown). Accordingly, this embodiment of the invention will be described in terms of such an installation. However, the microvalve according to the invention may be utilized in any suitable system, which may or may not be a refrigeration or air conditioning system.

A reference valve carrier 81' defines a reference chamber port generally indicated as a reference inlet port 88' in fluid communication with a source of high pressure fluid 98, such as the discharge of the refrigerant compressor. The reference valve carrier 81' also defines a reference outlet port 86' in fluid communication with a low pressure area 96, such as the suction of the refrigerant compressor.

The plug 800 is disposed in the reference valve carrier 81'. The plug 800 is generally cylindrical. The plug 800 includes three o-ring grooves 810 circumferentially formed about the surface of the plug 800. There is an o-ring 812 disposed in each o-ring groove 810. Each o-ring 812 forms a seal between the plug 800 and the reference valve carrier 81'.

The plug 800 includes a discharge fluid passageway 804, a reference fluid passageway 806, and a suction fluid passageway 808. The microvalve 802 is mounted upon the plug 800 opposite a reference chamber 90. The microvalve 802 is preferably mounted by a plurality of solder point connections (not shown). The points of solder connection between the plug 800 and the microvalve 802 preferably includes the areas on the plug 800 around the passageways 804, 806 and 808, and do not include an area under an actuator 867 (shown in FIG. 4) of the microvalve 802. However, it must be understood that the microvalve 802 may be mounted in any suitable manner, such as those described in U.S. Pat. No. 6,581,640 entitled "Laminated Manifold for Microvalve", the disclosures of which are hereby incorporated herein by reference, which describes a terminal block is fixed to manifold for a microvalve by any suitable means, such as a mechanical fastener, such as a rivet or a bolt, by a suitable adhesive, or by soldering.

The discharge fluid passageway 804 and the reference inlet port 88' cooperate to allow fluid communication between the source of high pressure fluid 98 and the microvalve 802. The reference fluid passageway 806 allows fluid communication between the reference chamber 90 and the microvalve 802. The suction fluid passageway 808 and the reference outlet port 86' cooperate to allow fluid communication between the low pressure area 96 and the microvalve 802.

The microvalve 802 is electrically connected to a compressor control unit (not shown) by wires 89'.

As is described in parent U.S. patent application Ser. No. 11/437,002, positioning of the control valve for the refrigerant compressor is achieved by controlling the pressure in the reference chamber 90. Since the control valve controls the operation of the refrigerant compressor, by controlling the pressure in the reference chamber, operation of the refrigerant compressor is controlled. In the past, macro-sized (i.e., not MEMS) valves, in particular solenoid operated valves, have been used to provide selective communication between the reference fluid passageway 806 (and the reference chamber 90) and either the discharge fluid passageway 804 or the suction fluid passageway 808. We have discovered that a microvalve or set of microvalves can be utilized to provide such selective communication. More specifically, the microvalve 802 is operated to by the compressor control unit to suitably change pressure in the reference chamber 90 to position the control valve as needed to achieve the desired operation of the compressor. If it is desired to raise pressure in the reference chamber 90, the microvalve 802 is operated to connect the source of high pressure fluid 98 to the reference chamber 90 via the discharge fluid passageway 804 and the reference fluid passageway 806. Communication between the reference fluid passageway 806 and the low pressure area 96 via the suction fluid passageway 808 is blocked by the microvalve 802. Conversely, if it is desired to lower pressure in the reference chamber 90, the microvalve 802 is operated to connect the reference fluid passageway 806 and the low pressure area 96 via the suction fluid passageway 808. Communication between the source of high pressure fluid 98 and the reference chamber 90 via the discharge fluid passageway 804 and the reference fluid passageway 806 is blocked by the microvalve 802. In some embodiments of the microvalve 802 that are envisioned, it may not be possible to hold the pressure in the reference chamber 90 constant because the microvalve 802 can only operate in a pressure increase position and a pressure decrease position. In other embodiments of the microvalve 802 that are envisioned, the microvalve 802 can be operated to simultaneously block communication the discharge fluid passageway 804, the reference fluid passageway 806, and the suction fluid passageway 808; with the reference fluid passageway 806 and the reference chamber 90 with which the reference fluid passageway 806 thus isolated, pressure in the reference chamber 90 is held constant. In yet other embodiments of the microvalve 802 that are envisioned, the microvalve 802 can be operated to simultaneously throttle communication between the discharge fluid passageway 804 and the reference fluid passageway, and between the reference fluid passageway 806 and the suction fluid passageway 808. In this manner, the amount of fluid flowing into the reference fluid passageway from the discharge fluid passageway 804 is controlled to be equal to the amount of fluid flowing from the reference fluid passageway 806 into the suction fluid passageway 808. Since the amount of fluid within the reference fluid passageway 806 and the reference chamber 90 with which the reference fluid passageway 806 communicates is thus unchanging, the pressure in the reference chamber 90 is held constant.

Figure 4:
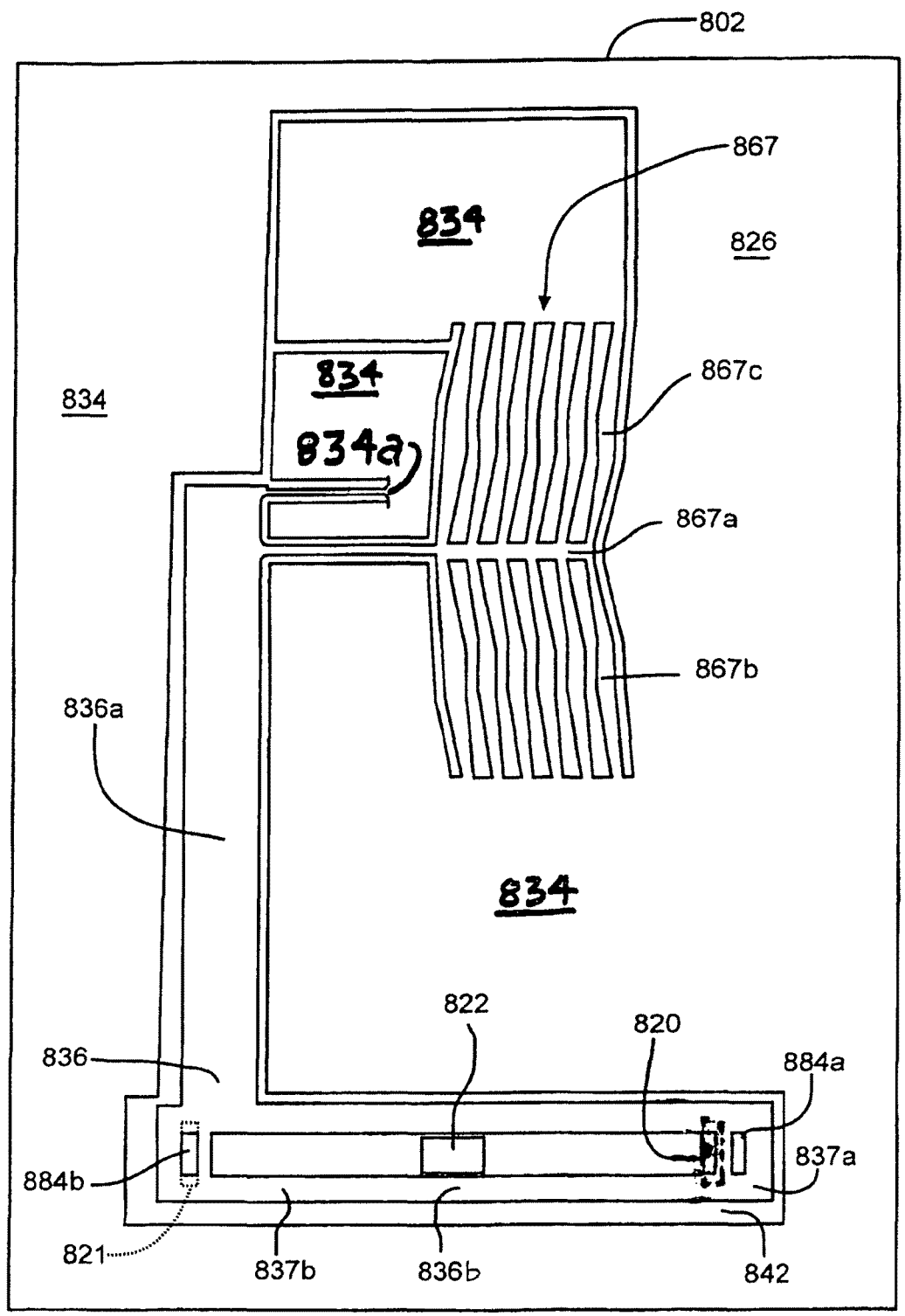
FIG. 4 is a top plan view of an embodiment of the microvalve device of FIG. 1, which is partially broken away to show the movable components of the microvalve device.

FIG. 4 is a top plan view of a single intermediate layer of an embodiment of the microvalve 802 illustrated in FIG. 1. The microvalve 802 includes a plate 826 defining a cavity 842. The plate (layer) 826 is sandwiched between two other plates (only one of which may be seen in FIG. 4, through the cavity 842 in the plate 826) shown), which are fixed to fixed portions of the plate 826 about the cavity 842 in a leak-proof manner, so as to enclose the cavity 842. A generally "L-shaped" valve (moveable element) 836 is disposed in the cavity 842 for movement between a first position (as shown) and a second position (not shown). The valve 836 includes an elongated beam 836a attached to a fixed portion 834 of the plate 826 via a flexible hinge 834a. A blocking portion 836b extends from a free end of the beam 836a. Preferably, the blocking portion 836b extends at an angle approximately ninety degrees from a respective side of the beam 836a. Alternatively, the blocking portion 836b may extend from the beam 836a at any suitable angle. Preferably, the blocking portion 836b will be substantially the same plane as the beam 836a. The blocking portion 836b includes a first portion 837a and a second portion 837b. The first portion 837a alternately unblocks and blocks a first micro port 820 defined through the plate adjacent to the plate 826. The second portion 837b blocks and unblocks a second micro port 821 (shown in dashed lines) defined through the plate adjacent to the plate 826 when the valve 836 moves between the first and second positions. The blocking portion 836b allows for selective fluid communication of the first micro port 820 and the second micro port 821 with a third micro port 822 defined through the plate adjacent to the plate 826. The first micro port 820 is in fluid communication with the suction fluid passageway 808. The second micro port 821 is in fluid communication with the discharge fluid passageway 804. The third micro port 822 is in fluid communication with the reference fluid passageway 806. The valve 836 is operable to selectively allow fluid communication between the suction fluid passageway 808 and the reference fluid passageway 806 and between the discharge fluid passageway 804 and the reference fluid passageway 806.

In FIG. 4, the valve 836 is shown allowing fluid communication between the suction fluid passageway 808 (via the first micro port 820) and the reference fluid passageway 806 (via the third micro port 822), which is the preferred normal (non-actuated) position when controlling some common types of variable displacement refrigerant compressor control valves. Not shown is the valve 836 positioned to allow fluid communication between the discharge fluid passageway 804 (via the second micro port 821) and the reference fluid passageway 806, which is preferably obtained in the actuated position thereof.

Preferably, the blocking portion 836b defines a first micro vent 884a, which extends between upper and lower surfaces of the valve 836. When the valve 836 is in the actuated position (not shown), the first micro vent 884a is in fluid communication with the first micro port 820 defined through the plate adjacent to the plate 826 and a first micro trough (not shown, defined in the other plate—also not shown—that is adjacent to the plate 826). U.S. Pat. No. 6,540,203 entitled "Pilot Operated Microvalve Device", the disclosures of which are hereby incorporated herein by reference, describes a similar vent and trough arrangement suitable for use in a microvalve and explains the purpose of the micro vents. As such, the first micro vent 884*a* maintains fluid communication between the first micro port 820 and the first micro trough (not shown) through the valve 836 when in the activated position. The blocking portion 836*b* also defines a second micro vent 884*b*, which extends between the upper and lower surfaces of the valve 836. Similar to the arrangement between the first micro vent 884*a*, the first micro port 820, and the first micro trough (not shown), the second micro vent 884*b* is in fluid communication with the second micro port 821 and a second micro trough (not shown) when the valve 836 is in the illustrated normal (non-actuated) position.

The plate 826 further includes the valve actuator indicated generally at 867. The actuator positions the beam 836*a*. The actuator 867 includes an elongated spine 867*a* attached to the beam 836*a*. The actuator 867 further includes multiple pairs of generally opposing first ribs 867*b* and second ribs 867*c*. Each first rib 867*b* has a first end attached to a first side of the spine 867*a* and a second end attached to the fixed portion 834. Similar to the first ribs 867*b*, each second rib 867*c* has a first end attached to a second side of the spine 867*a* and a second rib end attached to the fixed portion 834. The ribs 867*b*, 867*c* are designed to thermally expand (elongate) and contract. Electrical contacts 867*d* (shown in FIG. 3) are adapted for connection to a source of electrical power to supply electrical current flowing through the ribs 867*b* and 867*c* to thermally expand the ribs 867*b* and 867*c*. The actuator 867 is adapted to be controlled by an electronic control unit such as the compressor control unit (not shown). Because each of the generally opposed ribs 867*b* and 867*c* are attached at a slight angle to the spine 867*a*, in a herringbone pattern, when the ribs 867*b* and 867*c* elongate, they act to urge the spine 867*a* leftward (as viewed in FIG. 4), pushing the beam 836*a* leftward. The hinge 834*a* resists leftward movement of the adjacent portion of the beam 836*a*. The resultant force couple bends the hinge 834*a* as the valve 836 pivots to the actuated position thereof. De-energizing the electrical contacts 867*d* allows the ribs 867*b* and 867*c* to cool and shorten, so that the actuator 867 pulls the valve 836 back to the illustrated normal position thereof.

Figure 5:
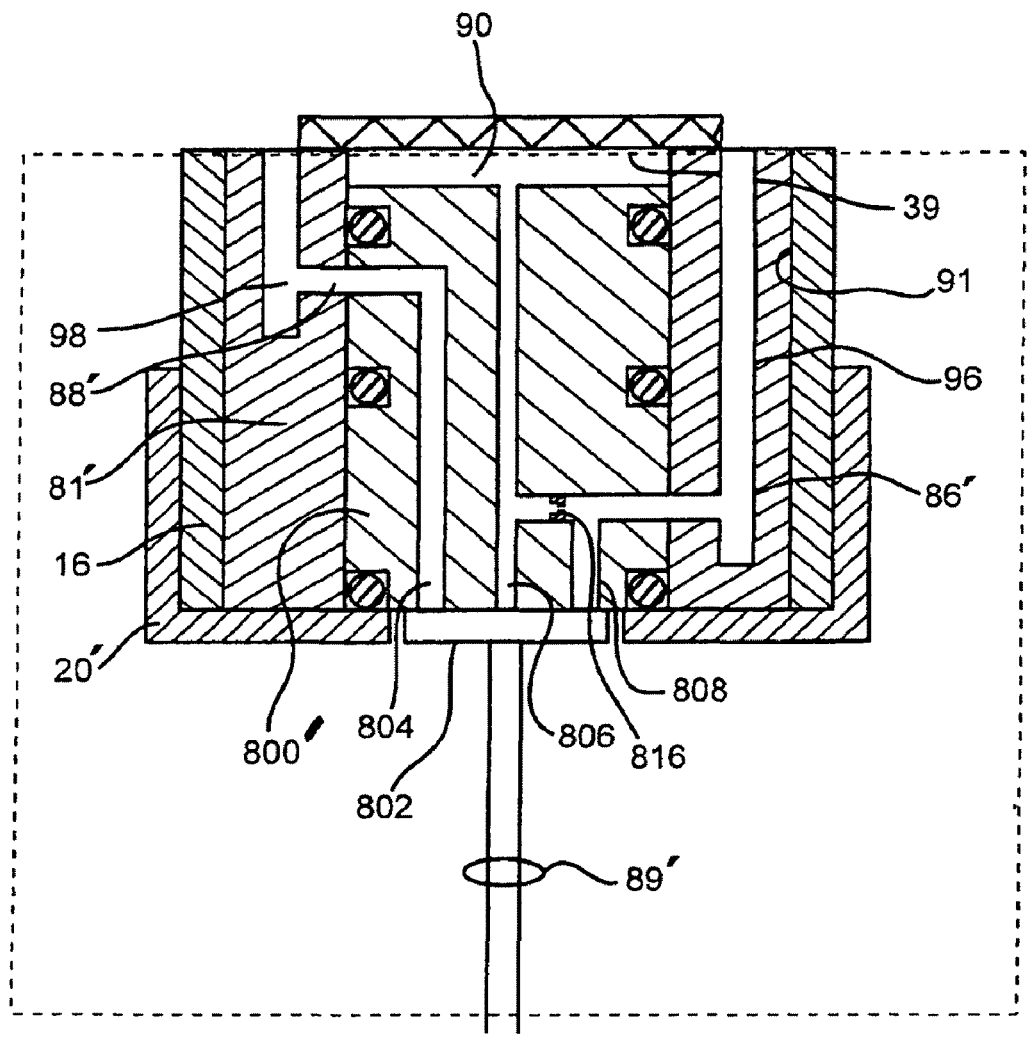
FIG. 5 is a sectional view similar to the view of FIG. 1, but showing a different embodiment of a fluid distributing manifold.

Referring now to FIG. 5, a plug 800' is shown. The plug 800' is generally similar to the plug 800, except that the plug 800' includes an orificed constant bleed path 816 formed in the plug 800' between the reference fluid passageway 806 and the suction fluid passageway 808. The orificed constant bleed path 816 allows constant fluid communication between the reference fluid passageway 806 and the suction fluid passageway 808. The fluid communication is restricted by the orificed constant bleed path 816 such that fluid pressure may still build up in the reference chamber 90 when the microvalve 802 allows fluid communication from the source of high pressure fluid 98 through the reference inlet port 88' and the reference fluid passageway 806 to the reference chamber 90, but with a high degree of control. With a higher flow rate of fluid flow through the microvalve 802, due to the constant bleed off of some fluid to the suction fluid passageway 808, it is easier to make small percentage variations in the flow rate of fluid through the microvalve 802.

Figure 6:
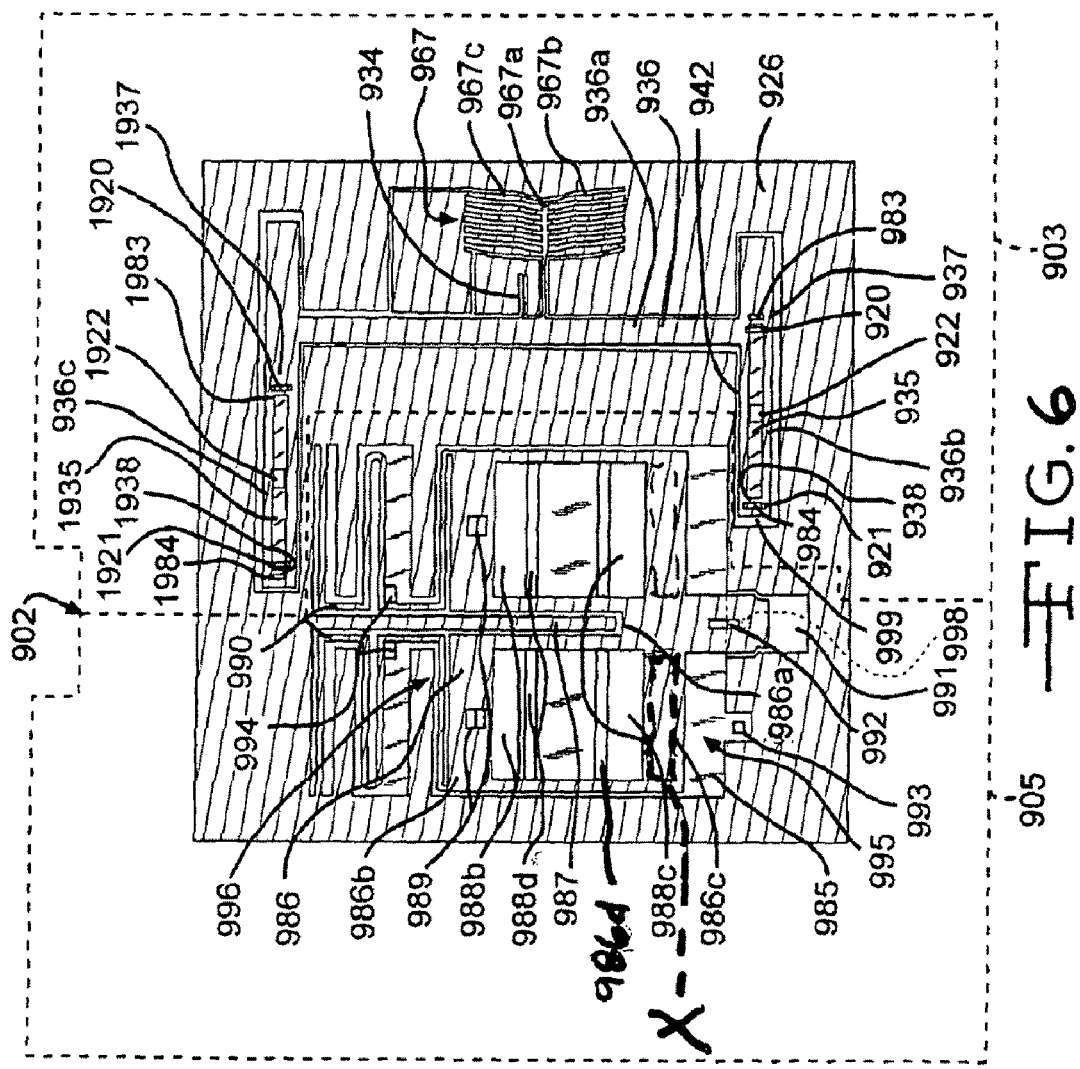
FIG. 6 is a top plan view of an intermediate layer of a pilot operated MEMS micro spool valve portion mounted to be positioned by a pair of pilot microvalve that are actuated by a single common microvalve actuator.

Referring now to FIG. 6, a MEMS device is shown generally at 902. The MEMS device 902 generally includes a first microvalve forming a pilot portion (four-way pilot microvalve) 903 and a second microvalve forming a spool portion (two-way pilot operated microvalve) 905, as shown in dashed lines. The MEMS device 902 is believed to be suitable for use as a control for a refrigerant compressor valve, among other applications. Conceptually, the microvalve of the spool portion 905 may be compared to the control valve discussed above with respect to FIG. 1 that is responsive to the pressure in the reference chamber 90, while the microvalve of the pilot portion 903 may be compared to the microvalve 802 that controls the pressure in the reference chamber 90. This analogy is viable because the pilot portion 903 controls operation of the spool portion 905, which in turn controls the flow of fluid to the load of the MEMS device 902 (such as the flow of fluid into the crankcase of the refrigerant compressor discussed above to control operation of the refrigerant compressor, for example). FIG. 6 is a sectional view of a layer of the MEMS device 902.

The MEMS device 902 includes an intermediate plate layer 926 forming an intermediate plate layer of a multi-layer valve body of the MEMS device 902. The layers are fabricated and joined together in any suitable fashion, such as that of U.S. Pat. Nos. 6,540,203 and 6,494,804 and US Patent Application Pub. No. 2002/017489141, discussed above, and other similar multi-layer microvalves.

The pilot portion 903 includes a cavity 942 defined by a fixed portion of the intermediate plate layer 926. A generally "I-shaped" pilot valve (pilot microvalve movable portion) 936 is disposed in the cavity 942. The pilot valve 936 includes an elongated beam 936*a* attached to the fixed portion of the intermediate plate layer 926 by a flexible hinge 934 and an actuator, indicated generally at 967 and described more fully below, for moving the "I-shaped" pilot valve 936 between a first, unactuated or de-energized position (as shown) and a second, actuated or energized position (not shown). Blocking portions 936*b* and 936*c* extends from opposite free ends of the beam 936*a*. Preferably, the blocking portions 936*b* and 936*c* extend at an angle of approximately ninety degrees from respective sides of the beam 936*a*, though, the blocking portions 936*b* and 936*c* may extend from the beam 936*a* at any suitable angle. Preferably, the blocking portions 936*b* and 936*c* will be disposed in substantially the same plane as the beam 936*a* and more preferably the blocking portions 936*b* and 936*c* are formed integrally with the beam 936*a* from the plate of material forming the intermediate plate layer 926. Indeed, all of the moving and stationary portions of the MEMS device 902, discussed with respect to FIG. 6, are formed from the plate of material forming the intermediate plate layer 926, except as specifically indicated below.

Figure 7:
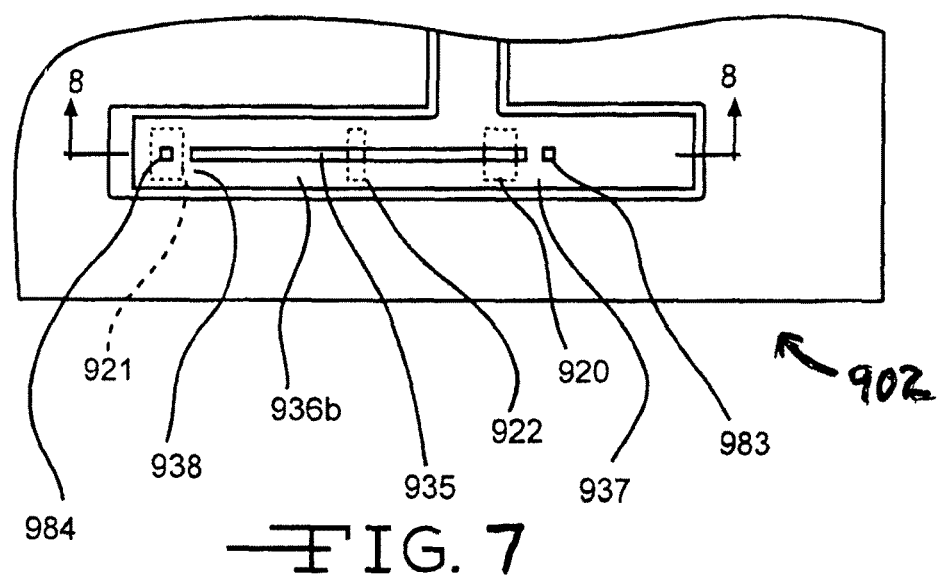
FIG. 7 is an enlarged view of a portion of the layer of the micro spool valve of FIG. 6.
Figure 8:
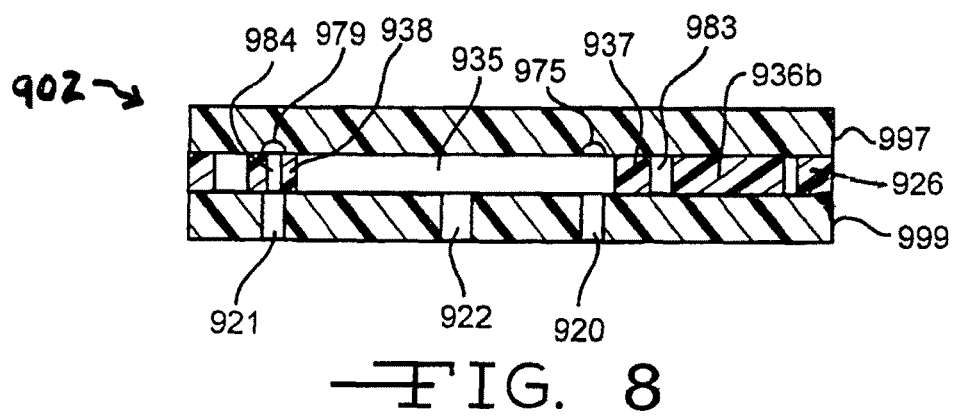
FIG. 8 is a side view of the portion of FIG. 7 taken along the lines 8-8.

As best seen in FIG. 7 and FIG. 8, the blocking portion 936*b* includes a first portion 937 and a second portion 938. The first portion 937 unblocks and blocks a first micro port 920 formed through a lower plate layer 999 (see FIG. 8) of the MEMS device 902 adjacent to the intermediate plate layer 926 when the pilot valve 936 moves between the first and second positions, respectively. The second portion 938 blocks and unblocks a second micro port 921 (shown in dashed lines) formed through the adjacent lower plate layer 999 when the pilot valve 936 moves between the first and second positions, respectively. The blocking portion 936*b* has an internal passage 935 formed therein that allows for selective fluid communication between the unblocked one of the first micro port 920 and the second micro port 921 with a third micro port 922.

In the illustrated embodiment, the first portion 937 and the second portion 938 are proportioned and spaced apart such that, as the pilot valve 936 transitions from the first position (unactuated state) to the second position (fully actuated state), or from the fully actuated state to the unactuated state, the first and second micro ports 920 and 921 are simultaneously partially unblocked and in communication with the third micro port 922 via the passage 935. It is contemplated, however, that the first portion 937 and the second portion 938 may, in an alternate embodiment, be proportioned and spaced apart such that, as the pilot valve 936 transitions from the unactuated state to the fully actuated state, or from the fully actuated state to the unactuated state, the first micro ports 920 and 921 are simultaneously blocked from communication with the third micro port 922 via the passage 935. In such an embodiment, the third micro port 922 would be in communication with the first micro port 920 when the pilot valve 936 is in the unactuated state, the third micro port 922 would be in communication with neither the first micro port 920 or the second micro port 921 at an intermediate actuated point (between the first position and the second position), and the third micro port is in fluid communication only with the second micro port 921 when the pilot valve 936 is in the fully actuated position.

Referring now also to FIG. 7 and FIG. 8, the blocking portion 936*b* preferably defines a first micro vent 983, which extends between upper and lower surfaces of the pilot valve (microvalve) 936 to provide pressure balancing in a direction perpendicular to the intermediate plate layer 926. When the pilot valve 936 is in the actuated position, the first micro vent 983 is in fluid communication with the first micro port 920 and a first micro trough 975 formed in a layer 997 of the MEMS device 902 adjacent to the intermediate plate layer 926. U.S. Pat. No. 6,540,203 entitled "Pilot Operated Microvalve Device", the disclosures of which are hereby incorporated herein by reference, describes a similar vent and trough arrangement suitable for use in a microvalve and explains the purpose of such micro vents. As such, the first micro vent 983 maintains fluid communication between the first micro port 920 and the first micro trough 975 through the pilot valve 936 when in the activated position. The blocking portion 936*b* also defines a second micro vent 984, which extends between the upper and lower surfaces of the pilot valve 936. Similar to the first micro vent 983, the second micro vent 984 provides pressure balancing between the upper and lower surfaces (as seen in FIG. 8) of the pilot valve 936. A second micro trough 979 is defined in the layer 997, opposite the second micro port 921 in the layer 999. The second micro trough 979 and the second micro vent 984 are in fluid communication with the second micro port 921 (shown in dashed lines in FIG. 7) when the microvalve 936 is in the illustrated normal, unactuated position.

Figure 9:
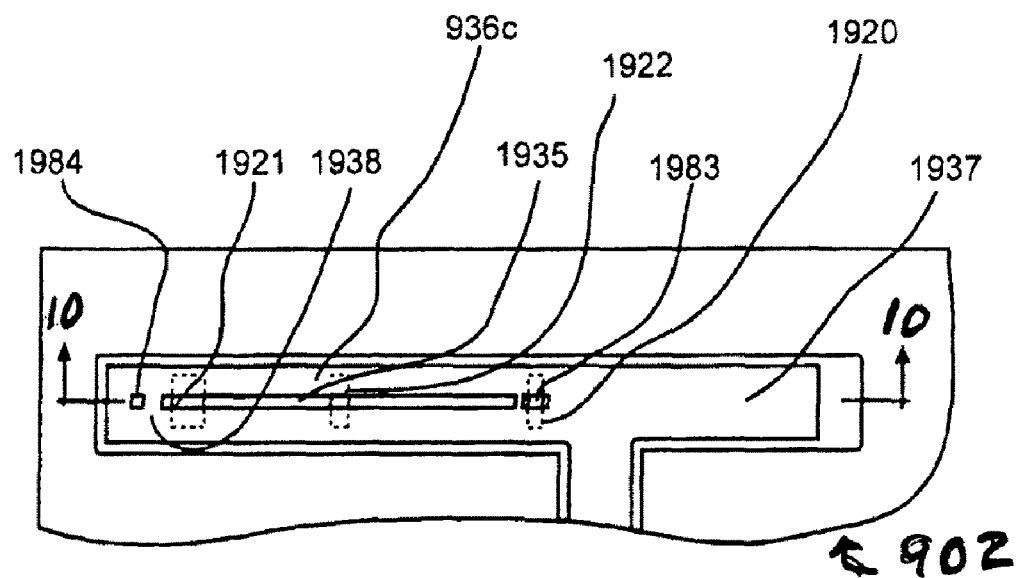
FIG. 9 is a view of a portion of the layer of the micro spool valve of FIG. 6.
Figure 10:
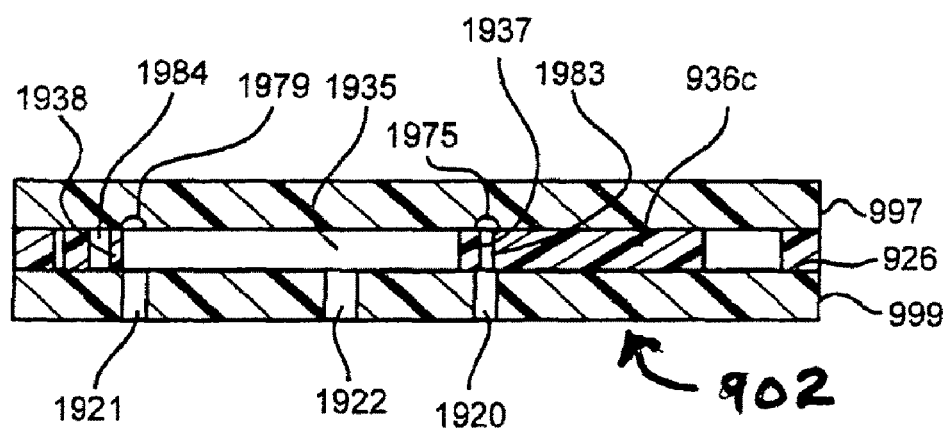
FIG. 10 is a side view of the portion of FIG. 9 taken along the lines 10-10.

Similarly, as best seen in FIG. 9 and FIG. 10, the blocking portion 936*c* includes a first portion 1937 and a second portion 1938. The first portion 1937 unblocks and blocks a first micro port 1920 (shown in dashed lines) when the pilot valve 936 moves between the first and second positions, respectively. The first micro port 1920 is formed through the lower plate layer 999 of the MEMS device 902 adjacent to the intermediate plate layer 926 (see FIG. 10). The second portion 1938 blocks and unblocks a second micro port 1921 when the pilot valve 936 moves between the first and second positions, respectively. The second micro port 1921 is formed through the adjacent lower plate layer 999. The blocking portion 936*c* has an internal passage 1935 formed therein that allows for selective fluid communication of the first micro port 1920 and the second micro port 1921 with a third micro port 1922. Similar to the first portion 937 and the second portion 938, the first portion 1937 and the second portion 1938 of the blocking portion 936*c* may suitably be proportioned and spaced apart to either permit simultaneous fluid communication between all three micro ports 1920, 1921, and 1922 in an intermediately actuated position, or to block the third micro port 1922 from communication with either of the first micro port 1920 and the second micro port 1921 when the pilot valve 936 is moved to an intermediate actuated position.

The blocking portion 936*c*, similar to the blocking portion 936*b*, defines a first micro vent 1983, which extends between upper and lower surfaces of the valve 936. When the pilot valve 936 is in the illustrated normal, unactuated position, the first micro vent 1983 is in fluid communication with the first micro port 1920 and a first micro trough 1975 formed in the layer 997, but the first micro port 1920 is blocked from communicating with the internal passageway 1935 that communicates with the third micro port 1922. The first micro vent 1983 maintains fluid communication between the first micro port 1920 and the first micro trough 1975 through the pilot valve 936 when in the normal, unactuated position to provide pressure balancing on opposite surfaces of the valve 936. When the pilot valve 936 is in the fully actuated position (not shown), the first micro vent 1983 is out of fluid communication with the first micro port 1920 and the first micro trough 1975, but the first micro port 1920 is connected in fluid communication with the third micro port 1922 through the internal passageway 1935.

The blocking portion 936*c* also defines a second micro vent 1984, which extends between the upper and lower surfaces of the pilot valve 936, for the same purpose, i.e., pressure balancing. Similar to the arrangement between the first micro vent 1983, the first micro port 1920, and the first micro trough 1975, the second micro vent 1984, the second micro port 1921, and a second micro trough 1979 are in fluid communication when the pilot valve 936 is in the actuated position (not illustrated).

It will be appreciated that the pilot valve 936 may be properly viewed as two microvalves (the blocking portions 936*b* and 936*c*) that are joined by the beam 936*a*, and operated by a single common microvalve actuator, the microvalve actuator 967. This arrangement provides for twice the flow through the pilot valve 936 than would be realized through the microvalves formed by a single one of the blocking portions 936*b* or 936*c*.

When the pilot valve 936 is in the fully actuated position (not shown), the second micro vent 1984 is in fluid communication with the second micro port 1921 and the second micro trough 1979, but the second micro port 1921 is isolated from the internal passageway 1935, and thus there is no fluid communication between the second micro port 1921 and the third micro port 1922. In contrast, when the pilot valve 936 is in the illustrated normal, unactuated position, the second micro vent 1984 is not in fluid communication with the second micro port 1921 or the second micro trough 1979, but the internal passageway 1935 provides fluid communication between the first micro port 1920 and the third micro port 1922 for pressure balancing.

It will be appreciated from the above description that the pilot valve 936 may be characterized as including two three-way microvalves joined by the beam 936*a* to be actuated in tandem by the actuator 967. The blocking portion 936*b* operates as the movable element of a first three-way valve by controlling fluid communication among the first micro port 920, the second micro port 921, and the third micro port 922. The blocking portion 936*c* operates as the movable element of a second three-way valve by controlling fluid communication among the first micro port 1920, the second micro port 1921, and the third micro port 1922. In conjunction, these two three-way microvalves function as a four-way microvalve, in that the pilot valve 936 has a fluid inlet connection (composed of the two micro ports 920 and 1920, which are connected to discharge pressure), an outlet connection (composed of the two micro ports 921 and 1921, which are connected to suction pressure), and first and second load connections (composed of the two micro ports 922 and 1922, which are connected to opposite ends of the spool valve 905).

Referring again to FIG. 6, the intermediate plate layer 926 further includes the valve actuator indicated generally at 967.

The actuator positions the beam 936a. The actuator 967 includes an elongated spine 967a attached to the beam 936a. The actuator 967 further includes multiple pairs of generally opposing first ribs 967b and second ribs 967c. Each first rib 967b has a first end attached to a first side of the spine 967a and a second end attached to the fixed portion of the intermediate plate layer 926. Similar to the first ribs 967b, each second rib 967c has a first end attached to a second side of the spine 967a and a second end attached to the fixed portion of the intermediate plate layer 926. The first ribs 967b and the second ribs 967c are slightly inclined relative to the spine 967a, so as to form a herringbone pattern.

Electrical contacts, such as the electrical contacts 867d, as shown in FIG. 3, are adapted for connection to a source of electrical power to supply electrical current flowing through the ribs 967b and 967c to heat the ribs 967b and 967c, and thus cause the ribs to elongate, pushing on the beam 936a via the spine 967a to move the pilot valve 936 an actuated position as the hinge 934 bends. When electrical current is decreased, ohmic heating is decreased and the ribs 967b and 967c shorten and pull on the beam 936a, moving the pilot valve 936 back toward the unactuated position. The actuator 967 is adapted to be controlled by an electronic control unit such as a compressor control unit.

The spool portion 905 includes a cavity 985 defined by the intermediate plate layer 926. A pilot operated microvalve in the form of a spool valve 986 is disposed in the cavity 985 for movement between a first position (as shown) and a second position (not shown). The spool valve 986 includes a longitudinally elongated central recessed portion 986a, which slidably engages an attached elongated guide beam fixed portion 987 of the intermediate plate layer 926. Preferably, the fixed portion 987 is bonded to both of the two layers (the lower layer 999 and the upper layer 997 of the multilayer valve body adjacent to the intermediate plate layer 926, thereby functioning as a pressure reinforcing member similar to the pressure reinforcing "peninsulas" described in WO 01/712261, the disclosures of which are hereby incorporated by reference.

The spool valve 986 includes blocking portions 986b and 986c, which are at opposite ends of the spool valve 986. Preferably, the blocking portions 986b and 986c are oriented at an angle approximately ninety degrees from a respective side of the recessed portion 986a. Alternatively, the blocking portions 986b and 986c may be oriented from the recessed portion 986a at any suitable angle. Preferably, the blocking portions 986b and 986c will be in substantially the same plane as the guide beam fixed portion 987. The blocking portion 986b progressively throttles communication between the pairs of micro ports 988b and 988c, in a proportional relationship, when the spool valve 986 moves between the first, unactuated position (illustrated) and the second, actuated position (which is lower—with respect to FIG. 6—in the cavity 985 than the unactuated position illustrated in FIG. 6).

Preferably, the micro ports 988b and 988c are separated by raised sealing areas 988d formed around each of the micro ports 988b and 988c. The sealing areas 988d fit closely against the blocking portions 986b and 986c when the blocking portions 986b and 986c are positioned adjacent the particular sealing area 988d, such there is no substantial leakage from the associated micro port 988b or 988c when the blocking portions 986b or 986c is covering the micro port 988b or 988c.

The blocking portions 986b and 986c are positionable to selectively allow fluid communication between the micro ports 988b and 988c, thus causing the spool valve 986 to act as a proportional two-way valve suitable for use as a control valve controlling the flow of fluid from the discharge of the refrigerant compressor to the crankcase of the refrigerant compressor (when the refrigerant compressor is of the type having a constant bleed path from the crankcase to the suction of the refrigerant compressor).

In an alternate arrangement, the micro ports 988c and the adjacent sealing portions 986d are formed through the lower layer 999 in positions outlined in dashed lines and indicated generally at X in FIG. 6. In this alternate arrangement, the blocking portion 986c blocks the micro port 988c when the spool valve 986 is in the illustrated first, unactuated position, and progressively unblocks the micro ports 988c as the spool valve 986 is actuated to the second, fully actuated position thereof (not shown).

In yet another arrangement, the openings in the spool valve 986 between the blocking portions 986b and 986c may be in continuous fluid communication with a third micro port (not shown) in the adjacent layer 997 or in the lower layer 999 in the region between the micro ports 988b and 988c on either side of the guide beam fixed portion 987. With this arrangement, with the micro ports 988c in the position illustrated in FIG. 6, the spool valve 986 can be connected to a system via the various micro ports, more specifically via the micro ports 988b to a source of pressurized fluid, such as the discharge of the refrigerant compressor, connected to a low pressure area such as the suction of the refrigerant compressor via the micro ports 988c, and connected to a hydraulic load such as a crankcase of the refrigerant compressor via the third micro port. Thus connected, the spool valve 986 selectively permits and prevents high pressure fluid from flowing to the load from the micro ports 988b while continuously permitting flow from the load to the low pressure area via a variable size opening into the micro ports 988c (since the blocking portion 986c never fully blocks the micro ports 988c). If, however, the micro ports 988c are instead formed in the positions X depicted by the dashed lines in FIG. 6, the spool valve 986 will act as a three-way valve, and will be able to selectively fully block flow between the load and the low pressure area through the micro ports 988c.

Depending on the relative spacing of the blocking portions 986b and 986c with respect to the spacing of the micro ports 988b and 988c, such a three-way spool valve 986 may be set to isolate the third micro port from both micro ports 988b and 988c when the spool valve 986 is in an intermediate position (between the illustrated unactuated position and a fully actuated position in which the micro ports 988c are as fully unblocked as possible). Alternatively, such a three-way spool valve 986 may be arranged so that the third micro port communicates with both micro ports 988b and 988c when the spool valve 986 is in the intermediate position.

In the illustrated preferred embodiment, the micro port 988b is in fluid communication with the discharge of the refrigerant compressor. The micro port 988c is in fluid communication with the crankcase and preferably, the crankcase is connected to the suction of the refrigerant compressor by a fixed orifice, not shown. The valve 902 is operable to selectively allow fluid communication between the discharge and the refrigerant compressor crankcase. The spool valve 986 is shown allowing fluid communication between the refrigerant compressor discharge and the crankcase thereof, which is the preferred normal, unactuated position. In the actuated position (not shown) the spool valve 986 prevents fluid communication between the discharge and the crankcase of the refrigerant compressor.

Preferably, the blocking portion 986b defines micro vents 989, which cooperate with micro troughs (not shown) in the adjacent layer 997 and the micro port 988b similar to the arrangement between the first micro vent 983, the first micro port 920, and the first micro trough 975, as previously discussed.

The intermediate plate layer 926 further includes spool valve springs 990. One end of each spring 990 is fixed to (and preferably integrally formed with) the fixed portion of the intermediate layer 926. The other end of each spring 990 is fixed to (and preferably integrally formed with) the spool valve 986. The springs 990 bias the spool valve 986 toward the illustrated unactuated, normal position. As shown, the springs 990 preferably have an "interrupted" sinuous pattern, with extensions of the fixed portion of the intermediate layer 926 extending inwardly toward a point near the beam 987. These extensions of the fixed portion function as a pressure reinforcing members similar to the pressure reinforcing "peninsulas" described in WO 01/712261. However, there is sufficient room between these extensions and the extensions of the fixed portion for the springs 990 to extend through and flex as the spool valve 986 moves between operating positions. Any suitable spring arrangement may be used, however, including, but not limited to, the non-interrupted sinuous spring design of the embodiment shown in FIG. 11, as will be described below.

The spool portion 905 preferably includes a dashpot 991 including a longitudinally extending portion of the spool valve 986 and a recess formed in the wall of the cavity 985, opposite the springs 990. The spool portion 905 preferably includes a feedback port 992 opposite the springs 990. A micro port 998 (as shown in dashed lines) is preferably formed in the lower plate layer 999 adjacent the dashpot 991 and beneath the spool valve 986. The micro port 998 is in fluid communication with the low pressure area (compressor suction).

When the spool valve 986 is at an intermediate region (preferably between 5% and 60% of total travel), the feedback port 992 provides fluid communication between the micro port 998 and a portion 995 of the cavity 985 between the spool valve 986 and the end wall of the cavity 985. The adjacent plate layers under and/or over the longitudinally extension of the spool valve 986 are recessed slightly to allow communication under and/or over the longitudinal extension of the spool valve 986 of the dashpot 991. Note that the adjacent plate layers are not recessed within the area adjacent the dashpot recess 991, and so the longitudinal extension of the spool valve 986 will seal the port 998 when the feedback port 992 is not in fluid communication therewith. For example, when the feedback port 992 is open, the micro port 998 connects the feedback port 992 to the low pressure area (the refrigerant compressor suction) causing the pressure to decrease on the end face of the spool valve 986 exposed to pressure in the portion 995 of the cavity 985. In such a case, when the feedback port 992 closes, the pressure will increase on the portion of the spool valve 986 exposed to pressure in the portion 995 of the cavity 985. The spool portion 905 will therefore respond to the balance of pressure induced forces acting thereon, and may be more finely controlled. The spool portion 905 may be moved between completely full open and completely full closed, or held a position in between these two positions. This is suitable for maintaining the pressure in the refrigerant compressor crankcase, as the spool portion 905 will connect a source of high pressure from the compressor discharge to the compressor crankcase as needed to offset the constant bleed to suction referred to above that is built into the compressor housing. It must be understood, however, that the spool portion 905 need not include the dashpot 991 or the feedback port 992. In such a case, the spool portion 905 will tend to move completely between full open and full closed and just open intermittently as needed to increase crankcase pressure.

The spool portion 905 further includes a micro port 993 and a pair of micro ports 994. The micro port 993 is in fluid communication with the micro port 922 and the micro ports 994 are in fluid communication with the micro port 1922. The micro ports 920 and 1920 are in fluid communication with the discharge of the refrigerant compressor and thus can act as supplies (sources of high pressure fluid) for the pilot portion 903. The micro ports 921 and 1921 are in fluid communication with the suction of the refrigerant compressor and thus can act as dumps (areas of low fluid pressure) for the pilot portion 903.

When the MEMS device 902 is in a de-energized state, the blocking portion 936b tends to maintain the micro port 920 in a normally open position and the micro port 921 in a normally closed position, and discharge pressure acts on the portion of the spool valve 986 exposed to pressure in the portion 995 of the cavity 985. When the MEMS device 902 is in a de-energized state, the blocking portion 936c tends to maintain the micro port 1920 in a normally closed position and the micro port 1921 in a normally open position, and suction pressure acts on a portion of the spool valve 986 exposed to pressure in a portion, generally indicated at 996, of the cavity 985. When the MEMS device 902 is in a de-energized state, the springs 990 tend to maintain the spool valve 986, such that micro ports 988b and 988c are in normally open positions. The pressure profiles in this state are the opposite of those in the energized state, discussed in the following paragraph.

When the actuator 967 is energized, moving the pilot valve 936 to an energized position thereof, the blocking portion 936b tends to maintain the micro port 920 in a closed position and the micro port 921 in an open position. The micro port 920 is connected to the discharge pressure and the micro port 921 is connected to suction pressure; the blocking portion in an energized position will thus allow suction pressure to be applied to the spool valve 986 through the micro port 922 via the connection to the micro port 993, so that suction pressure is communicated to the portion 995 of the cavity 985 to act on a portion of the spool valve 986. When the MEMS device 902 is in an energized state, the blocking portion 936c tends to maintain the micro port 1920 (connected to discharge pressure) in an open position and the micro port 1921 (connected to suction pressure) in a closed position, thus discharge pressure will be directed by the blocking portion 936c, via the micro port 1922 and the ports 994 to act on a portion of the spool valve 986 exposed to pressure in the portion 996 of the cavity 985. Thus, when the MEMS device 902 is in an energized state, the spool valve 986 traverses along the beam 987, such that the micro port 988b is closed and the micro port 988c is open.

Optionally, the actuator 967 may be partially energized, causing the micro ports 920, 1920, 921, and 1921 all to be at least partially open. A cross over will occur between the fluid acting on the respective ends of the spool valve 986 exposed to the pressure in the portion 995 and the portion 996 of the cavity 985. As pressure increases in the portion 995 of the cavity 985, the spool valve 986 will traverse the beam 987 such that the micro port 988b will start to open. Discharge from the micro port 988b will bleed into the micro port 988c. If the pressure applied to the portion of the spool valve 986 by fluid in the portion 995 becomes less than the pressure in the portion 996 of the cavity 985, then the spool valve 986 will begin to traverse the beam 987 in the opposite direction and begin to close the micro port 988b. In such a case, the feedback port 992 will close allowing the pressure to increase on the portion of the spool valve 986 exposed to pressure in the portion 995 of the cavity 985.

In the partially energized state, the spool valve 986 can be said to oscillate, preferably with relatively small oscillations, at a point determined relative to the energizing. The dashpot 991 is intended to dampen the oscillation of the spool valve 986 and generally slow the movement of the spool valve 986.

Figure 11:
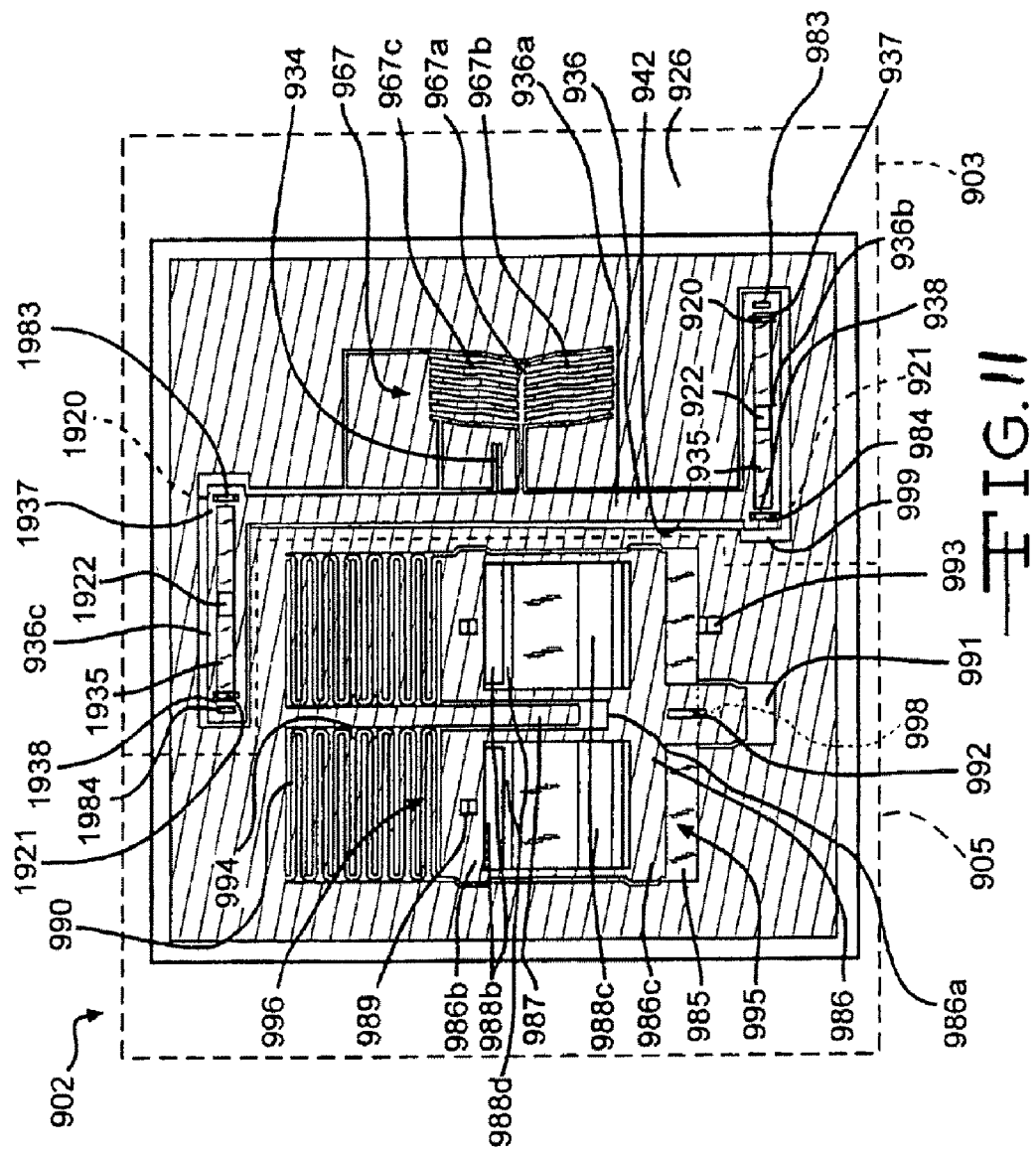
FIG. 11 is a view similar to FIG. 6, except showing a pilot microvalve portion and a micro spool valve according to alternative embodiments thereof.

FIG. 11 is a view similar to FIG. 6, except showing a micro spool valve according to an alternative embodiment, and similar components are labeled with similar numbers. One end of the beam 936*a* is connected to the second portion 938 of the blocking portion 936*b*, and the other end of the beam 936*a* is connected to the first portion 1937 of the blocking portion 936*c* so that the pilot valve 903 has a generally Z-shaped configuration. Also, in this embodiment, the springs 990 are uninterrupted by any extending fixed portions of the intermediate plate layer 926, so that the springs 990 have a continuous sinuous configuration rather than the interrupted sinuous configuration of the previous embodiment shown in FIG. 6. The spool valve 986 has a squared B-shaped configuration similar to that of the spool valve 986 in FIG. 6.

Figure 12:
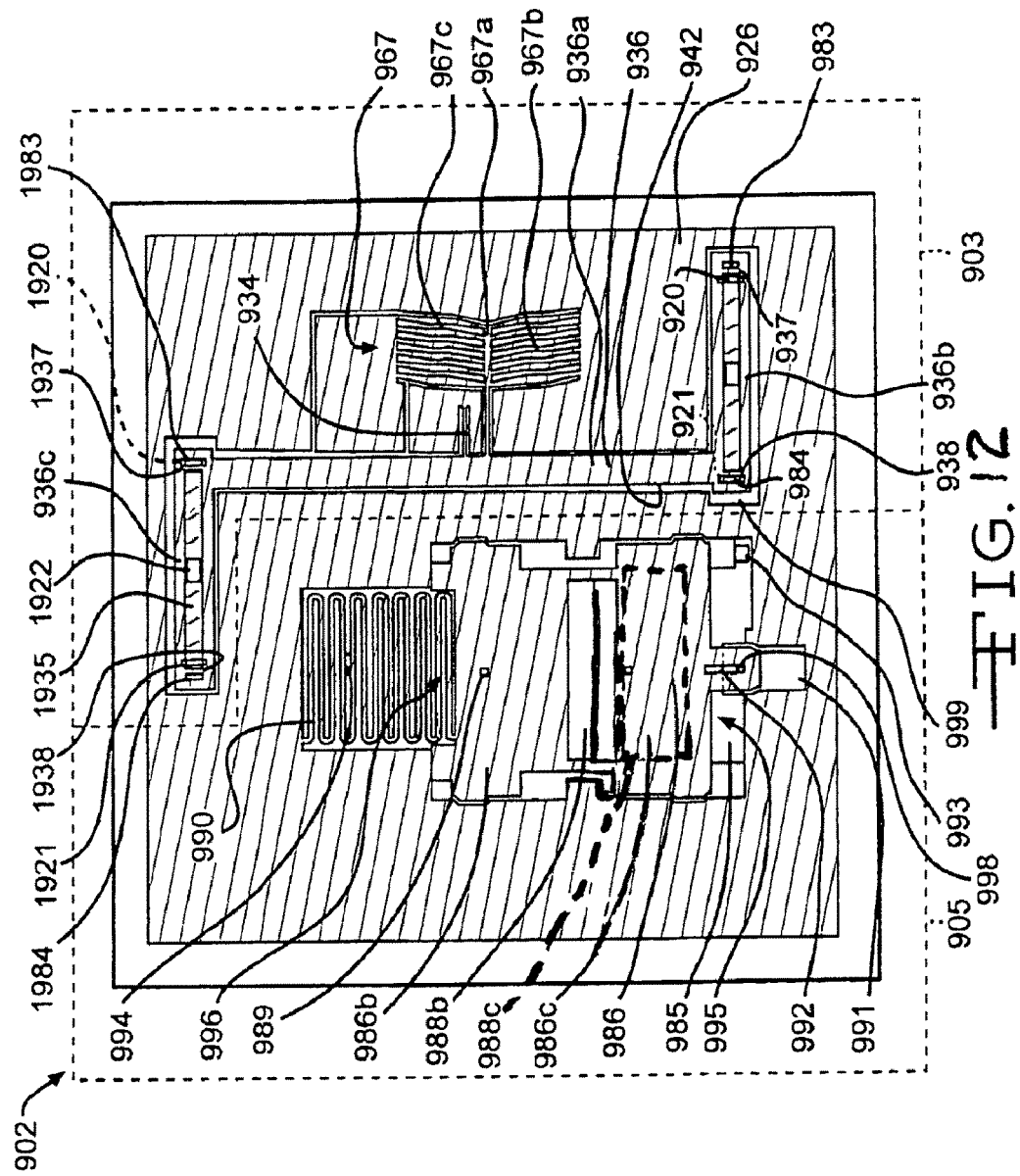
FIG. 12 is a view similar to FIG. 6, except showing a micro spool valve according to another alternative embodiment.

FIG. 12 is a view similar to FIG. 11, except showing a micro spool valve according to another alternative embodiment, and similar components are labelled with similar numbers. The spool valve 905 is provided with only a single spring 990 and there is no guide beam 987. The spool valve 986 thus has a squared O-shaped configuration rather than the squared B-shaped configuration of the spool valve 986 in FIG. 6. Only one micro port 988*b* and one micro port 988*c* are provided, with the micro port 988*c* being blocked by the spool valve 986 when the spool valve 986 is in the illustrated unactuated position, and the micro port 988*c* being unblocked when the spool valve 986 is moved to a fully actuated position.

Although the MEMS device 902 has been shown, in FIG. 6, FIG. 11, and FIG. 12, with the pilot portion 903 and the spool portion 905 having been formed integrally, the pilot portion 903 and the spool portion 905 may be formed separately. For example, FIG. 13, FIG. 14, and FIG. 15 show pilot portions and spool portion as being formed separately.

Figure 13:
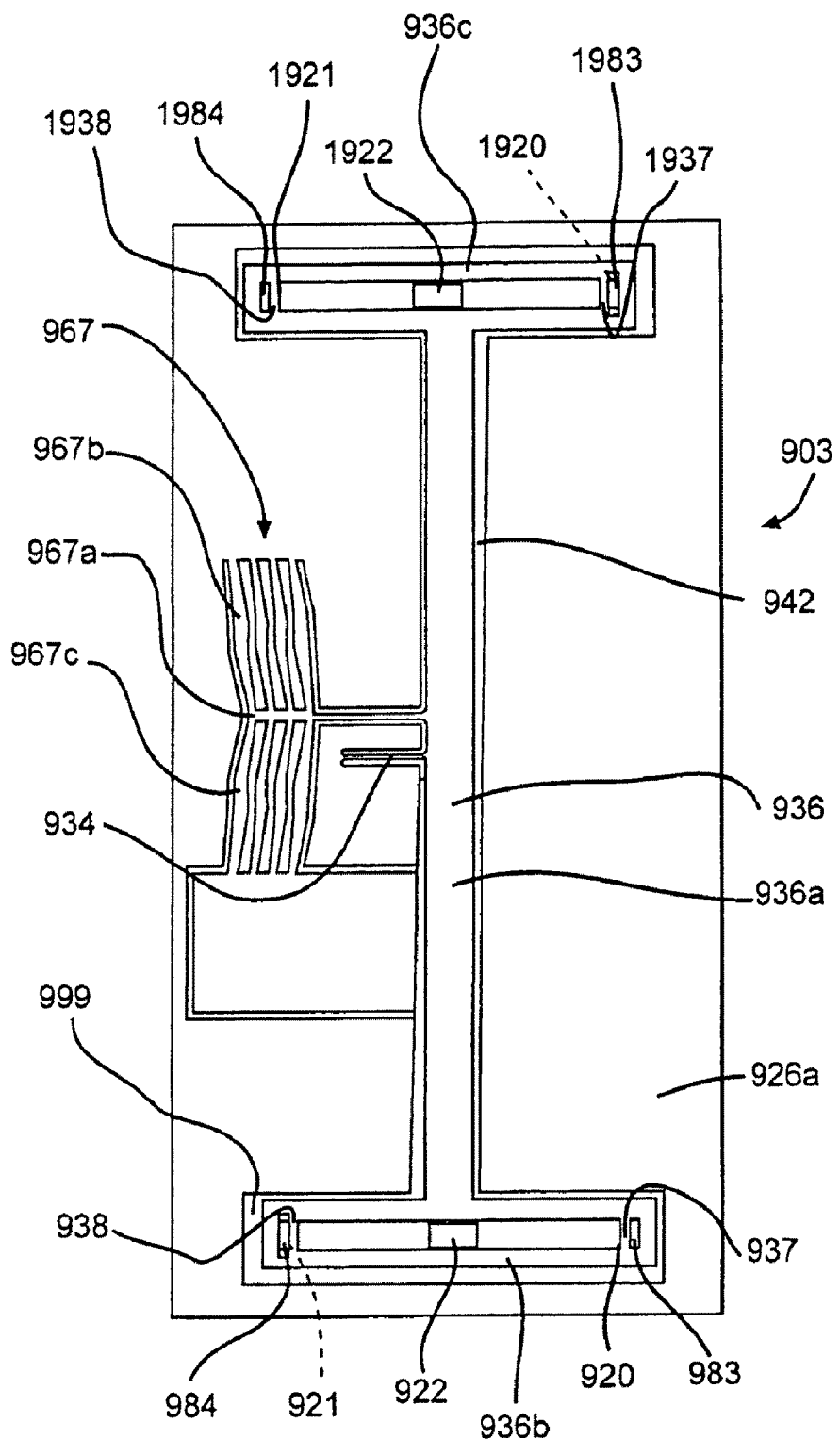
FIG. 13 is a view similar to the right side of FIG. 6, showing a layer of a MEMS device which consists of two microvalves driven by a single common microvalve actuator, and which can act as a pilot valve for operation of a spool valve.

FIG. 13 is a sectional view of a layer of a pilot portion of a micro spool valve (not shown) that is suitable for use as a microvalve in a microvalve operated control valve for a variable displacement compressor. FIG. 13 is a view similar to FIG. 6, and similar components are labeled with similar numbers.

Figure 14:
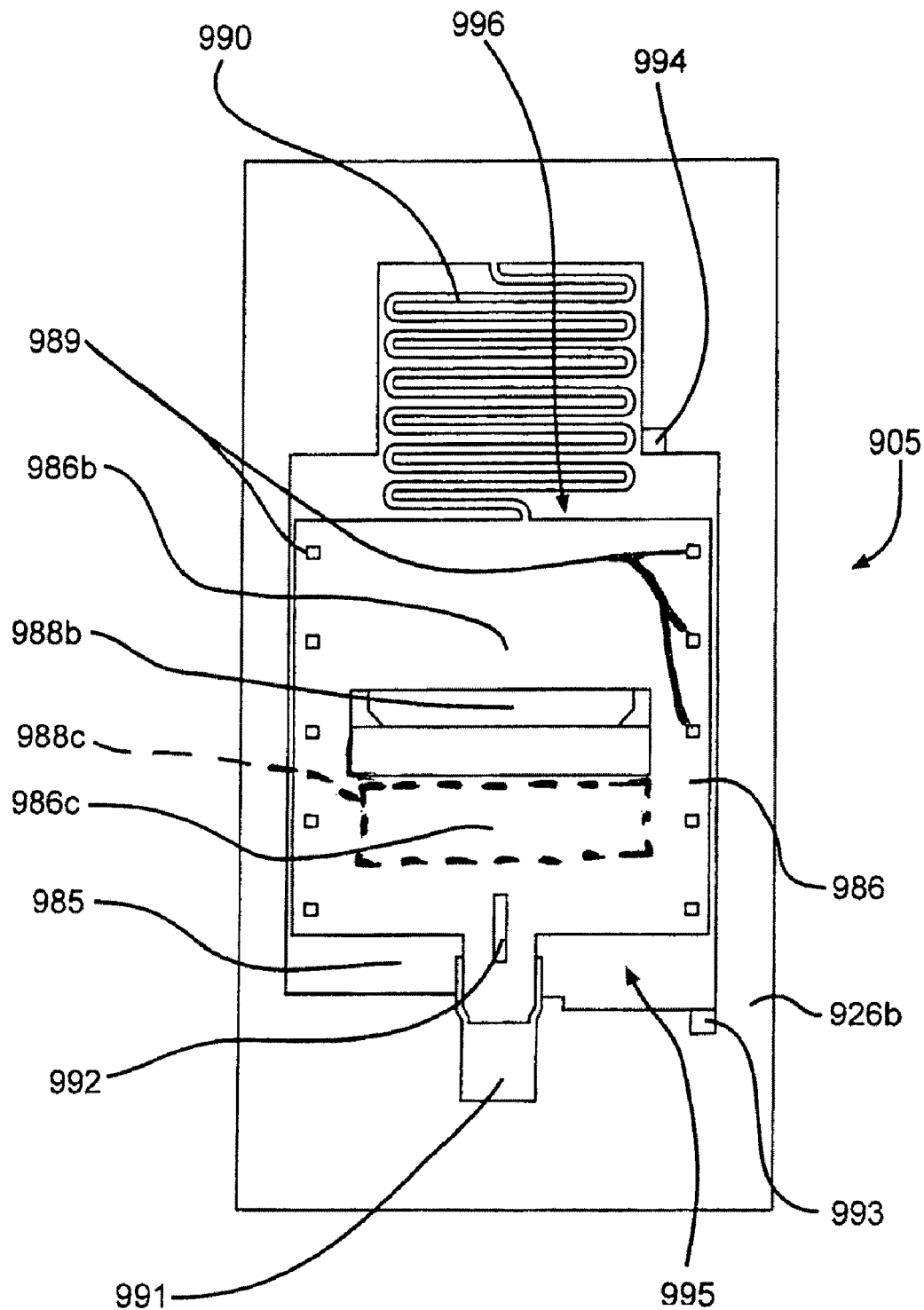
FIG. 14 is a sectional view of a layer of a spool portion of a micro spool valve that is suitable for use as a microvalve in a microvalve operated control valve for a variable displacement compressor.

FIG. 14 is a sectional view of a layer of a spool portion 905 of a microvalve that is suitable for various tasks calling for relatively high flow rates through the microvalve, such as for use as a control valve for a variable displacement compressor. FIG. 14 is a view similar to the left side of FIG. 12, and similar components are labelled with similar numbers. The spool valve 986 is positioned, in combination with the urging of the spring 990 by applying or relieving pressurized fluid through the port 994, and thus is a pilot operated valve. The spool valve 986 is provided with a plurality of micro vents 989 for pressure balancing, that is, to relieve a localized peripheral pressure imbalance between one planar face of the spool valve 986 and the other planar face of the spool valve 986. The spool valve 986 thus has a squared O-shaped configuration generally similar to that of FIG. 12. Likewise, only one micro port 988*b* and one micro port 988*c* are provided, with the micro port 988*c* being blocked by the spool valve 986 when the spool valve 986 is in the illustrated unactuated position, and the micro port 988*c* being unblocked when the spool valve 986 is moved to a fully actuated position.

Figure 15:
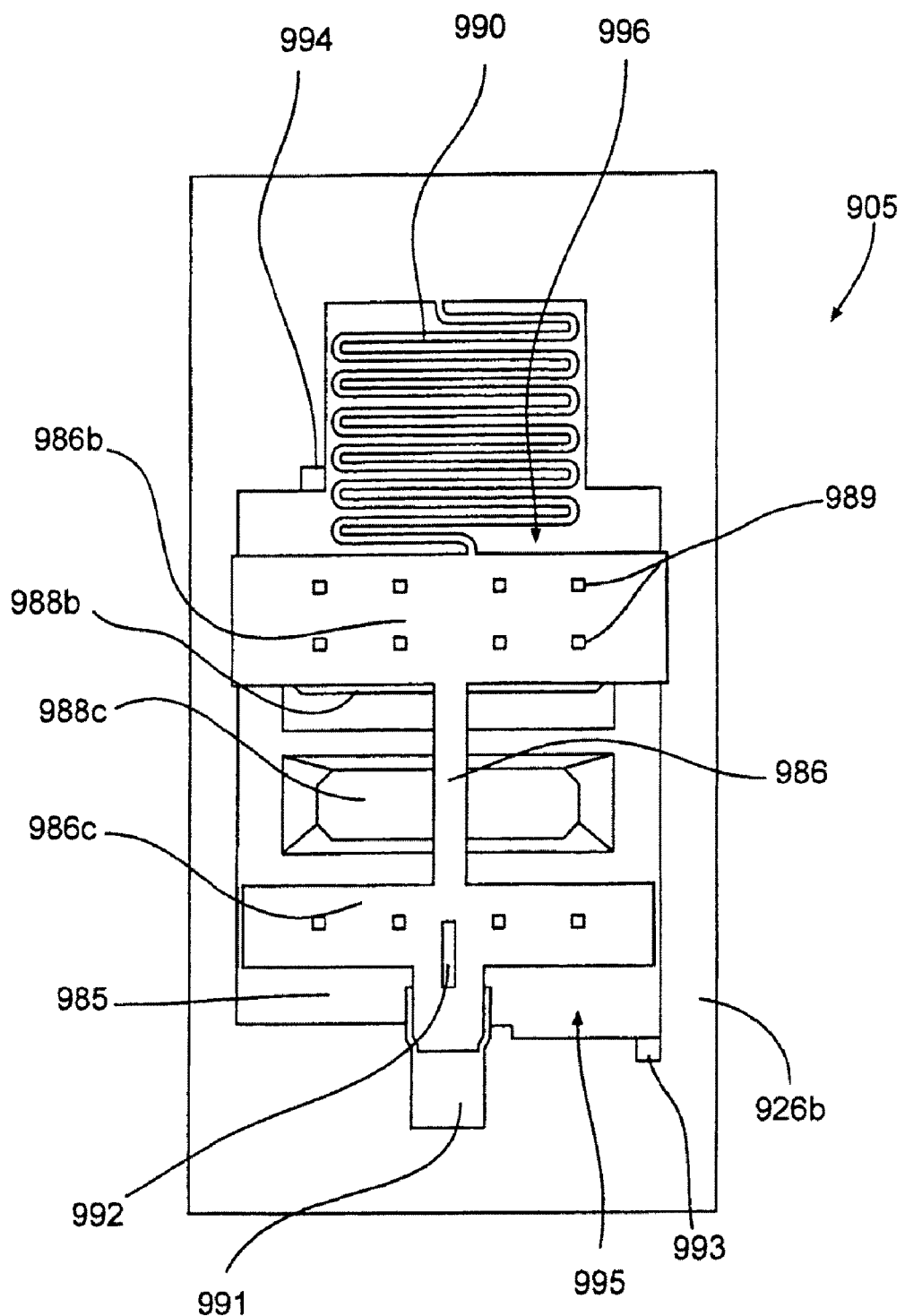
FIG. 15 is a view similar to FIG. 14, except showing a spool portion according to an alternative embodiment.

FIG. 15 is a view similar to FIG. 14, except showing a spool portion according to an alternative embodiment, and similar components are labeled with similar numbers. The spool valve 986 is in an I-shape configuration, rather than the squared O-shaped configuration of FIG. 14 and FIG. 12, or the squared B-shaped configuration of FIG. 11 and FIG. 6. Only one micro port 988*b* and one micro port 988*c* are provided, with both the micro port 988*b* and the micro port 988*c* being unblocked by the spool valve 986 when the spool valve 986 is in the illustrated unactuated position, and the micro port 988*b* being blocked when the spool valve 986 is moved to a fully actuated position.

Figure 16:
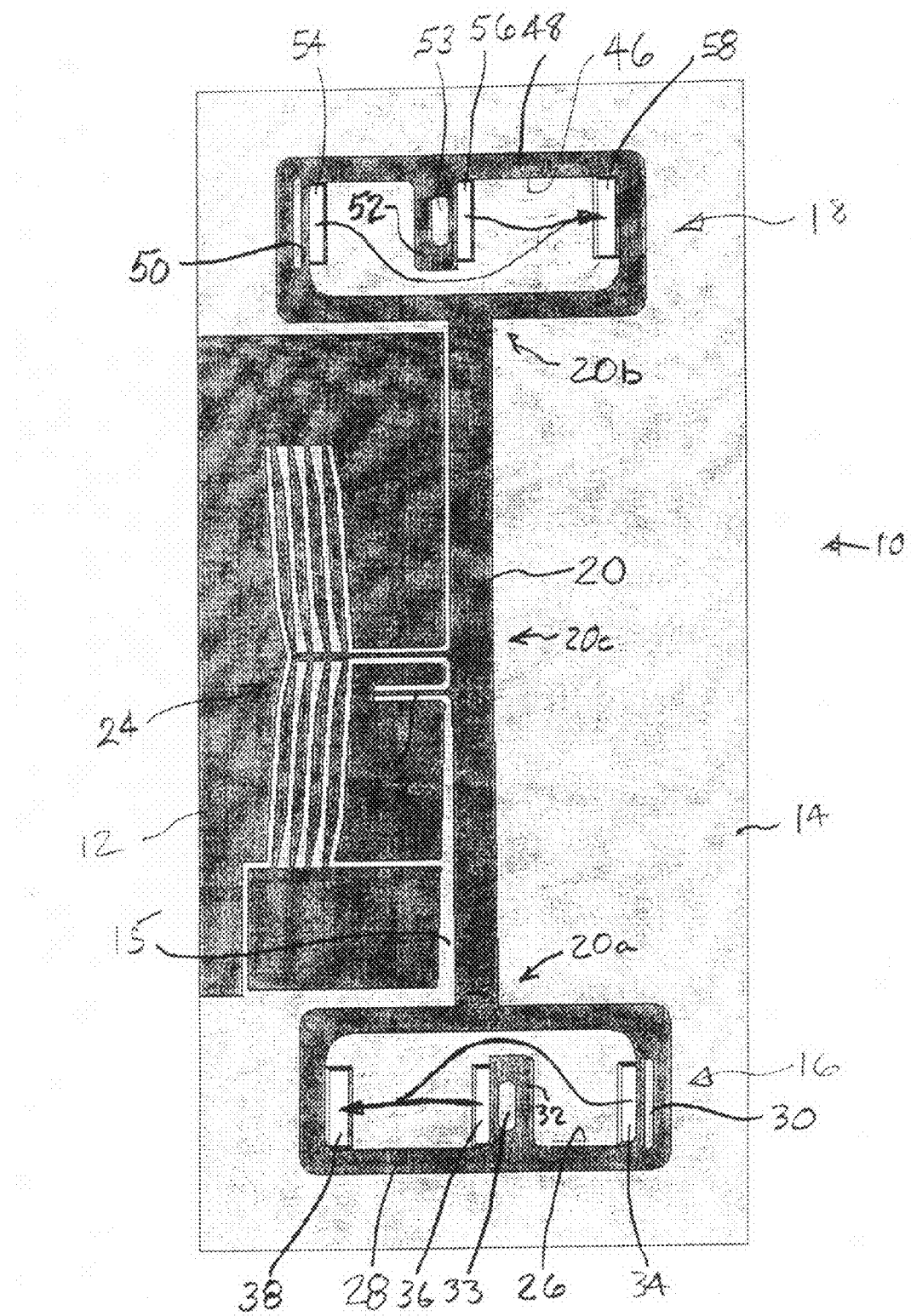
FIG. 16 is a view similar to FIG. 13, except showing the intermediate and lower (bottom) layers of an alternate embodiment of a MEMS device with two high flow two-way microvalves portion mounted to be operated by a single microvalve actuator.
Figure 17:
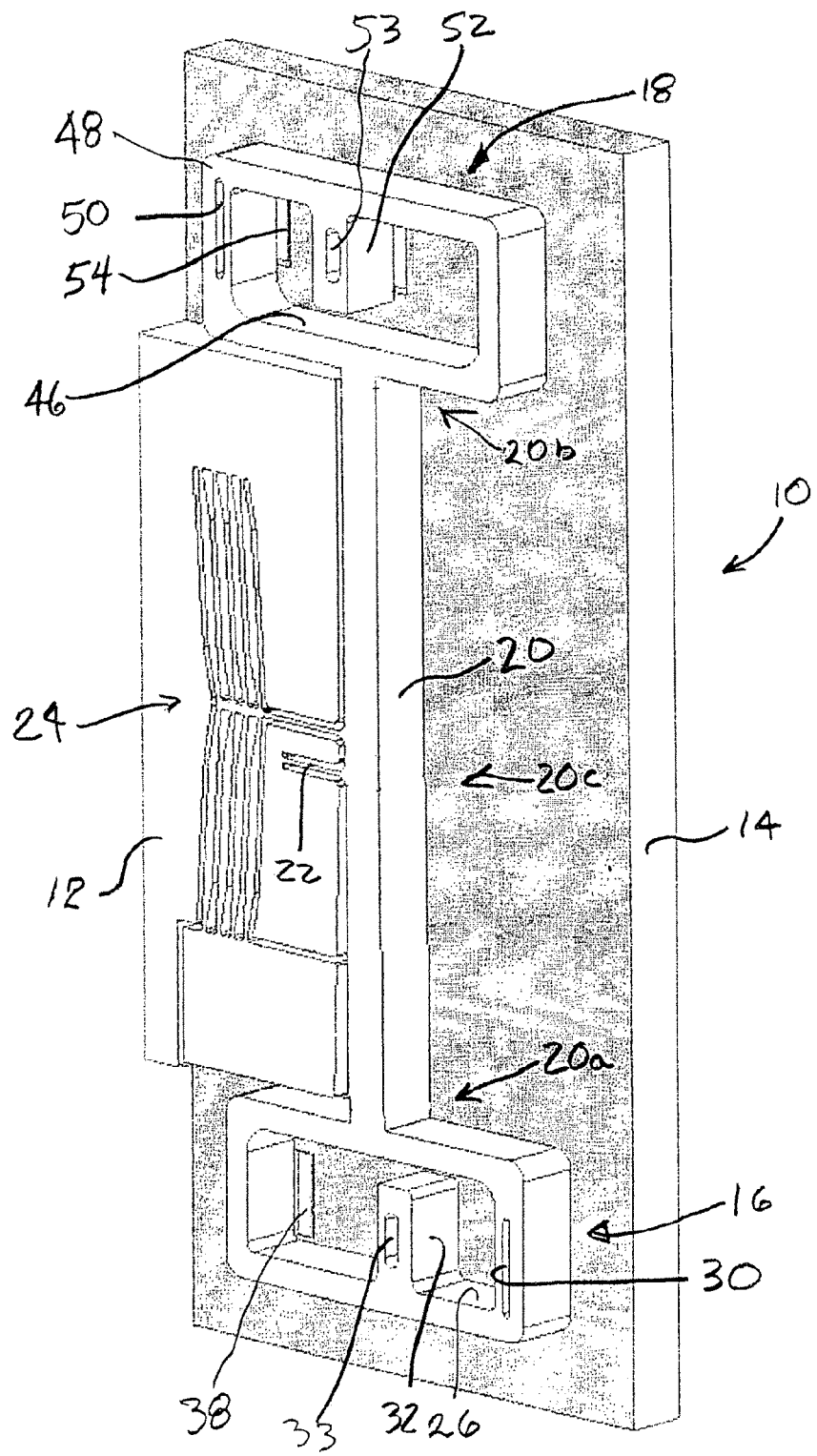
FIG. 17 is a perspective view of the MEMS device of FIG. 16, with an upper layer and select fixed portions of an intermediate layer removed to show the two microvalves and the microvalve actuator.

FIG. 16 and FIG. 17 show an intermediate and bottom plate layers of an alternate embodiment of a MEMS device, indicated generally at 10. The MEMS device is formed of multiple planar layers, including at least an intermediate plate layer 12, a lower plate layer 14, and an upper plate layer (not illustrated) (of course, the terms lower and upper are purely for ease of reference when viewing the illustrations, and are not meant to be a restriction on the orientation of the MEMS device 10). The lower plate layer 14 and the upper plate layer are fixed in a leak proof manner to either planar face of the intermediate plate layer 12 disposed between the lower plate layer 14 and the upper plate layer. A cavity 15 is defined in the intermediate plate layer 12. For clarity of illustration of the remaining components, however, fixed portions of the intermediate layer surrounding the moving components discussed below are not illustrated, however it is intended that the fixed portions of the intermediate plate layer 12 will form a leak-proof wall about the moving components in the same manner as discussed above with respect to the cavity 942 of earlier discussed embodiments, or as shown in the embodiment shown in FIG. 18 and FIG. 19, discussed below. Two high flow two-way microvalves, specifically a first microvalve 16 and a second microvalve 18, are formed from the material of the intermediate plate layer 12 are, and are disposed in the cavity 15. The MEMS device 10 also includes a movable elongated beam 20, having a first end 20*a*, a second end 20*b*, and a central portion 20*c*. The two microvalves 16 and 18 are preferably integrally formed with the beam 20. The first microvalve 16 is fixed to the first end 20*a*, and the second microvalve 18 is fixed at the opposite end of the beam 20, to the second end 20*b*. A first area on the central portion 20*c* of the beam 20 is attached to a fixed portion of the intermediate plate layer 12 by a flexible hinge 22, similar to the flexible hinge 934 described above. A second area on the central portion 20*c* of the beam 20 is attached to an actuator 24 disposed in the intermediate plate layer 12. The actuator 24 is similar in structure and function to the microvalve actuator 967 described above. As above, the actuator 24 can be selectively actuated to move the beam 20, in a plane parallel to the planar plate layers 12, 14, between a first unactuated position shown in FIG. 16, and a second actuated position (not shown), while the hinge 22 flexes to accommodate motion of the beam 20. Note that while the hinge 22 of this preferred embodiment is illustrated as being attached to the central portion 20*c* of the beam 20, it is contemplated that the hinge 22 could be operatively coupled to the beam 20 through a connection elsewhere (such as the microvalves 16, 18), that a spring could be substituted for the hinge, or that the hinge 22 might be done away with entirely, provided there were suitable changes (for example, in placement of the micro ports discussed below) elsewhere in the design of the MEMS device 10 to account for the resultant change in the movement of the beam 20 upon actuation of the actuator 24.

The first microvalve 16 comprises an enlarged body on the first end 20*a* of the beam 20. The body of the first microvalve 16 has a central aperture 26 defined by a generally rectangular peripheral structure 28. A micro vent 30 is formed through the peripheral structure 28. The micro vent 30 cooperates with a micro trough (not shown) formed in the upper plate layer to perform a pressure balancing function similar to the micro vents discussed above (the micro vent 983, for example).

The first microvalve 16 further includes an inwardly extending protrusion 32 formed on a portion of the inner surface of the peripheral structure 28. A micro vent 33 is formed through the protrusion 32. The micro vent 33 cooperates with a micro trough (not shown) formed in the upper plate layer to perform a pressure balancing function similar to the micro vent 30.

A first micro port 34, a second micro port 36, and a third micro port 38 are formed through the lower plate layer 14 in locations within the outer periphery of the peripheral structure 28, and in fluid communication with the central aperture 26, when the beam 20 holds the peripheral structure 28 in the illustrated unactuated first position. A first fluid flow path through the cavity is defined between the first micro port 34, the second micro port 36, and the third micro port 38. When the beam 20 is in the first position thereof, fluid supplied to the first micro port 34 and to the second micro port 36 can flow to the third micro port 38. As the beam 20 is actuated by the actuator 24, the first micro port 34 and the second micro port 36 are progressively covered by, respectively, the peripheral structure in the region of the micro vent 30, and the protrusion 32 in the region of the micro vent 33, until flow through the first micro port 34 and the second micro port 36 is substantially blocked when the beam 20 is fully moved to the second, fully actuated position thereof. The third micro port 38 remains in communication with the central aperture 26 Thus, the first microvalve 16 controls flow through the first fluid flow path through the cavity 15. The peripheral structure 28 substantially blocks fluid communication between the first fluid flow path within the central aperture 26 of the first microvalve 16 and the rest of the cavity 15 in all positions of the beam 20 and the first microvalve 16.

The second microvalve 18 is similar in construction and operation to the first microvalve 16. Specifically, the second microvalve 18 comprises an enlarged body on the second end 20b of the beam 20. The body of the second microvalve 18 has a central aperture 46 defined by a generally rectangular peripheral structure 48. A micro vent 50 is formed through the peripheral structure 48. The micro vent 50 cooperates with a micro trough (not shown) formed in the upper plate layer to perform a pressure balancing function similar to the micro vents discussed above (the micro vent 30, for example).

The second microvalve 18 further includes an inwardly extending protrusion 52 formed on a portion of the inner surface of the peripheral structure 48. A micro vent 53 is formed through the protrusion 52. The micro vent 53 cooperates with a micro trough (not shown) formed in the upper plate layer to perform a pressure balancing function similar to the micro vent 50.

A fourth micro port 54, a fifth micro port 56, and a sixth micro port 58 are formed through the lower plate layer 14 in locations within the outer periphery of the peripheral structure 48, and in fluid communication with the central aperture 46, when the beam 20 holds the peripheral structure 48 in the illustrated unactuated first position. A second fluid flow path through the cavity is defined between the fourth micro port 54, the fifth micro port 56, and the sixth micro port 58. When the beam 20 is in the first position thereof, fluid supplied to the fourth micro port 54 and to the fifth micro port 56 can flow to the sixth micro port 58. As the beam 20 is actuated by the actuator 24, the fourth micro port 54 and the fifth micro port 56 are progressively covered by, respectively, the peripheral structure in the region of the micro vent 50, and the protrusion 52 in the region of the micro vent 53, until flow through the fourth micro port 54 and the fifth micro port 56 is substantially blocked when the beam 20 is fully moved to the second, fully actuated position thereof. The sixth micro port 58 remains in communication with the central aperture 46 Thus, the second microvalve 18 controls flow through the second fluid flow path through the cavity 15. The peripheral structure 48 substantially blocks fluid communication between the second fluid flow path within the central aperture 46 of the second microvalve 18 and the rest of the cavity 15 in all positions of the beam 20 and the second microvalve 18.

The peripheral structures 28 and 48 have another purpose besides isolating, respectively, the first flow path and the second flow path from the rest of the cavity 15 to prevent intermixing of the two flow paths, and acting as valve members to selectively block, respectively, the first micro port 34 and the fourth micro port 54. By containing their respective flow paths, the peripheral structures 28 and 46 act as flow force compensating structures similar to those described in U.S. Pat. No. 7,011,378, the disclosures of which are incorporated herein by reference. As fluid flow changes through the inlet ports 34, 36, 54, and 56, the fluid flowing by exerts changing Bernoulli forces on the peripheral structures 28 and 48, and the protrusions 32, 52. This would make fine control of the MEMS device 10 difficult except that largely counteracting Bernoulli forces are created on the portion of the peripheral structures 28 and 46 adjacent the third micro port 38 and sixth micro port 58, respectively, because the flow is directed by the peripheral structures into the side of the outlet third and sixth micro ports 38, 58 to create Bernoulli forces of the proper orientation to offset those created at the inlet micro ports. Thus flow-induced forces are largely cancelled out, simplifying control of large fluid flow rates through the microvalves 16 and 18 of the MEMS device 10.

With proper routing of fluid to the micro ports thereof, the MEMS device 10 can be plumbed as two simultaneously operating microvalves in separate fluid circuits, or, as is expected to be the more common arrangement, two microvalves operating in parallel branches of the same circuit so that, hydraulically, the MEMS device 10 could be considered a single two-way valve. Such a two-way valve could be used for, for example, a thermostatic expansion valve (THX) in a refrigeration system. Such a two-way valve could also, suitably with a pressure sensor and closed loop control, be utilized as a valve for controlling the pressure, such as the discharge valve for selectively feeding fluid to the crankcase of a variable displacement refrigeration compressor with a constant bleed path to the suction of the compressor, similar to some of the valves discussed above. As discussed above, one could easily fabricate a pressure sensor (not shown) from the material of the intermediate plate layer at the same time that the microvalves 16, 18 and the actuator 24 are being fabricated.

The innovative use of the protrusions 32 and 52 is believed to allow each of the microvalves 16 and 18 to pass more fluid flow therethrough with fine control than would be realized just by using a single larger inlet micro port 34, 54. Additionally, the packaging is advantageous compared to a valve with a single large inlet, since the radius from the pivot point of the beam 20 to the far side of an inlet micro port would not increase, nor would the actuator 24 have to move the beam 20 through a larger arc to cover and uncover an inlet port of greater width. Indeed, it may be desirable to add more than one protrusion to the peripheral structures 32 and 52, to further increase the flow capacity of the microvalves.

Figure 18:
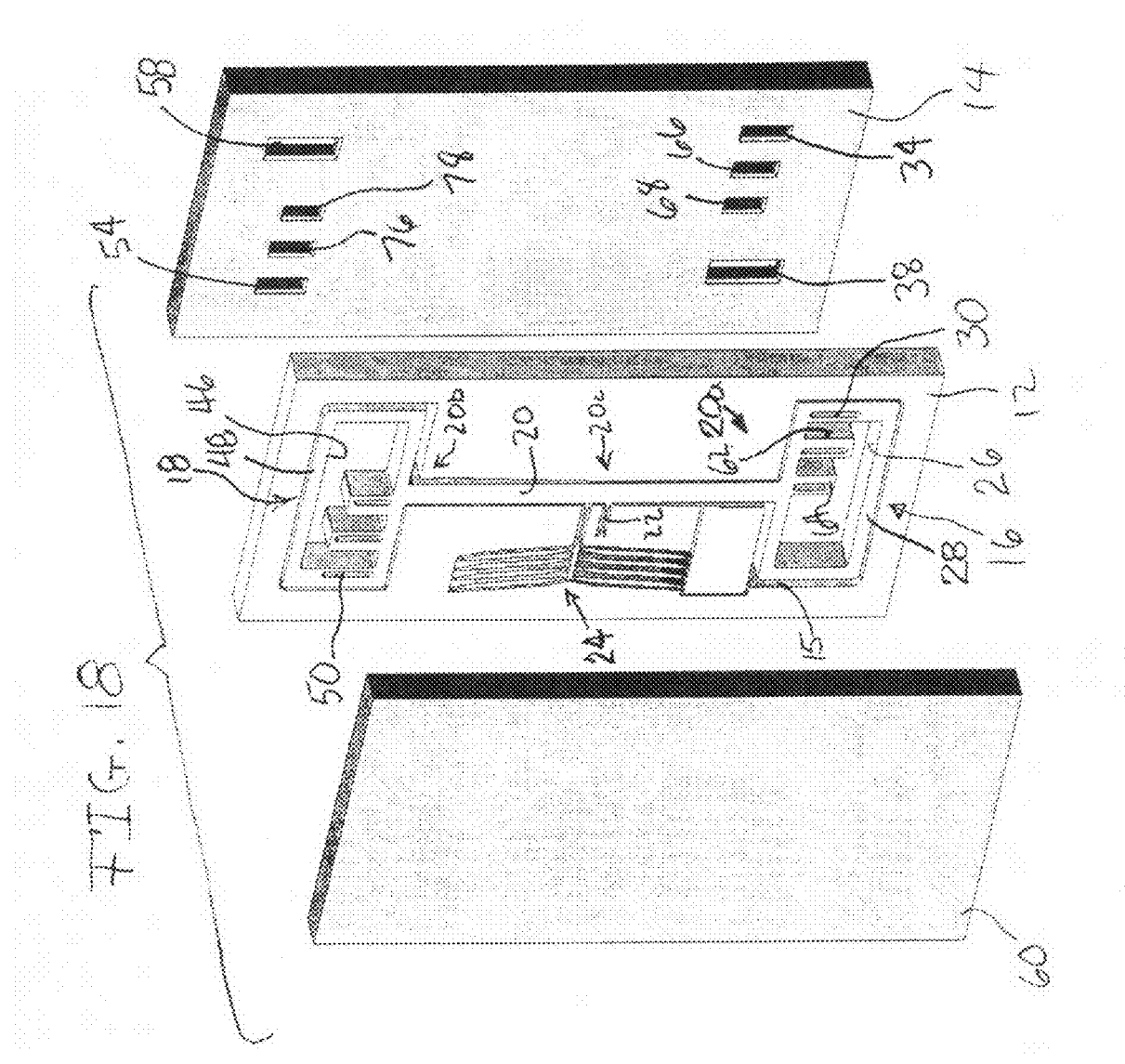
FIG. 18 is an exploded view of the three layers of an alternate embodiment of a MEMS device according to the invention.
Figure 19:
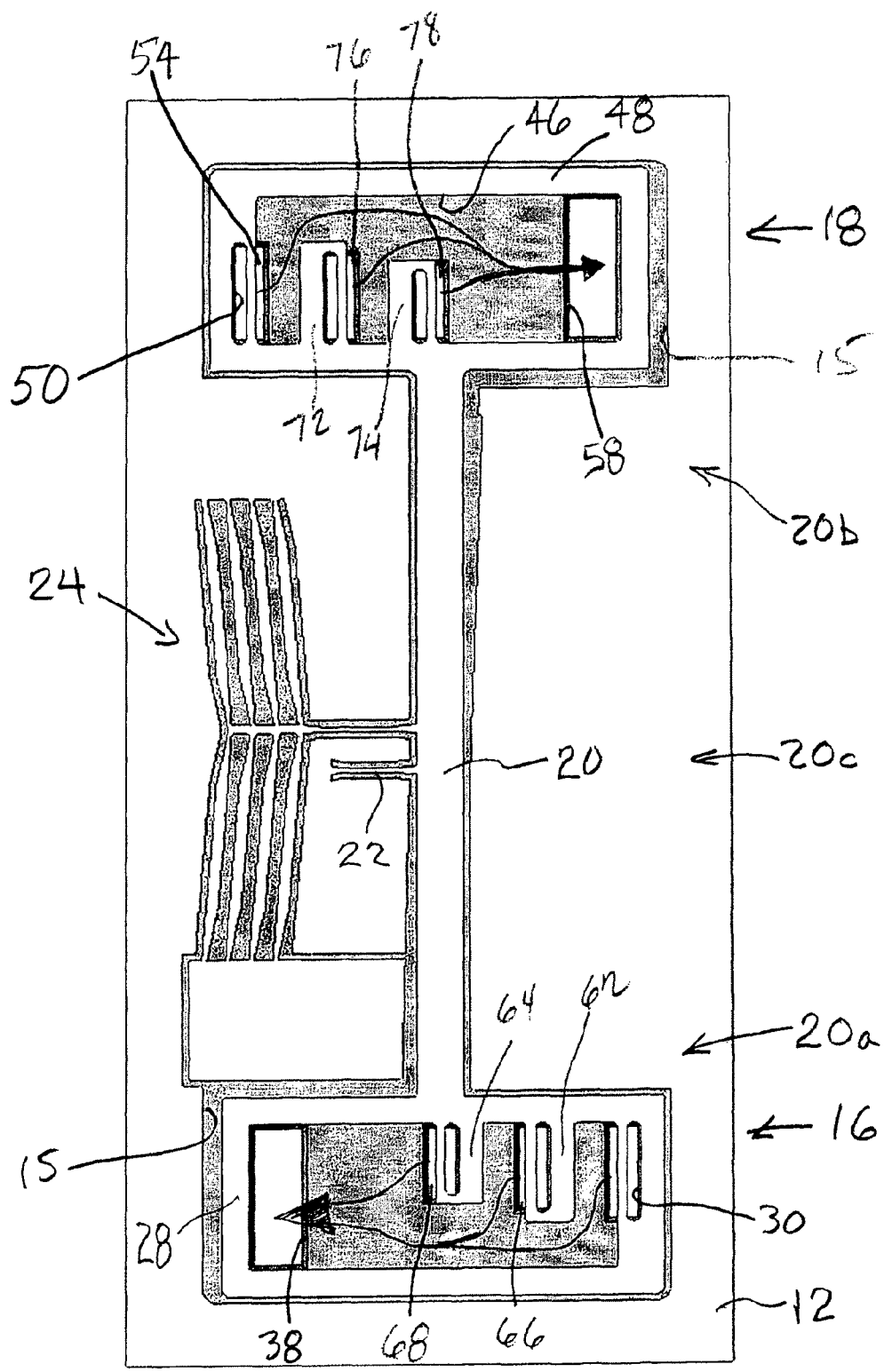
FIG. 19 is a view similar to FIG. 16, except showing the MEMS device of FIG. 18.

Just such an arrangement is illustrated in FIGS. 18 and 19. The embodiment of the MEMS device 10 illustrated in FIGS. 18 and 19 is generally similar to the embodiment illustrated in FIG. 16 and FIG. 17, and similar components are labelled with similar numbers. Note that an upper plate layer 60 of the MEMS device 10 is illustrated in FIG. 18. Also, in this embodiment there are no protrusions 32, 52 extending generally inwardly into the central apertures 26, 46. Thus, there are also no second or fifth micro ports 36, 56.

Instead, consider the microvalve 16. In the general region of the point of attachment between the peripheral structure 28 and the beam 20, two spaced apart protrusions 62 and 64 are formed on respective portions of the inner surface of the peripheral structure 28, extending into the aperture 26. The protrusions 62 and 64 are thus on the opposite side of the aperture 26 from where the protrusion 32 was in the previous embodiment. Each of the protrusions 62 and 64 are provided with a respective micro vent extending therethrough, similar to the micro vent 30, each of which cooperates with a respective micro trough formed in the upper plate layer 60. In the bottom plate layer 14, a seventh micro port 66 is formed near the protrusion 62, and an eighth micro port 68 is formed near the protrusion 64, such that the micro ports 66 and 68 are uncovered when the beam 20 is in the illustrated unactuated first position, and are substantially blocked by the protrusion 62 and the protrusion 64, respectively, when the beam 20 is moved to the fully actuated position thereof (not illustrated). Note that the protrusion 64 is shorter in length than the protrusion 62; this is because the protrusion 64 has more fluid passing around the end thereof (flow from both the micro port 34 and the micro port 66) than does the protrusion 62, which, being upstream in the first flow path, has only the fluid flow from the micro port 34 flowing past.

Similarly, now consider the microvalve 18. In the general region of the point of attachment between the peripheral structure 48 and the beam 20, two spaced apart protrusions 72 and 74 are formed on respective portions of the inner surface of the peripheral structure 48, extending into the central aperture 46. The protrusions 72 and 74 are thus on the opposite side of the aperture 46 from where the protrusion 52 was in the previous embodiment. Each of the protrusions 72 and 74 are provided with a respective micro vent extending therethrough, similar to the micro vent 50, each of which cooperates with a respective micro trough formed in the upper plate layer 60. In the bottom plate layer 14, a ninth micro port 76 is formed near the protrusion 72, and a tenth micro port 78 is formed near the protrusion 74, such that the micro ports 76 and 78 are uncovered when the beam 20 is in the illustrated unactuated first position, and are substantially blocked by the protrusion 72 and the protrusion 74, respectively, when the beam 20 is moved to the fully actuated position thereof (not illustrated). Note that the protrusion 74 is shorter in length than the protrusion 72 for the same reason that the protrusion 64 is shorter than the protrusion 62.

Figure 20:
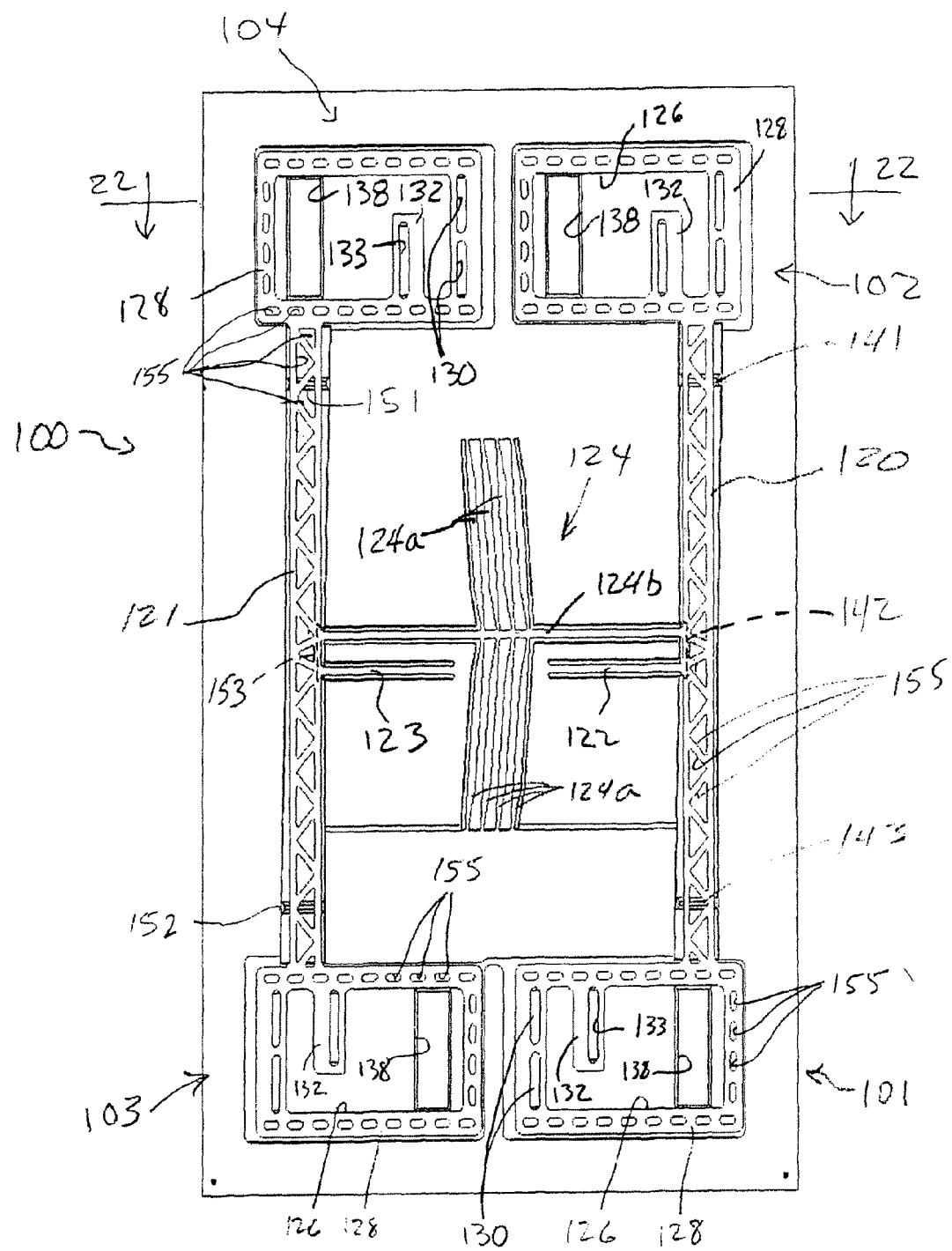
FIG. 20 is a top plan view of the intermediate and the lower layers of an alternate embodiment of a MEMS device having triangular and oval lightening cuts made in the device to reduce the inertia of the movable components, which include four microvalves operated by a single common microvalve actuator.
Figure 21:
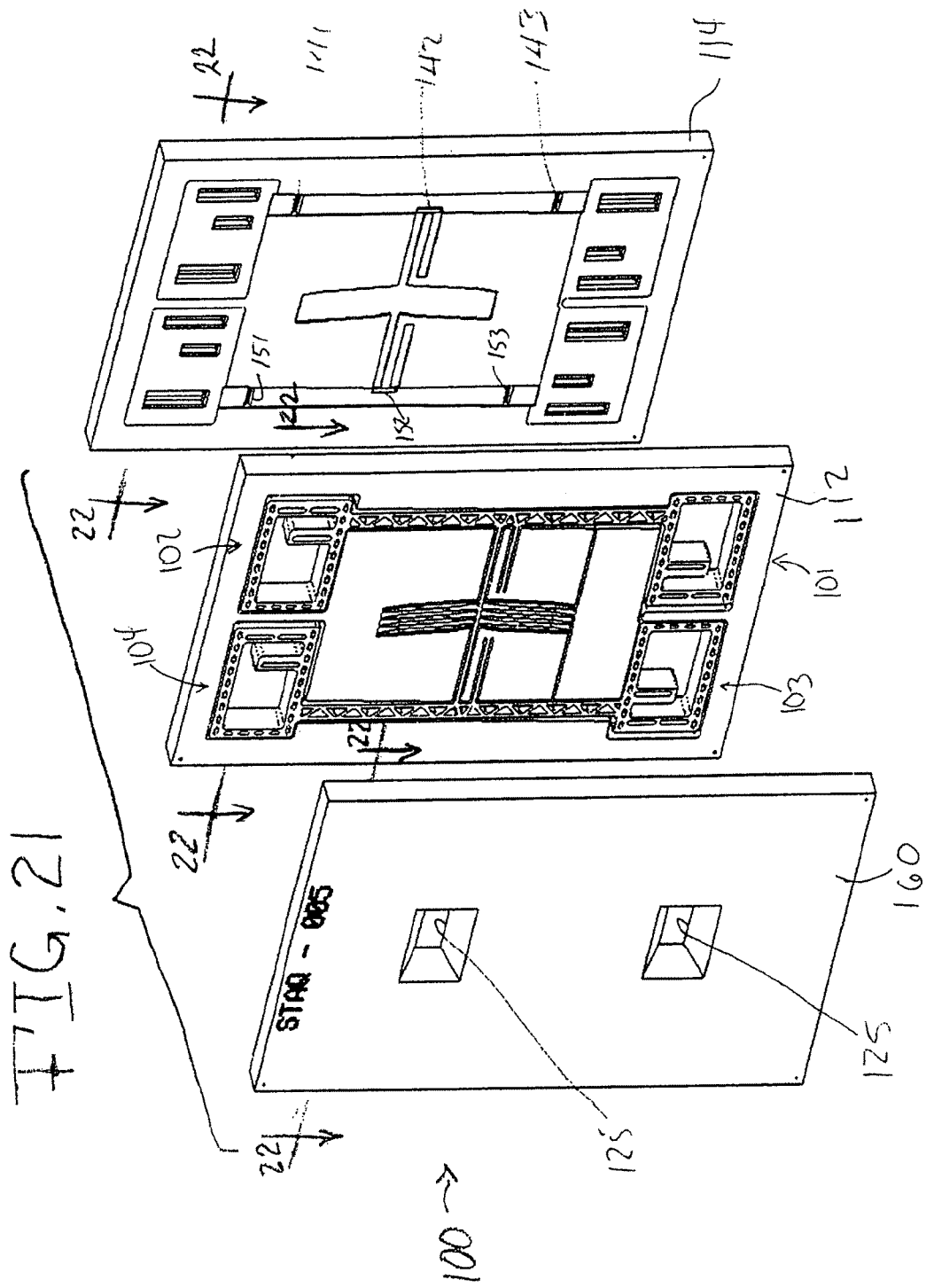
FIG. 21 is an exploded view of the MEMS device of FIG. 20.
Figure 22:
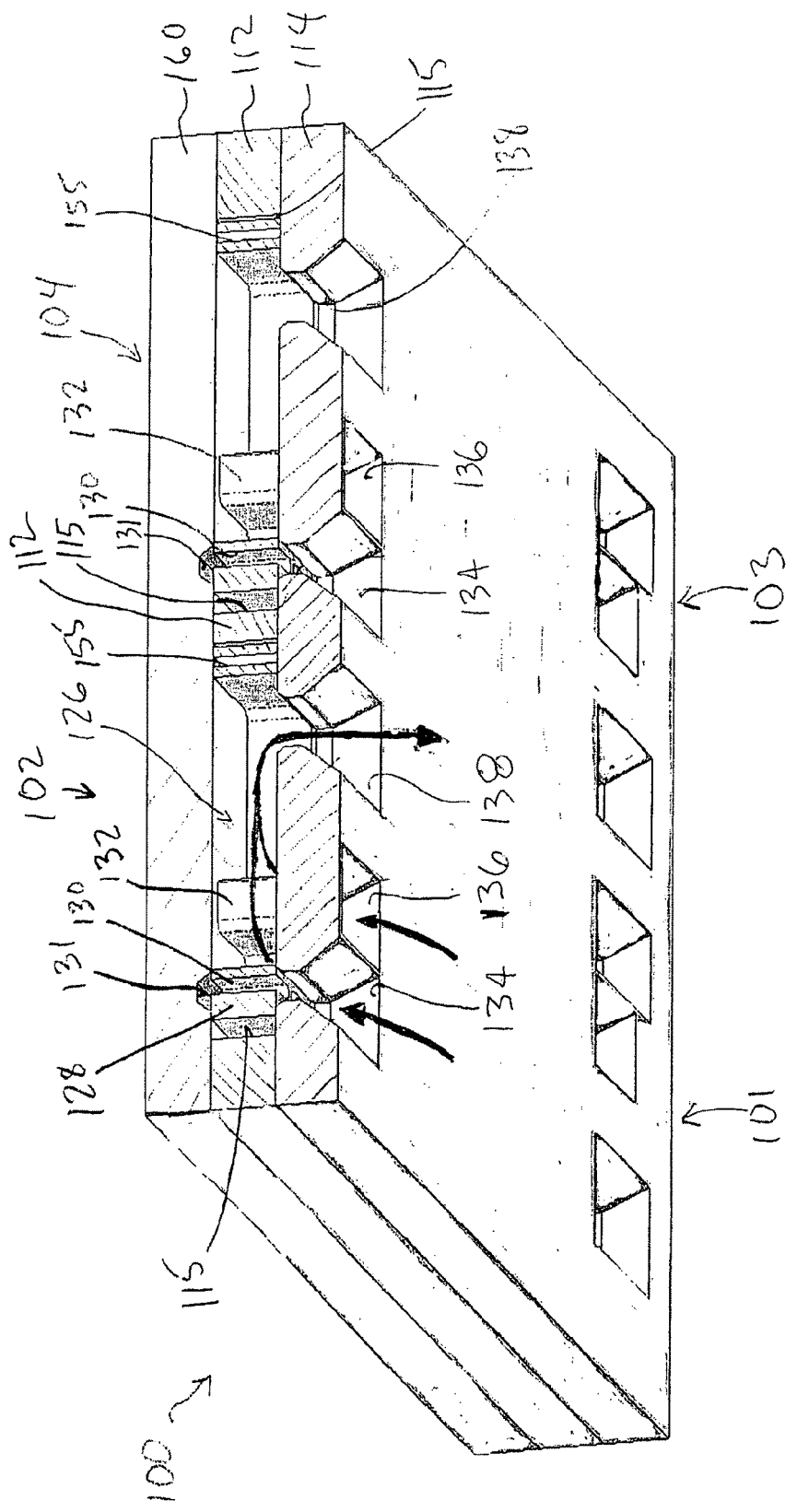
FIG. 22. is a bottom perspective view, partly in section taken along the lines 22-22, of the MEMS device of FIG. 20.

Referring now to FIG. 20, FIG. 21, and FIG. 22, another embodiment of a MEMS device, indicated generally at 100 is shown. The construction of the MEMS device 100 is similar to that of the MEMS device 10, in that the MEMS device 100 is formed of multiple planar layers, including at least an intermediate plate layer 112 (which may also be referred to as a substrate 112), a lower plate layer (substrate) 114, and an upper plate layer (substrate) 160. In this embodiment, the MEMS device 100 includes four normally closed microvalves, indicated generally at 101, 102, 103, and 104. Each of the microvalves 101, 102, 103, and 104 are generally similar in structure to the microvalves 16 and 18, except in this embodiment, the microvalves 101, 102, 103, and 104 are set up to be normally closed instead of normally open valves. The microvalves 101, 102, 103, and 104 are all disposed within a cavity 115 formed in the intermediate plate layer 112.

The microvalves 101 and 102 are joined to opposite ends of a first beam 120, and the microvalves 103 and 104 are joined to opposite ends of a second beam 121. A first part of the central portion of the first beam 120 is preferably integrally formed with and attached to a fixed portion of the intermediate plate layer 112 by a hinge 122, similar to the hinge 22 discussed above. Similarly, a first part of the central portion of the second beam 121 is preferably integrally formed with and attached to a fixed portion of the intermediate plate layer 112 by a hinge 123, also similar to the hinge 22.

The microvalves 101, 102, 103, and 104 are all actuated in unison by a single common microvalve actuator 124. The microvalve actuator 124 is similar to the microvalve actuators 24 and 967, in that the microvalve actuator 124 has a plurality of ribs 124a arranged oppositely inclined in a herringbone pattern on opposing sides of a central spine 124b. Like the actuators 24 and 967, the central spine 124b is fixed to a second part of the central portion of the first beam 120. As seen in FIG. 21, access openings 125 are formed through the upper layer 160 through which electrical wires may be bonded (such as by soldering) to the fixed portions of the intermediate layer 112 outward of the ribs 124a on both sides of the microvalve actuator 124. When electric current is passed through the ribs 124a of the microvalve actuator 124, they heat up, lengthen, and thus urge the central spine 124b rightward (as viewed in FIG. 20) to push the first beam 120 from the illustrated first unactuated position thereof to a second, fully actuated position thereof, with the hinge 122 flexing to accommodate the motion of the first beam 120.

Unlike the microvalve actuators 24 and 967, the central spine 124b of the microvalve actuator 124 also extends leftward and is fixed to a second part of the central portion of the second beam 121. When the microvalve actuator 124 is actuated by passing an electric current through the ribs 124a of the microvalve actuator 124, and the central spine 124b is urged rightward, the central spine 124b pulls the second beam 121 from the illustrated first unactuated position thereof to a second, fully actuated position thereof, with the hinge 123 flexing to accommodate the motion of the second beam 121. Thus, both the first beam 120 and the second beam 121 are actuated simultaneous by the single microvalve actuator 124 of the MEMS device 100, and both rotate in a clockwise manner (as viewed in FIG. 20) when the microvalve actuator 124 is energized.

As indicated above, the first microvalve 101 is generally similar to the first microvalve 16 (as shown in FIG. 16), except that the first microvalve 101 is a normally closed valve. The first microvalve includes a central aperture 126 defined by a peripheral structure 128. A pair of micro vents 130 are formed in the peripheral structure 128, and cooperate with a micro trench 131 (the corresponding micro trenches 131 for the microvalves 102 and 104 can be seen in FIG. 22) (or a respective pair of micro trenches) formed in the upper plate layer 160 to provide pressure equalization. A protrusion 132 is formed on the peripheral structure 128 near the point of attachment to the first beam 120. The protrusion 132 is provided with a micro vent extending therethrough, similar to the micro vent 30, and cooperates with a respective micro trough (not shown) formed in the upper plate layer 160. In the bottom plate layer 114, a first micro port 134 is formed under the peripheral structure 128, in a location to be covered by the peripheral structure 128 and in fluid communication with the micro vents 130 when the first beam 120 is in the unactuated position. A second micro port 136 is formed in the lower layer 114 under the protrusion 132, in a location to be covered by the protrusion 132 and in fluid in fluid communication with the micro vent of the protrusion 132 when the first beam 120 is in the unactuated position. A third micro port 138 is formed in the lower layer 114 in a location to be in continuous fluid communication with the aperture 126 and to not be in fluid communication with the rest of the cavity 115 outside of the peripheral structure 128 in all positions of the first beam 120.

When the microvalve actuator 124 is energized, the first microvalve 101 is moved from the first unactuated position thereof, illustrated in FIG. 20, to a second, actuated position in which the first micro port 134 and the second micro port 136 are uncovered, allowing fluid to flow along the first fluid flow path (out of the first micro ports 134 and 136, through the aperture 126, and out through the third micro port 138). The first fluid flow path is substantially contained within the peripheral structure 128, and fluid flowing through the first flow path does not substantially mix with fluid in the rest of the cavity 115.

It will be appreciated after inspection of FIG. 20, that the other three microvalves 102, 103, and 104 have the same structure and will operate in the same manner as the first microvalve 101. Accordingly, the structure and operation of the three microvalves 102, 103, and 104 will not be further discussed.

As best seen in FIG. 21, troughs 141 and 143 are formed in the lower plate layer 114, under the beam 120 to permit flow from one side to the other of the beam 120 as the beam 120 is moved by the microvalve actuator 124, preventing hydraulic lock or significant damping. A similar trough 142 is formed in the lower plate layer 114, under the hinge 122 and the spine 124b to permit flow from one side to the other of the hinge 122 and the spine 124b as the beam 120 is moved by the microvalve actuator 124, preventing hydraulic lock or significant damping of the moving components of the MEMS device 10. Troughs 151, 152, and 153, similar in arrangement and function to the troughs 141, 142, and 143, respectively, are provided under the second beam 121, and under the hinge 123 and left end (as viewed in FIG. 20) of the spine 124b. Although not show, similar troughs to prevent hydraulic lock can be provided under suitable moving components of any of the embodiments presented herein.

Also best seen in FIG. 21 are the recesses 154 formed in the lower plate layer 114 that preferably underlie all of the moving components of the MEMS device 100. The moving components of the MEMS device 100 of course include the respective peripheral structure 128 and the respective protrusion 132 of each of the microvalves 101, 102, 103, and 104, the beams 120 and 121, the hinges 122 and 123, and the ribs 124a and the spine 124b of the microvalve actuator 124. The recesses 154 are very shallow recesses which help ensure that the moving components do not drag on the lower plate layer 114 during movement. Similar recesses (not shown) are preferably formed in the upper plate layer 160. Similar recesses are preferably found in all the embodiments of our invention. Of course, this means that there is some leakage between the moving components and the upper and lower plate layers 160, 114, but this leakage is not substantial. Indeed, the recesses 154 are preferably shallower still (or non-existent) in the areas immediately surrounding the micro ports that are designed to be closed off during operation of the associated microvalve, to further reduce leakage. Accordingly, there is no substantial leakage (at most, only insubstantial leakage) when one of the micro ports (such as the micro port 134 of this embodiment or the micro port 820 of the embodiment shown in FIG. 4) is covered by the associated blocking element (such as the peripheral structure 128 of this embodiment or the blocking portion 836b shown in FIG. 4).

The illustrated MEMS device 100 also differs from the illustrations of the earlier embodiments of the invention in that a plurality lightening holes 155 are shown that reduce the mass of the moving components of the MEMS device 100. By reducing the mass of the moving components, the inertia of the moving components is reduced, reducing un-commanded movement of the moving components during vibration or shock. Of course, although not shown, similar lightening holes 155 could be formed in the moving components of the other embodiments of the invention discussed above. The lightening holes 155 may be of any suitable size and shape that maintains adequate structural integrity for the intended service of the MEMS device 100. For example, as illustrated the lightening holes 155 formed in the beams 120 and 121 are triangular, such that the beams 120 and 121 are each seen to be formed as a truss. In contrast, the lightening holes 155 formed in the peripheral structure 128 of each of the microvalves 101, 102, 103, and 104 are shown formed as ovals (more particularly, fully rounded rectangles). It is estimated that the mass of the moving parts of the MEMS device 100 can readily be reduced by over 10 percent utilizing the mass reduction techniques presented herein Indeed, the use of the triangular lightening holes 155 formed in the beams 120 and 121 has been calculated to reduce the mass of the beams 120 and 121 by about 40 percent.

Each of the microvalves 101, 102, 103, and 104 has a separate flow path therethrough, which may most easily seen in FIG. 22, which is a sectional view taken along the lines 22-22 of FIGS. 20 and 21 through the second microvalve 102 and the fourth microvalve 104. The microvalves 102, 104 are illustrated in the closed position (first, unactuated position) thereof. When actuated, the moving components (peripheral structure 128 and protrusions 132) of the microvalves 102 and 104 are shifted leftward from the position shown in FIG. 22, permitting fluid communication between the micro ports 134 and 136 with the central aperture 126. As seen in FIG. 22, the associated flow path, illustrated by the bold arrows with respect to the second microvalve 102, would flow (if the microvalve 102 were actuated to the open position thereof) upward through the micro ports 134, 136, horizontally through the central aperture 126, and downwardly through the micro port 138. Thus the respective fluid flow path for the microvalves 101, 102, 103, and 104, which each have inlet micro ports and outlet micro ports through the same layer, the lower layer 114, may be seen to generally form a U-shape. As will be seen in the flow-through embodiment described with respect to FIG. 25 through 29, other flow path shapes are possible.

Figure 23:
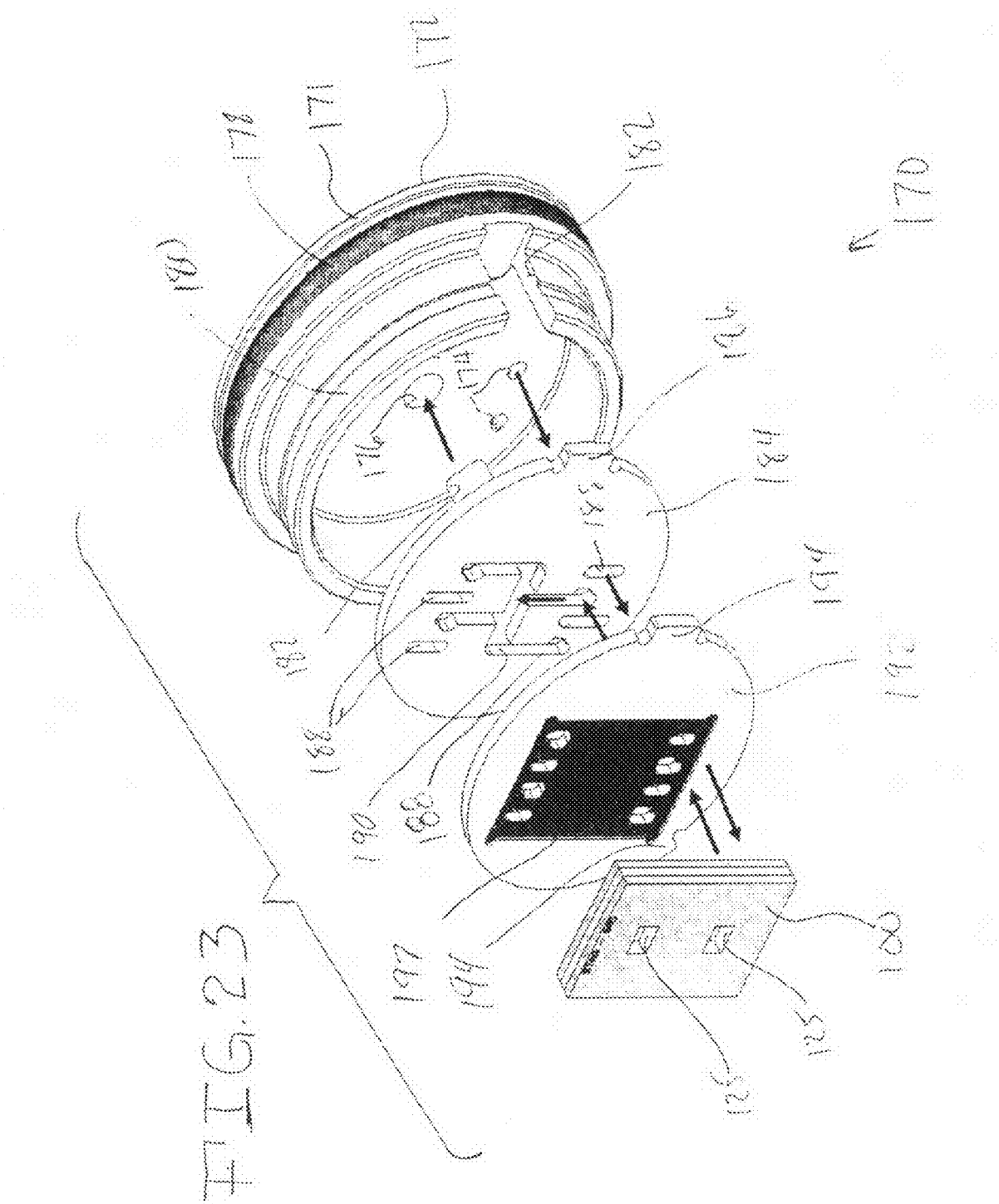
FIG. 23 is an exploded perspective view of a plug similar to that shown in FIG. 1, FIG. 2, and FIG. 3, assembled with the MEMS device of FIG. 22.
Figure 24:
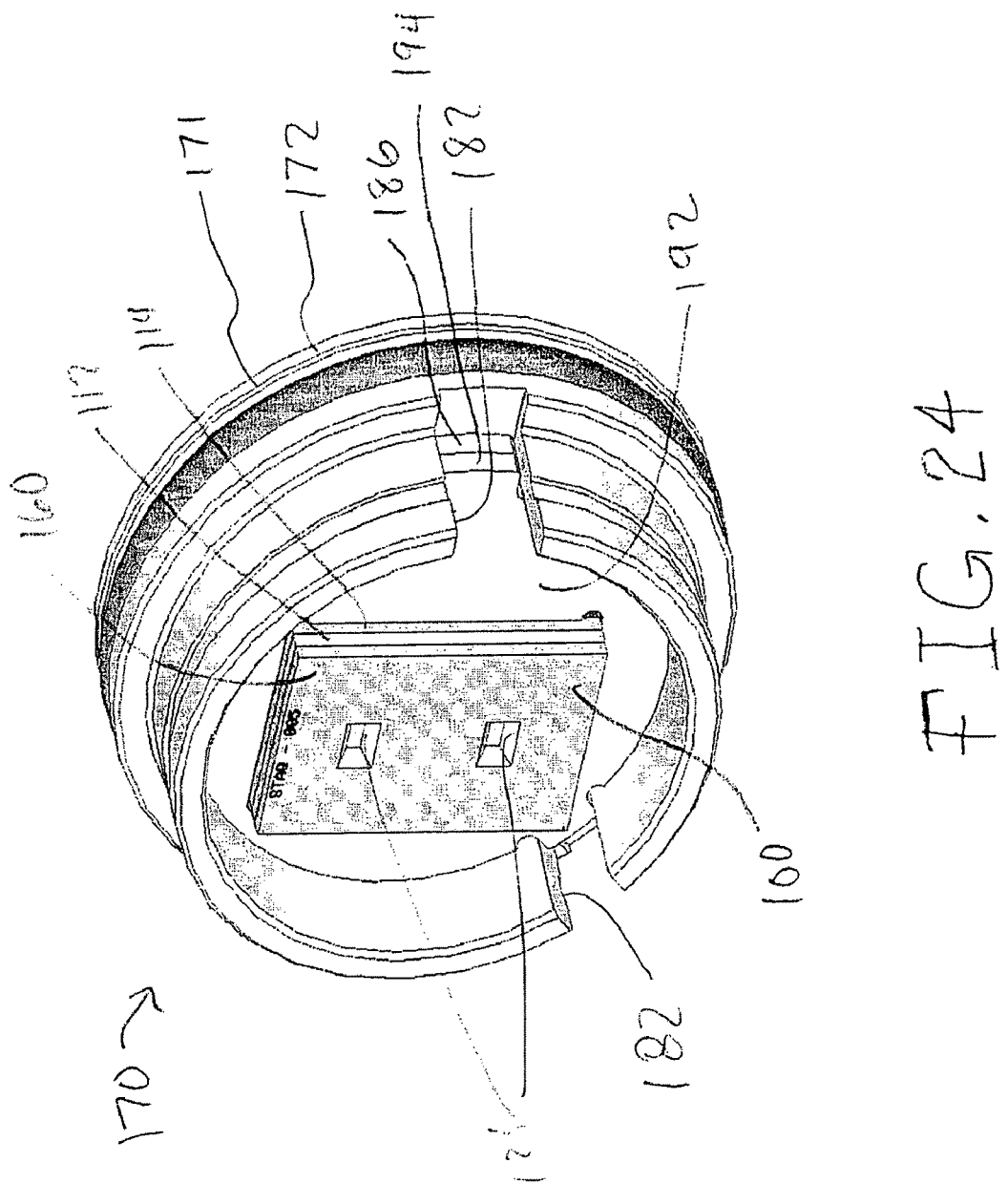
FIG. 24 is a perspective view of the plug and MEMS device of FIG. 23.

FIG. 23 and FIG. 24 illustrate an exemplary mounting arrangement, indicated generally at 170 for a MEMS device, such as the MEMS device 100, with U-shaped flow paths therethrough. As seen, the mounting arrangement 170 includes a generally cup-shaped body 171. The body 171 may be formed of any suitable material, such as plastic or metal. The body 171 has a closed end 172 through which four inlet ports 174 (only two of which can be seen) and a central outlet port 176 are formed. Not seen, on the exterior face of the body 171 are attachment structure (such as threaded outlets) enabling the ports 174, 176 to be connected to a fluid system. In one preferred embodiment, the MEMS device 100 attached to the body 171 is utilized as a THX valve, and the fluid system to which the body 171 is attached is an automotive refrigeration system. The closed end 172 has a circumferential o-ring groove on the radially outer surface thereof, in which an o-ring 178 is disposed. The o-ring 178 will seal the body 171 to a receiving structure (not shown). The body 171 further includes a skirt 180 fixed to the interior face of the closed end 172. The skirt 180 defines two locating slots 182 therein, the purpose of which will be discussed below. The locating slots 182 may be of different widths.

A manifold 184, made of a suitable material, such as silicon, ceramic, glass, plastic, or metal, is disposed next to the closed end 172. The manifold 184 closely fits within the skirt 180 so as to be radially positioned by the skirt 180. The manifold 184 has a pair of locating tabs 186 (only one of which can be seen in FIG. 23) that engage respective ones of the locating slots 182. The locating tabs 186 orient the manifold 184 in a fixed position relative to the inlet ports 174 and the outlet port 176. The locating tabs 186 fit closely within the locating slots 182; if the locating slots 182 are of different widths, and are located at an angle less that 180 degrees apart around the skirt, then the manifold 184 can only be assembled onto the body 171 in one orientation (the manifold 184 cannot be accidentally assembled with the face designed to fit against the body 171 facing away from the body 171, for example). There a plurality of slots are formed through the manifold 184. There are four inlet slots 188 that are aligned so as to be in fluid communication with the inlet ports 174, and one four-arm outlet slot 190 that is aligned so as to be in fluid communication with the outlet port 176.

A microvalve substrate 192, made of a suitable material, such as silicon, ceramic, glass, plastic, or metal, is disposed next to the manifold 184. The microvalve substrate 192 closely fits within the skirt 180 so as to be radially positioned by the skirt 180. The microvalve substrate 192 has a pair of locating tabs 194 that engage respective ones of the locating slots 182. The locating tabs 194 orient the microvalve substrate 192 in a fixed position relative to the inlet ports 174 and the outlet port 176. The locating tabs 194 fit closely within the locating slots 182 to rotationally position the microvalve substrate 192 in a manner similar to the manifold 184. A bond pad 197 is formed on the outer face of the microvalve substrate 192. The bond pad 197 may be of any suitable material formed in any suitable manner; in a preferred embodiment the bond pad 197 is a copper or copper alloy material electrochemically deposited on the silicon microvalve substrate 192. There are four inlet openings 198 formed through the microvalve substrate 192 and bond pad 197, each of which is aligned in fluid communication with a respective one of the inlet slots 188 of the manifold 184. There are also four outlet openings 199 formed through the microvalve substrate 192 and bond pad 197, each of which is aligned in fluid communication with a respective one of the four arms of the outlet slot 190 of the manifold 184.

The MEMS device 100 is fixed to the microvalve substrate 192. Each of the four outlet openings 199 in the microvalve substrate 192 is aligned with and in fluid communication with a respective one of the outlet third micro ports 138 formed in the lower plate layer 114. Each of the four inlet openings 198 in the microvalve substrate 192 is sufficiently large to communicate with both the first micro port 134 and the second micro port 136 of a respective one of the microvalves 101, 102, 103, and 104. In a preferred embodiment, the lower substrate 114 is soldered to the bond pad 197 by soldering. The solder fixes the MEMS device 100 to the microvalve substrate 192, and form part of the pressure boundary of the fluid connection between the inlet openings and the respective ones of the inlet micro ports 134, 136, and between the outlet openings and respective ones of the outlet micro ports 138.

Finally, electric wires (not shown) extend into the access openings 125 in the upper layer 160 and are electrically bonded to the intermediate plate layer 112 in position to energize the microvalve actuator 124.

In operation, when the body 171 is sealed to the receiving structure, the electrical wires are hooked up, and the fluid passageways of the system are plumbed to the inlet ports 174 and the outlet port 176, the electrical wires are energized to cause the actuator 124 to move the beams 120 and 121 to the actuated positions thereof, opening the microvalves 101, 102, 103, and 104. Fluid will flow through the inlet ports 174, through the inlet slots 188 of the manifold 184, through the inlet openings 198 of the microvalve substrate 192, and through the lower plate layer 114 via the first micro port 134 and the second micro port 136 in fluid communication with each of the inlet openings 198 of the microvalve substrate 192. After passing through the respective microvalves 101, 102, 103, and 104, the fluid passes back through the lower plate layer 114 via the respective third micro port 138, and back through the microvalve substrate 192 via the respective outlet opening 199. The outlet flow is directed by the manifold 184 into the common outlet port 176, where the fluid passes back through the body 171 to the system in which the MEMS device 200 and mounting arrangement 170 are installed.

Figure 25:
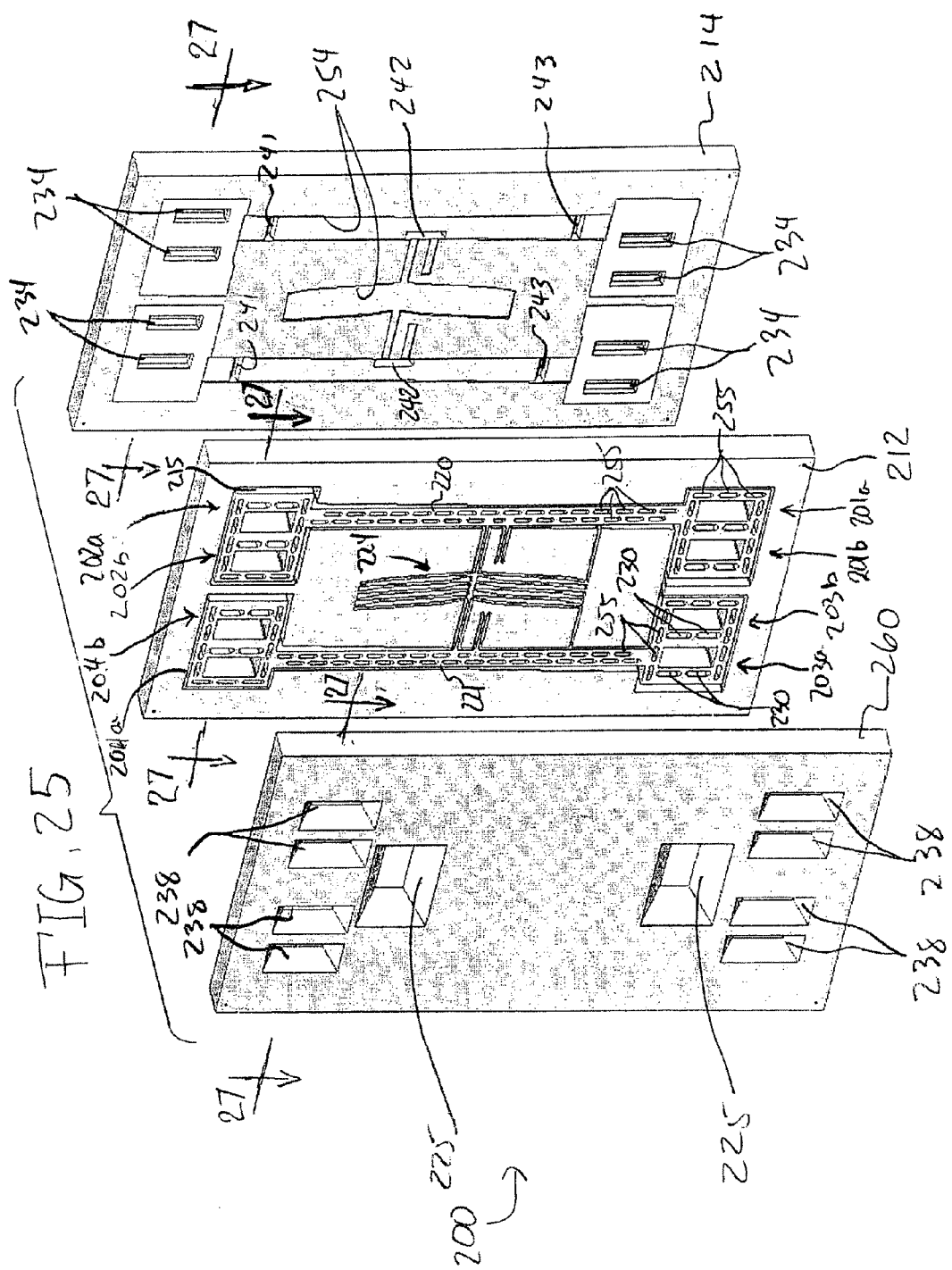
FIG. 25 is an exploded view of an alternate embodiment of a MEMS device arranged to permit fluid to flow into ports in the lower layer, through valves in the intermediate layer and flow out ports in the upper layer.
Figure 26:
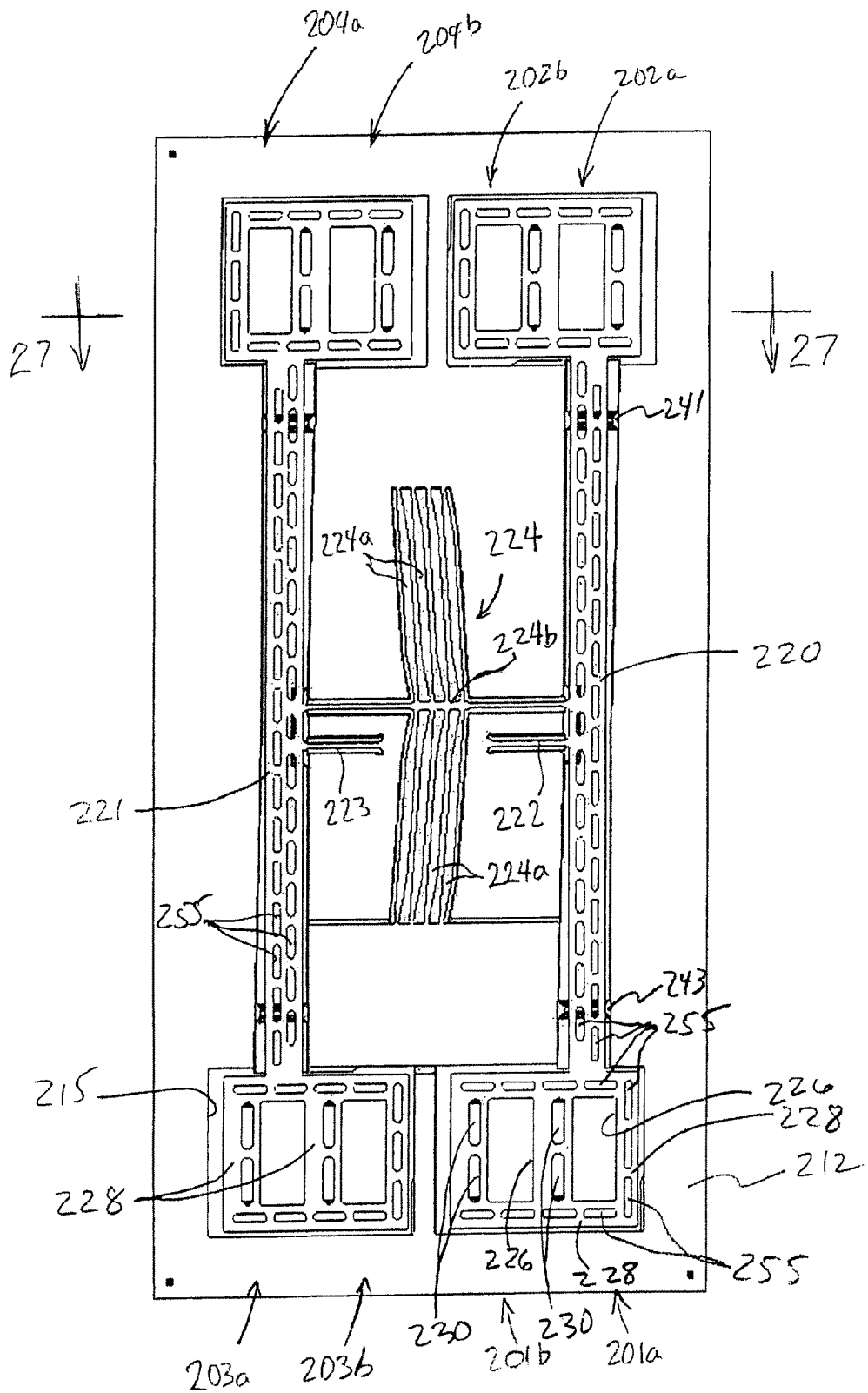
FIG. 26. is a top plan view of the intermediate and the lower layers of the MEMS device of FIG. 25 showing oval lightening cuts made in the device to reduce the inertia of the movable components.
Figure 27:
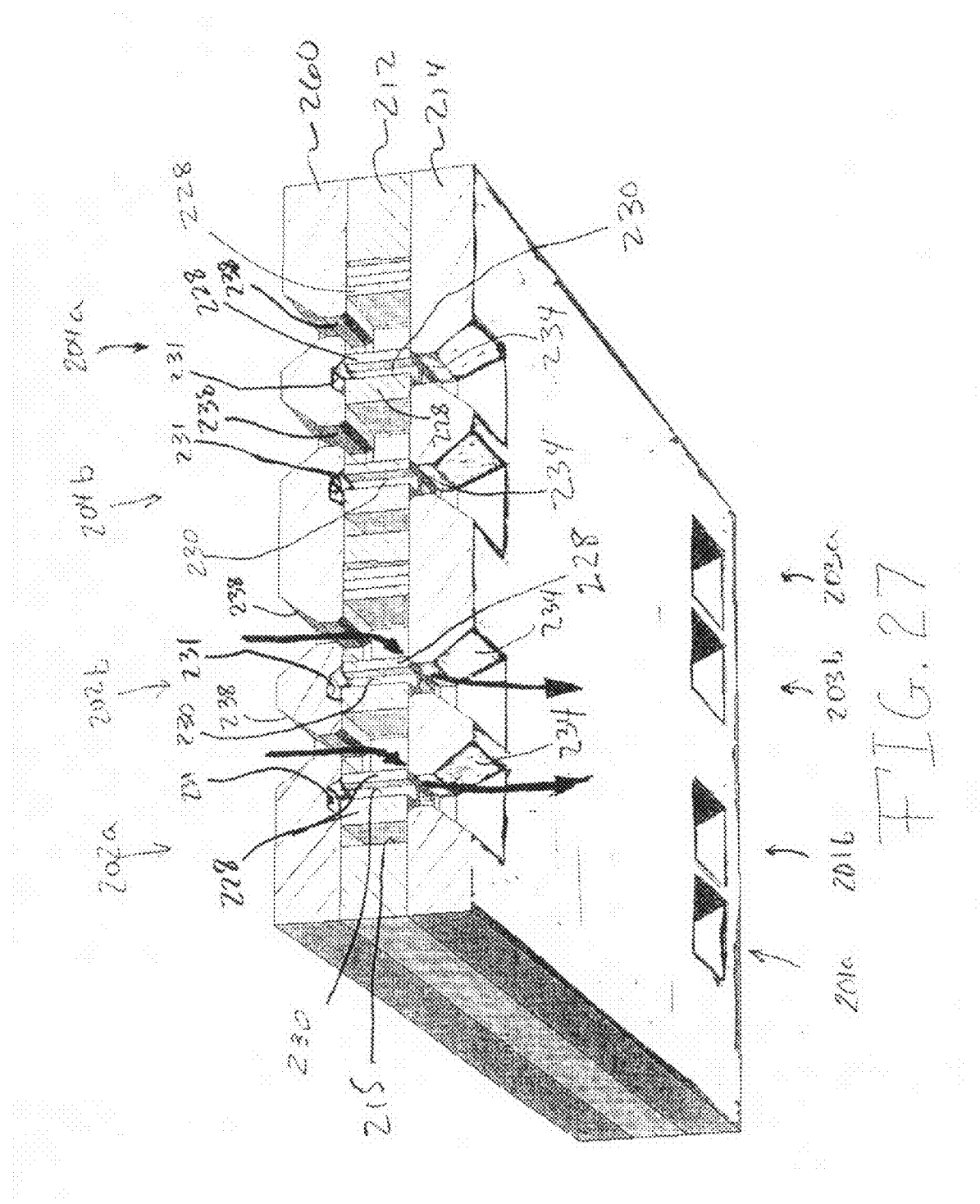
FIG. 27 is a bottom perspective view of the MEMS device, partly in section taken along the lines 27-27, of FIG. 25 and FIG. 26.

FIG. 25, FIG. 26, and FIG. 27 illustrate an alternate embodiment of a MEMS device according to the invention, indicated generally at 200. The MEMS device 200 is generally similar to the MEMS device 100 in that the MEMS device 200 is formed of multiple planar layers, including at least an intermediate plate layer 212, a lower plate layer 214, and an upper plate layer 260. In this embodiment, the MEMS device 200 includes eight normally closed microvalves, indicated generally at 201*a*, 201*b*, 202*a*, 202*b*, 203*a*, 203*b*, 204*a* and 204*b*. Each of the eight microvalves 201*a* through 204*b* are generally similar in structure to the microvalves 101 through 104, except in this embodiment, the microvalves 201*a* and 201*b* are located next to each other, sharing a common portion of a peripheral structure 228. Similarly each of the pairs of microvalves 202*a* and 202*b*, 203*a* and 203*b*, and 204*a* and 204*b*, respectively, are located adjacent to each other, and share respective portions of peripheral structure 228. The eight microvalves 201*a* through 204*b* are illustrated as being normally closed microvalves, though, of course, one or more of the eight microvalves 201*a* through 204*b* could be structured as a normally open valve by rearrangement of the locations of the inlet and outlet micro ports described below the valve relative to the valve's peripheral structure. The eight microvalves 201*a* through 204*b* are all disposed within a cavity 215 formed in the intermediate plate layer 212.

The microvalves 201*a* and 201*b* are joined to the same end of a first beam 220, and the microvalves 202*a* and 202*b* are both joined to the opposite end of the first beam 220. The microvalves 203*a* and 203*b* are joined to the same end of a second beam 221, and the microvalves 204*a* and 204*b* are both joined to the opposite end of the second beam 221. A first part of the central portion of the first beam 220 is preferably integrally formed with and attached to a fixed portion of the intermediate plate layer 212 by a hinge 222, similar to the hinge 122 discussed above. Similarly, a first part of the central portion of the second beam 221 is preferably integrally formed with and attached to a fixed portion of the intermediate plate layer 212 by a hinge 223, also similar to the hinge 122.

The eight microvalves 201*a* through 204*b* are all actuated in unison by a single common microvalve actuator 224. The microvalve actuator 224 is similar to the microvalve actuator 124 in that the microvalve actuator 224 has a plurality of ribs 224*a* arranged oppositely inclined in a herringbone pattern on opposing sides of a central spine 224b. Like the actuator 124 the central spine 224b is fixed to both a second part of the central portion of the first beam 220, and a second part of the central portion of the second beam 221, so that, upon actuation, the actuator 124 pushes against the first beam 220 and pulls the second beam 221 so that both rotate in a clockwise direction from the illustrated first unactuated position seen in FIG. 26, to a second, fully actuated position thereof (not illustrated), with the hinge 222 flexing to accommodate the motion of the first beam 220, and the hinge 223 flexing to accommodate the motion of the second beam 221.

As indicated above, the microvalve 201a is generally similar to the first microvalve 101 (as shown in FIG. 20), except that the microvalve 201a does not have a protrusion formed thereon. The microvalve 201a includes a central aperture 226 defined by the peripheral structure 228. A pair of micro vents 230 are formed in the peripheral structure 228, and cooperate with a micro trench 231 (the corresponding micro trenches 231 for the microvalves 202a, 202b, 204a, and 204b can be seen in FIG. 27) formed in the upper plate layer 260 to provide pressure equalization. In the bottom plate layer 214, a micro port 234 is formed under the peripheral structure 228, in a location to be covered by the peripheral structure 228 and in fluid communication with the micro vents 230 when the first beam 220 is in the unactuated position. A second micro port 238 is formed in the upper layer 260 in a location to be in continuous fluid communication with the aperture 226 and to not be in fluid communication with the rest of the cavity 215 outside of the peripheral structure 228 in all positions of the first beam 220.

Similarly, the second microvalve 201b a includes a central aperture 226 defined by the peripheral structure 228. Note that a portion of the peripheral structure 228 of the second microvalve 201b is also a portion of the peripheral structure 228 of the first microvalve 201a, and that shared portion separates the apertures 226 of the first microvalve 201a and the second microvalve 201b. A pair of micro vents 230 are formed in the peripheral structure 228, and cooperate with a micro trench 231 (formed in the upper plate layer 260 to provide pressure equalization. In the bottom plate layer 214, a micro port 234 is formed under the peripheral structure 228, in a location to be covered by the peripheral structure 228 and in fluid communication with the micro vents 230 when the first beam 220 is in the unactuated position. A second micro port 238 is formed in the upper layer 260 in a location to be in continuous fluid communication with the aperture 226 and to not be in fluid communication with the rest of the cavity 215 outside of the peripheral structure 228 in all positions of the first beam 220.

When the microvalve actuator 224 is energized to move the first beam 220, the first microvalve 201a is moved from the first unactuated position thereof, illustrated in FIG. 26, to a second, actuated position in which the first micro port 234 is uncovered, allowing fluid to flow along the fluid flow path of the first microvalve 201a. Simultaneously, the second microvalve 201b is moved from the first unactuated position thereof, illustrated in FIG. 26, to a second, actuated position in which the respective micro port 234 is uncovered, allowing fluid to flow along the fluid flow path of the second microvalve 201b. The associated fluid flow paths of the eight microvalves 201a through 204b is fairly different than through the first microvalve 101 of the MEMS device 100, in that fluid flows into each of the eight microvalves 201a through 204b through the associated second micro port 238, through the associated aperture 226, through the opening created between the associated peripheral structure 228 and the edge of the bottom layer 203 defining the associated first micro port 234 and out through the respective first micro port 234. The fluid flow path of each of the eight microvalves 201a through 204b is substantially contained within the respective peripheral structure 228, and fluid flowing through the flow path of one of the eight microvalves 201a through 204b does not substantially mix with fluid in the rest of the cavity 215.

It will be appreciated after inspection of FIG. 26, that the other six microvalves 202a through 204b have the same structure and will operate in the same manner as the first microvalves 201a and 201b. Accordingly, the structure and operation of the other six microvalves 202a through 204b will not be further discussed, except to say that the associated fluid flow paths for the microvalves 202a and 202b is illustrated by the bold arrows in the sectional view of FIG. 27, and that the illustrated barrier between each of the inflow indicating arrows and the associated outflowing arrow is opened by moving the associated peripheral structure 228 leftward (as viewed in FIG. 27) by actuating the microvalve actuator 224. Thus, it is clear that instead of the U-shaped flow path of the MEMS device 100 described above and illustrated in FIG. 22, the MEMS device has a "flow-through" flow path, in that the fluid regulated by the MEMS device 200 flows in one side of the MEMS device 200, flows through the eight microvalves 201a through 204b, and flows out the other side of the MEMS device 200.

As best seen in FIG. 25, troughs 241 and 243 are formed in the lower plate layer 114, under the beam 220 to permit flow from one side to the other of the beam 220 as the beam 220 is moved by the microvalve actuator 224, preventing hydraulic lock or significant damping. A similar trough 242 is formed in the lower plate layer 114, under the hinge 222 and the spine 224b to permit flow from one side to the other of the hinge 222 and the spine 224b as the beam 220 is moved by the microvalve actuator 224, preventing hydraulic lock or significant damping of the moving components of the MEMS device 200. Troughs 251, 252, and 253, similar in arrangement and function to the troughs 241, 242, and 243, respectively, are provided under the second beam 221, and under the hinge 223 and left end (as viewed in FIG. 25 and FIG. 26) of the spine 224b.

Also best seen in FIG. 25 are the recesses 254 formed in the lower plate layer 214 that preferably underlie all of the moving components of the MEMS device 200. The moving components of the MEMS device 200 of course include the respective peripheral structure 228 of each of the eight microvalves 201a through 204b, the beams 220 and 221, the hinges 222 and 223, and the ribs 224a and the spine 224b of the microvalve actuator 224. The recesses 254 are very shallow recesses which help ensure that the moving components do not drag on the lower plate layer 214 during movement. Similar recesses (not shown) are preferably formed in the upper plate layer 260. As indicated above with respect to the MEMS device 100, similar recesses are preferably found in all the embodiments of our invention. As with the MEMS device 100, the recesses 254 are preferably shallower still (or non-existent) in the areas immediately surrounding the micro ports that are designed to be closed off during operation of the associated microvalve, to further reduce leakage. Accordingly, there is no substantial leakage (at most, only insubstantial leakage) when one of the first (outlet) micro ports of this embodiment is covered by the associated peripheral structure 228).

Like the MEMS device 100, the illustrated MEMS device 200 also has a plurality lightening holes 255 to reduce the mass of the moving components of the MEMS device 200. The lightening holes 255 may be of any suitable size and shape that maintains adequate structural integrity for the intended service of the MEMS device 200. However, as illustrated the lightening holes 255 formed in the beams 220 and 221 are ovals (more particularly, fully rounded rectangles), as are the lightening holes 255 formed in the peripheral structure 228 of each of the eight microvalves 201a through 204b. It is estimated that the mass of the moving parts of the MEMS device 200 can readily be reduced by over 10 percent utilizing the mass reduction techniques presented herein Indeed, the use of a single row of the lightening holes 255 formed in the beams 220 and 221 at the spacing shown has been calculated to reduce the mass of the beams 220 and 221 by about 20 percent, so that the double row illustrated in this preferred embodiment is calculated to reduce the mass of the beams 220 and 221 by about 20 percent. The lightening holes 255 are preferably uniform in size and shape, which simplifies the etching process preferably used to form the components of the MEMS device 200, since the lightening holes 255 will then be formed at a uniform rate.

FIG. 28 and FIG. 29 illustrate an exemplary mounting arrangement, indicated generally at 270 for a flow-through MEMS device, such as the MEMS device 200. As seen, the mounting arrangement 270 includes a generally cup-shaped body 271. In one preferred embodiment, the MEMS device 200 attached to the body 271 is utilized as a THX valve, and the fluid system to which the body 271 is attached is an automotive refrigeration system. The body 271 may be formed of any suitable material, such as plastic or metal. The body 271 has a closed end 272 The closed end 272 has a first circumferential o-ring groove on the radially outer surface thereof, in which an o-ring 278 is disposed. The body 271 further includes a skirt 280 fixed to an interior face of the closed end 272. The skirt 280 has a second circumferential o-ring groove on the radially outer surface thereof, near the open end thereof, in which a second o-ring 281 is disposed. The o-rings 278, 281 will seal the body 271 to a receiving structure (not shown).

One or more outlet ports 283 are formed through the skirt 280, in an region axially between the o-ring 278 and the o-ring 281. The outlet ports 283 provide fluid communication between the radially interior surface of the skirt 280 and the radially outer surface of the skirt in the area between the o-rings 278, 281.

Four fluid receiving ports 285 are formed in the closed end 272 of the mounting arrangement 270. The fluid receiving ports communicate with the radially outer surface of the mounting arrangement 270 via internal fluid passageways defined in the mounting arrangement 270 communicating with the one or more outlet ports 283.

A mounting structure 287 on the closed end 272 provides a location for fixing a flow-through MEMS device, such as the MEMS device 200, to the mounting arrangement 270. Any suitable method may be used to fix the MEMS device 200 to the mounting arrangement 270, such as clamping or the use of adhesives. Preferably, the mounting structure 287 locates the MEMS device in such a position, and the diameter of the fluid receiving ports 285 are sufficiently large, that the first micro port 234 of the microvalve 201a and the first micro port 234 of the microvalve 201b can each communicate with the same fluid receiving port 285. Similarly, each of the pairs of microvalves 202a and 202b, 203a and 203b, and 204a and 204b can preferably communicate with a respective one of the fluid receiving ports 285. Of course, eight fluid receiving ports 285 could be formed, each communicating with a respective one of the first micro ports 234; indeed, it is contemplated that yet other arrangements may prove suitable in some applications.

Finally, as indicated above, the electric wires 300 extend into the access openings 225 in the upper layer 260 and are electrically bonded to the intermediate plate layer 212 in position to energize the microvalve actuator 224. The electric wires 300 are also electrically connected to pins 302 that extend through (and are electrically insulated from) the body 271, as illustrated in FIG. 29.

In operation, when the body 271 is sealed to the receiving structure, the electrical wires 300 are hooked up, and the fluid passageways of the system in which the MEMS device 200 and the mounting arrangement 270 are installed are plumbed to supply fluid to the area enclosed by the skirt 280 via the open end of the skirt 280, and plumbed to receive fluid from the one or more outlet ports 283. When the electrical wires 300 are energized to cause the actuator 224 to move the beams 220 and 221 to the actuated positions thereof, opening the eight microvalves 201a through 204b. Fluid will flow from the area enclosed by the skirt 280 through the upper plate layer 260 via the inlet micro ports, that is, via the second micro ports 238. After passing through the respective microvalves 201a through 204b, the fluid passes through the lower plate layer 214 via the respective outlet micro port, that is, via the respective first micro port 234 and into associated fluid receiving ports 285. From there, the fluid passes through the body 271 via internal passages, out the one or more outlet ports 283, and back to the system in which the MEMS device 200 and mounting arrangement 170 are installed.

The microvalve devices disclosed herein may be useful in many applications, including, but not limited to, refrigeration/air conditioning, hydraulics, and pneumatics, in such industries as medical, industrial process control or other commercial application, including automotive. A variety of embodiments of the invention have been presented to allow the users to select the most suitable design for the intended application. There are many aspects to our invention, some of which are listed below. However, this listing is not intended to be limiting. Furthermore, the above embodiments are only meant to be illustrate the preferred embodiment of various aspects of the invention. The invention may be practiced otherwise than as specifically explained and illustrated without departing from its spirit or the scope of the invention as put forth in the accompanying claims.

In summary, the invention includes a MEMS device that has a valve body formed of multiple planar layers, including an upper layer, a lower layer and an intermediate layer disposed between the upper layer and the lower layer, the intermediate layer defining a cavity therein The MEMS device has an actuator disposed in the intermediate plate layer. An elongated beam, having a first end, a second end, and a central portion is disposed between the first end and the second end, the beam being disposed in the cavity, the central portion of the beam being attached to the actuator whereby the actuator can be selectively actuated to move the beam in a plane parallel to the planar layers between a first unactuated position and a second actuated position. A first microvalve is integrally formed with the first end of the beam for controlling a first fluid flow path through the cavity. A second microvalve is integrally formed with the second end of the beam for controlling a second fluid flow path through the cavity, there being substantially no fluid communication between the first fluid flow path and the second fluid flow path through the cavity. A first port communicating with the cavity is defined by one of the upper layer and the lower layer in a location where communication between the first port and the cavity is one of substantially permitted and substantially blocked by the first microvalve when the beam is in the first position thereof and where communication between the first port and the cavity is the other of substantially permitted and substantially blocked by the first microvalve when the beam is in the second position thereof. A second port communicating with the cavity is defined by one of the upper layer and the lower layer, the first fluid flow path through the cavity being defined between the first port and the second port. A third port communicating with the cavity is defined by one of the upper layer and the lower layer in a location where communication between the third port and the cavity is one of substantially permitted and substantially blocked by the second microvalve with the beam when the beam is in the first position thereof. A fourth port communicating with the cavity is defined by one of the upper layer and the lower layer, the second fluid flow path through the cavity being defined between the third port and the fourth port.

Another aspect of the invention includes a microvalve that has a valve body formed of multiple planar layers, including an intermediate layer defining a cavity therein. An elongated beam having a first end, a second end, and a central portion disposed between the first end and the second end is disposed in the cavity, a first point on the central portion of the beam being attached to a fixed portion of the intermediate plate layer by a flexible hinge, a second point on the central portion of the beam being attached to an actuator disposed in the intermediate plate layer whereby the actuator can be selectively actuated to move the beam in a plane parallel to the planar layers between a first and a second position, while the hinge flexes to accommodate motion of the beam. A first port communicating with the cavity is formed in one of two plate layers on opposite sides of the intermediate plate layer, in a location where communication between the first port and the cavity is substantially blocked by the first end of the beam when the beam is in the first position thereof. A second port communicating with the cavity is formed in one of the two plate layers on opposite sides of the intermediate plate layer, in a location where communication between the second port and the cavity is substantially blocked by the second end of the beam when the beam is in one of the first position and the second position thereof.

Another aspect of the invention includes a microvalve device for controlling fluid flow, which microvalve device includes a two-way pilot operated microvalve and a four-way pilot microvalve for controlling the two-way pilot operated microvalve.

Another aspect of the invention includes a microvalve device that includes two three-way microvalves actuated by a common microvalve actuator.

Another aspect of the invention includes a four-way microvalve for controlling fluid flow, having a body with an intermediate plate layer with a cavity formed therein, the body defining an inlet connection, an outlet connection, and first and second load connections in fluid communication with the cavity. A moveable microvalve element is disposed in the cavity, and is moveable between a first position and a second position, the moveable element being operable to allow fluid communication between the inlet connection and the first load connection and between the outlet connection and the second load connection when the moveable element is in the first position and being operable to allow fluid communication between the inlet connection and the second load connection and between the outlet connection and the first load connection when the moveable element is in the second position. The four-way microvalve also includes a microvalve actuator operable to move the moveable element between the first position and the second position.

Another aspect of the invention includes a two-way microvalve for controlling fluid flow, having a multilayer plate valve body having an intermediate plate layer with a cavity formed therein, the body defining an inlet connection and an outlet connection in fluid communication with the cavity. A moveable microvalve element is disposed in the cavity moveable between a first position and a second position, the moveable element being operable to allow fluid communication between the inlet connection and the outlet connection when the moveable element is in the first position and being operable to block fluid communication between the inlet connection and the outlet connection when the moveable element is in the second position. A feedback port is formed in the moveable element operable to regulate the pressure on an end of the moveable element relative to the movement of the moveable element between the first position and the second position.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A MEMS device that comprises:
   a valve body formed of multiple planar layers, including an upper layer, a lower layer and an intermediate layer disposed between the upper layer and the lower layer, the intermediate layer defining a cavity therein;
   an actuator disposed in the intermediate plate layer;
   an elongated beam, having a first end, a second end, and a central portion disposed between the first end and the second end, the beam being disposed in the cavity, the central portion of the beam being attached to the actuator whereby the actuator can be selectively actuated to move the beam in a plane parallel to the planar layers between a first unactuated position and a second actuated position;
   a first microvalve integrally formed with the first end of the beam for controlling a first fluid flow path through the cavity;
   a second microvalve integrally formed with the second end of the beam for controlling a second fluid flow path through the cavity, there being substantially no fluid communication between the first fluid flow path and the second fluid flow path through the cavity;
   a first port communicating with the cavity being defined by one of the upper layer and the lower layer in a location where communication between the first port and the cavity is one of substantially permitted and substantially blocked by the first microvalve when the beam is in the first position thereof and where communication between the first port and the cavity is the other of substantially permitted and substantially blocked by the first microvalve when the beam is in the second position thereof;
   a second port communicating with the cavity being defined by one of the upper layer and the lower layer, the first fluid flow path through the cavity being defined between the first port and the second port;
   a third port communicating with the cavity being defined by one of the upper layer and the lower layer in a location where communication between the third port and the cavity is one of substantially permitted and substantially blocked by the second microvalve with the beam when the beam is in the first position thereof; and
   a fourth port communicating with the cavity being defined by one of the upper layer and the lower layer, the second fluid flow path through the cavity being defined between the third port and the fourth port.

2. The MEMS device according to claim 1, wherein communication between the third port and the cavity is substantially permitted by the second microvalve when the beam is in the first position thereof, and communication between the third port and the cavity is substantially blocked by the second microvalve when the beam is in the second position thereof.

3. The MEMS device according to claim 1 wherein
communication between the first port and the cavity is substantially permitted by the first microvalve when the beam is in the first position thereof, and communication between the third port and the cavity is substantially permitted by the second microvalve when the beam is in the first position thereof, and
communication between the first port and the cavity is substantially blocked by the first microvalve when the beam is in the second position thereof, and communication between the third port and the cavity is substantially blocked by the second microvalve when the beam is in the second position thereof.

4. The MEMS device according to claim 3 wherein
communication between the second port and the cavity is substantially permitted by the first microvalve when the beam is in the first position thereof, and communication between the fourth port and the cavity is substantially permitted by the second microvalve when the beam is in the first position thereof, and
communication between the second port and the cavity is substantially blocked by the first microvalve when the beam is in the second position thereof, and communication between the fourth port and the cavity is substantially blocked by the second microvalve when the beam is in the second position thereof.

5. The MEMS device according to claim 4, further comprising:
a fifth port communicating with the cavity being defined by one of the upper layer and the lower layer in a location where communication between the fifth port and the first flow path in the cavity is substantially permitted by the first microvalve when the beam is in the first position thereof, and communication between the fifth port and the cavity is substantially blocked by the first microvalve when the beam is in the second position thereof; and
a sixth port communicating with the second flow path in the cavity being defined by one of the upper layer and the lower layer in a location where communication between the sixth port and the second flow path in the cavity is substantially permitted by the second microvalve when the beam is in the first position thereof, and communication between the sixth port and the cavity is substantially blocked by the second microvalve when the beam is in the second position thereof.

6. The MEMS device of claim 5 wherein
the first microvalve comprises an enlarged body on the first end of the beam, the body of the first microvalve having a central aperture defined by a peripheral structure, the first fluid flow path being contained within the central aperture of the first microvalve, the peripheral structure of the first microvalve moving to block and unblock the first port when the beam is in the second and first positions thereof, respectively, an inwardly extending protrusion being formed on the peripheral structure of the first microvalve in a position to block and unblock the fifth port when the beam is in the second and first positions thereof, respectively; and
the second microvalve comprises an enlarged body on the second end of the beam, the body of the second microvalve having a central aperture defined by a peripheral structure, the second fluid flow path being contained within the central aperture of the second microvalve, the peripheral structure of the second microvalve moving to block and unblock the second port when the beam is in the second and first positions thereof, respectively, an inwardly extending protrusion being formed on the peripheral structure of the second microvalve in a position to block and unblock the sixth port when the beam is in the second and first positions thereof, respectively.

7. The MEMS device of claim 3 wherein
the first microvalve comprises an enlarged body on the first end of the beam, the body of the first microvalve having a central aperture defined by a peripheral structure, the first fluid flow path being contained within the central aperture of the first microvalve, the peripheral structure moving to block and unblock the first port when the beam is in the second and first positions thereof, respectively; and
the second microvalve comprises an enlarged body on the second end of the beam, the body of the second microvalve having a central aperture defined by a peripheral structure, the second fluid flow path being contained within the central aperture of the second microvalve, the peripheral structure moving to block and unblock the second port when the beam is in the second and first positions thereof, respectively.

8. The MEMS device of claim 6, wherein at least one micro vent is formed in the peripheral structure of the first microvalve and at least one micro vent is formed in the protrusion formed on the peripheral structure of the first microvalve; and
at least one micro vent is formed in the peripheral structure of the second microvalve and at least one micro vent is formed in the protrusion formed on the peripheral structure of the second microvalve.

9. The MEMS device of claim 1, wherein a plurality of apertures are formed in the beam, resulting in a mass reduction of at least 10 percent compared to a beam of the same size without the apertures formed therein.

10. The MEMS device of claim 9, wherein the plurality of apertures are oval in plan view, resulting in a mass reduction of at least 20 percent compared to a beam of the same size without the apertures formed therein.

11. The MEMS device of claim 9, wherein the plurality of apertures are oval in plan view and are arranged in a double row, resulting in a mass reduction of at least 40 percent compared to a beam of the same size without the apertures formed therein.

12. The MEMS device of claim 9, wherein the plurality of apertures are one of oval and triangular in plan view, resulting in a mass reduction of at least 20 percent compared to a beam of the same size without the apertures formed therein.

13. The MEMS device of claim 1, further comprising a flexible hinge attaching the beam to a fixed portion of the intermediate plate layer, the hinge flexing to accommodate motion of the beam as the beam is actuated between the first and second positions thereof.

14. The MEMS device of claim 1, wherein the beam is a first beam, further comprising:
a second elongated beam having a first end, a second end, and a central portion disposed between the first end and the second end, the second beam being disposed in the cavity and fixed to the actuator so as to be moved simultaneously with the first beam when the actuator is actuated;
a third microvalve integrally formed with the first end of the second beam for controlling a third fluid flow path through the cavity;
a fourth microvalve integrally formed with the second end of the second beam for controlling a fourth fluid flow path through the cavity, there being substantially no fluid communication between the first fluid flow path, the second fluid flow path, the third fluid flow path or the fourth fluid flow path through the cavity.

15. The MEMS device of claim 14, further comprising:
a fifth microvalve integrally formed with the first end of the first beam for controlling a fifth fluid flow path through the cavity;
a sixth microvalve integrally formed with the second end of the first beam for controlling a sixth fluid flow path through the cavity,
a seventh microvalve integrally formed with the first end of the second beam for controlling a seventh fluid flow path through the cavity;
an eighth microvalve integrally formed with the second end of the second beam for controlling an eighth fluid flow path through the cavity, there being substantially no fluid communication between the first fluid flow path, the second fluid flow path, the third fluid flow path, the fourth fluid flow path, the fifth fluid flow path, the sixth fluid flow path, the seventh fluid flow path, or the eighth fluid flow path through the cavity.

16. The MEMS device of claim 1, wherein the actuator is a thermal actuator.

* * * * *